US008108512B2

(12) United States Patent
Howard et al.

(10) Patent No.: US 8,108,512 B2
(45) Date of Patent: Jan. 31, 2012

(54) SYSTEM AND METHOD FOR ACCESSING AND USING A SUPERCOMPUTER

(75) Inventors: Kevin D. Howard, Louisville, CO (US); James A. Lupo, Broomfield, CO (US); Thomas Geske, Erie, CO (US); Nick Robertson, Erie, CO (US)

(73) Assignee: Massively Parallel Technologies, Inc., Boulder, CO (US)

(*) Notice: Subject to any disclaimer, the term of this patent is extended or adjusted under 35 U.S.C. 154(b) by 1181 days.

(21) Appl. No.: 11/849,050

(22) Filed: Aug. 31, 2007

(65) Prior Publication Data

US 2008/0082933 A1 Apr. 3, 2008
US 2009/0077483 A9 Mar. 19, 2009

Related U.S. Application Data

(60) Provisional application No. 60/841,928, filed on Sep. 1, 2006.

(51) Int. Cl.
*G06F 15/173* (2006.01)

(52) U.S. Cl. .................................................... 709/224

(58) Field of Classification Search ........................ None
See application file for complete search history.

(56) References Cited

U.S. PATENT DOCUMENTS

| | | | | |
|---|---|---|---|---|
| 3,753,234 | A * | 8/1973 | Gilbert et al. | 709/253 |
| 5,166,674 | A | 11/1992 | Baum et al. | |
| 5,224,100 | A | 6/1993 | Lee et al. | |
| 5,325,526 | A | 6/1994 | Pierce et al. | |
| 5,349,682 | A | 9/1994 | Rosenberry | |
| 5,371,852 | A | 12/1994 | Attanasio et al. | |
| 5,488,609 | A | 1/1996 | Hluchyj et al. | |
| 5,689,722 | A | 11/1997 | Swarztrauber | |
| 5,699,500 | A | 12/1997 | Dasgupta | |
| 5,758,144 | A | 5/1998 | Eberhard et al. | |
| 5,838,906 | A | 11/1998 | Ang et al. | |
| 5,857,076 | A | 1/1999 | Schmidt | |
| 5,860,010 | A | 1/1999 | Attal | |
| 5,905,736 | A | 5/1999 | Ronen et al. | |
| 6,014,669 | A | 1/2000 | Slaughter et al. | |
| 6,117,180 | A | 9/2000 | Dave et al. | |
| 6,154,765 | A | 11/2000 | Hart | |
| 6,163,855 | A | 12/2000 | Shriivastava et al. | |
| 6,167,428 | A | 12/2000 | Hart | |

(Continued)

FOREIGN PATENT DOCUMENTS

EP 0107453 A 5/1984

(Continued)

OTHER PUBLICATIONS

Cohen, ED et al. Efficient Covexity and Domination Algorithms for Fine-and Medium-Grain Hypercube Computers, Algorithmica, vol. 7, pp. 51-75.

(Continued)

*Primary Examiner* — Ario Etienne
*Assistant Examiner* — Clayton R Williams
(74) *Attorney, Agent, or Firm* — Lathrop & Gage LLP

(57) ABSTRACT

Systems and methods form and control a supercomputer based upon a parallel processing architecture such as a Howard cascade. A graphical user interface allows a user to interact with one or more virtual power centers of the supercomputer facility. A plurality of processing nodes self-organize into one or more virtual power centers. The processing nodes utilize overlapped input and output for improved communication.

8 Claims, 61 Drawing Sheets

U.S. PATENT DOCUMENTS

| | | | | |
|---|---|---|---|---|
| 6,295,573 | B1 | 9/2001 | Bailey et al. | |
| 6,617,428 | B1 | 9/2003 | Ellis | |
| 6,857,004 | B1 * | 2/2005 | Howard et al. | 709/201 |
| 7,376,747 | B2 * | 5/2008 | Hartop | 709/233 |
| 2001/0011294 | A1 | 8/2001 | Ellis | |
| 2003/0135614 | A1 | 7/2003 | Hattori et al. | |
| 2003/0195938 | A1 * | 10/2003 | Howard et al. | 709/208 |
| 2005/0038852 | A1 * | 2/2005 | Howard | 709/205 |
| 2006/0259534 | A1 * | 11/2006 | Kimura et al. | 708/422 |

FOREIGN PATENT DOCUMENTS

| | | | |
|---|---|---|---|
| EP | 0640930 | | 3/1995 |
| EP | 0640930 | A | 3/1995 |
| EP | 0921485 | | 6/1999 |
| EP | 1031923 | A | 8/2000 |
| EP | 1096378 | A2 | 8/2000 |
| WO | WO 94/27216 | A | 11/1994 |
| WO | WO 99/19807 | A | 4/1999 |
| WO | WO 0101219 | | 1/2001 |
| WO | WO03060748 | | 7/2003 |
| WO | WO2005011843 | A2 | 11/2005 |

OTHER PUBLICATIONS

DeBenedicts, E.P., "Multiprocessor Architectures are Converging", Hypercube Concurrent Computers and Applications: Proceeding of the third conference on Hypercube concurrent computers and applications: Architecture, software, computer systems, and general issues, vol. 1, pp. 12-20, Pasadena, California, Jan. 19-20, 1988.

Livingston, Marilyn I. and Stout, Quentin F., "Fault Tolerance of the Cylclic Buddy Subcube Location Sceme in Hypercubes", Proceedings of the 6th Distributed Memory Computing Conference (1991), IEEE, pp. 34-41, 1991.

Fox, G.C., "What Have We Learnt From Using Real Parallel Machines on Real Problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

Schwan, K. et al. "Topologies—Computational Messaging for Multicomputers", Hypercube Concurrent Computers and Applications: Proceedings of the third conference on Hypercube Concurrent Computers and Applications: Architecture, software, computer systems, and general issues, vol. 1, pp. 580-593, Pasadena, California, Jan. 19-20, 1988.

Simoneaux, A., "Organizers Hope to Give Lafayette Superstart in High-Tech Direction," Oct. 1927, Supercomputeronline.com, 2 pages.

IBM, "Cluster-Based Stack Optimization Algorithm for Very Large-scale Integration," Sep. 1987, IBM Technical disclosure Bulletin, vol. 30, Issue 4, pp. 1445-1447.

Chong et al., "Concurrent Processing for Picture Archiving and Communicating System (PACS)," Jun. 1995, IEEE, pp. 468-472.

Antaki et al. "The Soft Side of New Enterprise," May 1999, MIT enterprise FORUM of Dallus Network Inc., 2 pages.

Hitachi, "The Next Generation of Information Technology, Hitachi's Got IT!" Spring 97, Hitachi Today No. 39, pp. 1-6 and cover page.

Kahaber, Fujitsu's 2nd Parallel computing WS (PCW'93) Nov. 1993 Kawasaki Japan: Dec. 1993, 15 pages.

Ryan et al., "A Scaleable Distributed Multimedia Knowledge Retrieval System on a cluster of Heterogeneous High Performance Architectures," International Journal on artificial Intelligence tools, vol. 9, No. 3 (2000), pp. 343-367.

"CAD comes on line", Feb. 21, 2000, p. 28, Design News-Automotive.

Hillis, D. "Massive, Parallel Supercomputers—Where They're Going-How They'll Work", Forbes ASAP, Feb. 22, 1999, pp. 60-62 and 64.

"MSC.Software Announces visualNastran 4d2Go; A Total Engineering Solution to be Bundled with CAD Products", Mar. 1, 2000, http://askmerril.com/mlol/main/index.asp?Action=NewsStory &NewsID=1152354.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel and Distributed Processing Syposium., Proceedings 15th International San Francisco, CA, USA Apr. 23-27, 2001, Los Alamitos, CA USA, IEE Comput. Soc, 2128-2135.

Chen, et al.: "Parallel 2d delaunay triangulations in hpf and mpi" Parallel and Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Spril 7-10 1991, Proceedings of the Southeast Conference, New York, IEEE, US vol. 1, Apr. 7, 1991, pp. 466-469.

Zhong, X, et al.: "Optimal implantation of parallel divide-and-conquer algooriths on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US Oct. 19, 1992, pp. 583-585.

Welch, L.R., et al.: "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, Oct. 25, 1995, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. of the Fourteenth International Conference on Logic Programming, [online] Jul. 1997, pp. 108-122, Retrieved From the Internet URL:http://citeseer.ist.psu.edu/cacxhe/papers/cs/16510/http:zSzzSzwww.cs.nmsu.eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings of the Hawaii International Conference on System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 1996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the Charm Heterogeneous Workstation Cluster" High Performance Distributed Computing, 1994, Proceedings of the Third IEEE International symposium on San Francisco, CA, USA Aug. 2-5, 1994, Los Alamitos, CA, USA, IEEE Comput. Soc, Aug. 2, 1994, pp. 203-210.

DeSouza-Batista, J.C., et al.: "A Sub-optimal 28 Assignment of Application Tasks Onto Heterogeneous Systems" Heterogenous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Mutlicomputer" Circuits and Systems, 1993, Proceedings of the 36th Midwest Symposium on Detroit, MI, USA Aug. 16-18, 1993, New York, NY, USA, IEEE, Aug. 16, 1993, pp. 1117-1120.

Chowdhury, A., et al.: "Supporting Dynamic Space-Sharing on Clusters of Non-Dedicated Workstations" Distributed Computing Systems, 1997, Proceedings of the 17th International Conference in Baltimore, MD, USA May 27-30, 1997, Los Alamitos, CA, USA, IEEE Comput. Soc, US May 27, 1997, pp. 149-158.

Fujitsu's 2nd Parallel Computing WS (PWC'93) Nov. 1993 Kawasaki Japan; Nov. 1993; pp. 1-15.

Carpenter, B. "What is Grid Computing?" Internet Society, Grid Computing ISOC Member Briefing #11, Feb. 26, 2003, pp. 1-4.

Preliminary Amendment, Related U.S. Appl. No. 09/603,020, Jul. 7, 2001.
Preliminary Amendment, Related U.S. Appl. No. 09/603,020, Jan. 16, 2002.
Preliminary Amendment, Related U.S. Appl. No. 09/603,020, May 2, 2003.
Restriction Requirement, Related U.S. Appl. No. 09/603,020, Sep. 16, 2003.
Response to Restriction Requirement, Related U.S. Appl. No. 09/603,020, Oct. 8, 2003.
Office Action, Related Application U.S. Appl. No. 09/603,020, Nov. 28, 2003.
Supplemental Office Action, Related U.S. Appl. No. 09/603,020, Dec. 17, 2003.
Response to Office Action, Related U.S. Appl. No. 09/603,020, Apr. 16, 2004.
Response to Office Action, Related U.S. Appl. No. 09/603,020, Apr. 23, 2004.
Examiner Interview Summary Record, Related U.S. Appl. No. 09/603,020, Apr. 29, 2004.
Response to Office Action, Related U.S. Appl. No. 09/603,020, May 6, 2004.
Notice of Allowance, Related U.S. Appl. No. 09/603,020, Jul. 22, 2004.
Amendment after Notice of Allowance, Related U.S. Appl. No. 09/603,020, Sep. 3, 2004.
Notice of Allowance, Related U.S. Appl. No. 09/603,020, Sep. 14, 2004.
Amendment under 37 CFR 1.312, Related U.S. Appl. No. 09/603,020, Sep. 3, 2004.
Response to Amendment under Rule 312, Related U.S. Appl. No. 09/603,020, Oct. 14, 2004.
Request for Certificate of Correction, Related U.S. Appl. No. 09/603,020, Sep. 12, 2005.
International Search Report, Related Application Serial No. PCT/US00/17576, Dec. 26, 2000.
Revised International Search Report, Related Application Serial No. PCT/US00/17576, Jun. 6, 2001.
International Preliminary Examination Report, Related Application Serial No. PCT/US00/17576,Oct. 24, 2001.
International Search Report, Related Application Serial No. PCT/US03/00787, Oct. 11, 2004.
International Search Report, Related Application Serial No. PCT/US2005/016407, Mar. 30, 2006.
Written Opinion, Related Application Serial No. PCT/US2005/016407, Mar. 31, 2006.
International Preliminary Report on Patentability, Related Application Serial No. PCT/US2005/016407, Nov. 14, 2006.
Restriction Requirement, Related Application Serial No. EP 03713226.3, Mar. 5, 2007.
Related Application EP00944888; Amended Claims; Feb. 3, 2005.
Related Application EP00944888; Supplementary European Search Report; Sep. 9, 2004.

* cited by examiner

PHASE 1 INITIAL STATE

TWO NODE TRANSMIT – TIME UNIT 1

TIME UNIT 2

COMPLETED TRANSMISSION - TIME UNIT 5

AGENT DIFFERENTIATION STATE DIAGRAM

EXAMPLE 3, TIME UNIT 1

EXAMPLE 3, TIME UNIT 2

EXAMPLE 3, TIME UNIT 3

EXAMPLE 3, TIME UNIT 4

EXAMPLE 3, TIME UNIT 5, INITIAL

EXAMPLE 3, TIME UNIT 5, FINAL

EXAMPLE 3, TIME UNIT 6, INITIAL

EXAMPLE 3, TIME UNIT 6, FINAL

EXAMPLE 3, TIME UNIT 7, INITIAL

EXAMPLE 3, TIME UNIT 7, FINAL

EXAMPLE 3, STABLE SYSTEM

EXAMPLE 3, FINAL GOAL STATES

EXAMPLE 4, INITIAL STATE

EXAMPLE 4, TIME UNIT 2

EXAMPLE 4, TIME UNIT 3

EXAMPLE 4, TIME UNIT 4

EXAMPLE 4, TIME UNIT 5, INITIAL

EXAMPLE 4, TIME UNIT 5, FINAL

EXAMPLE 4, TIME UNIT 6, FINAL

EXAMPLE 4, FINAL GOAL STATES

EXAMPLE 5, UNDIFFERENTIATED NODES

EXAMPLE 5, TIME UNIT 2

EXAMPLE 5, TIME UNIT 3

EXAMPLE 5, TIME UNIT 4, INITIAL STATES

EXAMPLE 5, TIME UNIT 4, FINAL STATES

EXAMPLE 5, TIME UNIT 5, INITIAL STATES

EXAMPLE 5, TIME UNIT 5, FINAL STATES

EXAMPLE 5, TIME UNIT 5, STABLE SYSTEM

EXAMPLE 5, TIME UNIT 5, STABLE SYSTEM

CASCADE FORMATION STATE DIAGRAM

EXAMPLE 6, TIME UNIT 0

EXAMPLE 6, TIME UNIT 1

EXAMPLE 6, TIME UNIT 2

EXAMPLE 6, TIME UNIT 3

EXAMPLE 6, INITIALIZED CASCADE

EXAMPLE 7, INITIALIZED RESOURCES

EXAMPLE 7, FINAL CASCADES

1-CHANNEL HOWARD CASCADE, 4 -TIME STEPS

3700

2-CHANNEL HOWARD CASCADE, 4 -TIME STEPS

3720

(2,3,1) HOWARD CASCADE (4,2,2) HOWARD CASCADE (1,2,3,1) HOWARD-LUPO MANIFOLD

3780

(1,4,2,2) HOWARD-LUPO MANIFOLD

BROADCAST IN 1 TIME UNIT

BROADCAST-BASED ALL-TO-ALL EXCHANGE ON 4 NODES

MPT PAAX DATA MOVEMENT ON 4 NODES

BINARY-TREE BROADCAST, 3 TIME UNITS

BINARY-TREE ALL-TO-ALL EXCHANGE, 4 NODES

2-CHANNEL HOWARD-TREE

OVERLAPPING SEND AND RECEIVE

BINARY-TREE USING SINGLE $\lambda_r$, $\varphi$=2, v=1, $n_r$=1

HOWARD-TREE WITH SINGLE $\lambda_r$, $\varphi$=2, v=2, $n_r$=1

LAMBDA STRIPS IN A 3-φ, 1-$\lambda_r$, 1-CHANNEL CASCADE

LAMBDA STEP PROCESSING IMPLEMENTED PURELY IN SOFTWARE

LAMBDA STEP PROCESSING IMPLEMENTED PURELY IN HARDWARE

2-CHANNEL LAMBDA-STEP MULTI-THREADED IMPLEMENTATION

SYSTEM AND METHOD FOR ACCESSING AND USING A SUPERCOMPUTER

RELATED APPLICATIONS

This application claims priority to U.S. Provisional Application No. 60/841,928, filed Sep. 1, 2006, incorporated herein by reference.

BACKGROUND

Current methods for accessing and using cluster of supercomputers do not provide any significant level of user interactivity. Typically, a user submits a job to a system queue serviced by a job control subsystem. The job is then scheduled for batch execution based on criteria established by the administrators of the supercomputer. Although users are totally dependent on these criteria, they are not presented to them in a way that allows the user to easily determine when their job will start and finish. Since the user does not have direct control over job execution, this method does not lend itself to interactive computing.

More specifically, the user is typically not granted any control over execution of the job and therefore cannot follow its progress easily or identify and/or correct processing anomalies. Further, typical supercomputer technology does not provide functionality or flexibility to allow implementation of such control and interaction.

Communication between nodes of a parallel processing environment forms a significant cost when using the parallel processing environment to process jobs. These communication costs effectively limit the number of usable nodes within the parallel processing environment. There is therefore a significant need for understanding and improving communication within the parallel processing environment.

A further limitation of parallel processing environments is the configuration of individual nodes within the environment. Where the nodes are statically defined and configured by some external source, such configuration is time consuming and error prone. Further, where a particular device fails, such as the system configuration controller, the entire parallel processing environment becomes unusable. Alternative methods of node configuration within the parallel processing environment are desired.

SUMMARY

U.S. Pat. No. 6,857,004, filed Jun. 26, 2000 and entitled Collective Network Processing System and Methods, Patent Cooperative Treaty Patent Application No. PCT/US00/17576, filed Jun. 26, 2000 and entitled Massive Collective Network Processing System and Methods, Patent Cooperative Treaty Patent Application No. PCT/US03/00787, filed Jan. 10, 2003 and entitled Parallel Processing Systems and Methods, U.S. patent application Ser. No. 10/937,224, filed Sep. 9, 2004 and entitled Massive Collective Network Processing System and Methods, and Patent Cooperation Treaty Application No. PCT/US05/016407 filed May 11, 2005 entitled Low Entropy Parallel Processing Systems and Methods are each incorporated herein by reference.

In one embodiment, a graphical user interface interacts with a supercomputer facility and includes a main panel for providing login for a user to an existing user account, a status panel for displaying status information of a job, an input panel for specifying an input dataset for the job, an output panel for displaying an output dataset for the job, and a menu from which options may be selected by the user. The graphical user interface interacts with at least one transaction server and at least one virtual power center to process the job.

In another embodiment, a method determines the optimum node count for processing a job within a parallel computing system. A best value cascade size is determined based upon the maximum number of compute nodes where parallel processing efficiency remains above 90 percent. A best performance cascade size is determined based upon the maximum number of compute nodes where parallel processing efficiency remains above a predetermined limit, the predetermined limit being less than 90 percent. A number of compute nodes for processing the job is determined based upon the best value and best performance, and a processing duration of the job is estimated based upon the determined number of compute nodes and a computational load of the job. A cost for the job is estimated based upon the determined number of compute nodes and the estimated processing duration.

In another embodiment, a self-organizing network of processing nodes for supercomputer utilization, includes a plurality of processing nodes, each having one or more communication channels. Each processing node receives indifferent code to operate as an agent and a first of the processing nodes receiving a list of other agent addresses within the network. At least one switch supports multiple point-wise full-duplex communication between the agents. The first processing node operates as a list node and each other agent operates as a state machine that interacts with the list node and other agents to determine a role for the agent within the supercomputer.

In another embodiment, a method forms a parallel processing system based upon emergent behavior of a plurality of processing nodes. Each of the processing nodes is initialized with identical functionality to operate as an agent based upon a state machine. The agents interact amongst themselves to form one or more associations of agents based upon defined parameters of the parallel processing system. The defined parameters specify a maximum association size. A role is determined for each agent based upon the formed associations. The roles include a home node, a compute node, a spare node, and a diagnostic node.

In another embodiment, a parallel processing system with overlapped communication includes a plurality of processing nodes, each having an input communication channel and an output communication channel. Each input communication channel has an associated input thread and each output communication channel has an associated output thread. The input and output threads operate to concurrently receive and transmit data on the input and output communication channels and cooperate, when the received data is to be sent to another processing node, to transmit data received via the input communication channel on the output communication channel with a delay T'. At least one switch connects to the input and output communication channels of each of the processing nodes, and is configurable to transfer data from the output channel of a first of the processing nodes to the input channel of a second of the processing nodes. The at least one switch is configured upon setup of the parallel processing system to provide communication between the processing nodes based upon a topology of the parallel processing system, such that the parallel processing system broadcasts data to each processing node with a minimum delay.

In another embodiment, a method propagates data between interconnected nodes of a parallel processing system. The data is transmitted from a first node, via an output channel of the first node, to at least one second node, via an input channel of the second node. The transmission of the data has a duration of T. The data is received from the first node at the second node, the data being stored at least temporarily within the second node. The data is transmitted from the second node, via an output channel of the second node, to at least one third node, via an input channel of the third node, and concurrently with receiving the data from the first node. The delay between receiving data at the second node and receiving data at the third node being T', where T' is less than T. The time to receive the data at the third node is T'+T.

BRIEF DESCRIPTION

DETAILED DESCRIPTION

Interactive Supercomputer Control

The following systems and methods provide direct, interactive, control over execution of a job running on a Virtual Power Center (VPC). A VPC is, for example, a cluster type supercomputer of the type disclosed by U.S. Pat. No. 6,857,004 B1, incorporated herein by reference. These systems and methods bring true interactive supercomputing to the desktop. GUIs are ubiquitous and have become "defacto" standards for desktop computer systems. By combining GUI features in an innovative manner, a completely new paradigm for accessing and using one or more VPCs is created. Concepts embodied in the GUI are not computer platform or operating system specific, and can therefore be implemented within the context of several software environments. In one example, the GUI may be implemented as an interactive web server that is accessed by standard web browsing technology. The GUI may also be implemented as an independent network enabled application, or as an extension to a third party application that supports network connectivity and external plug-ins.

Figure 1A:
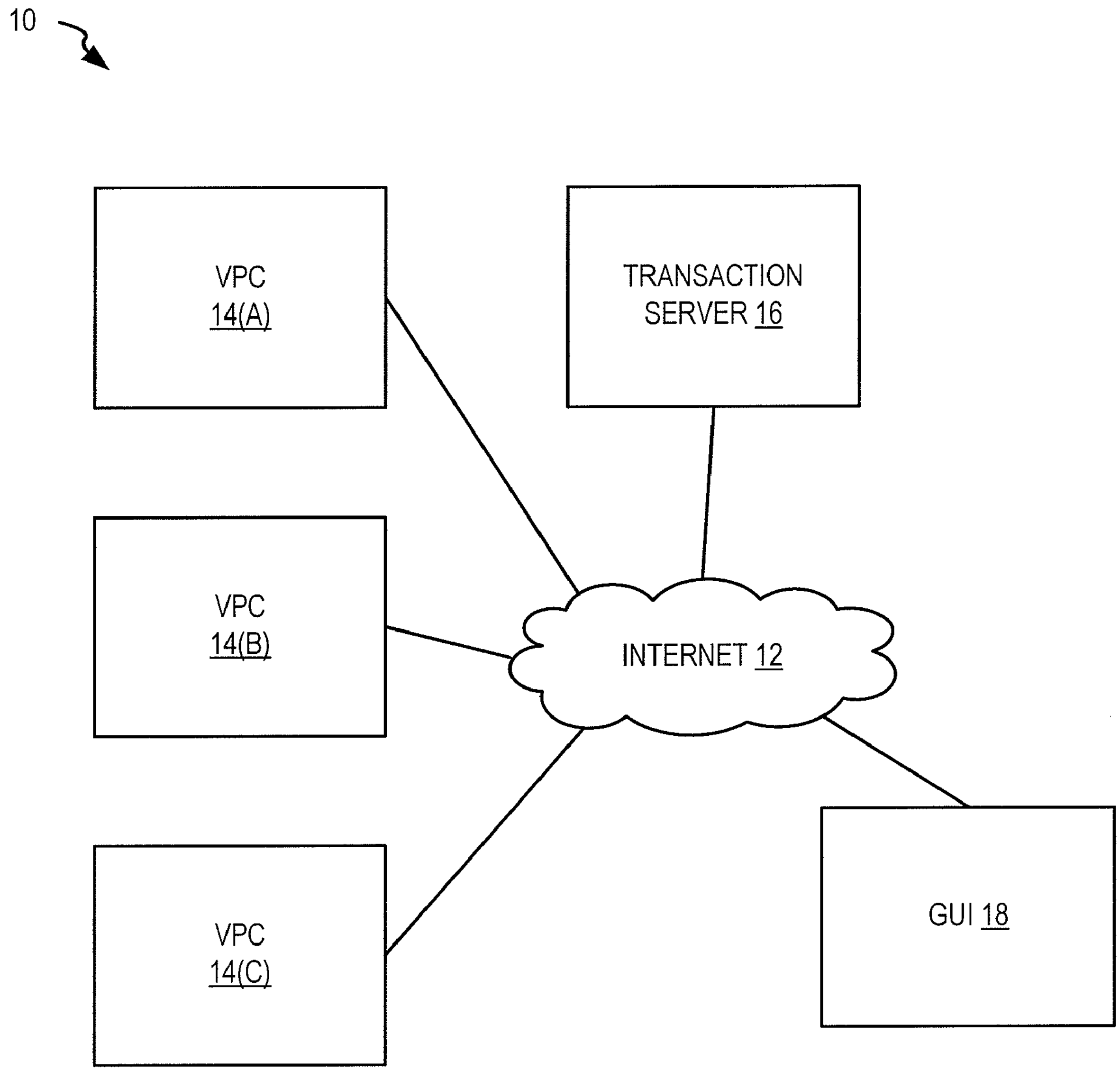
FIG. 1A shows an overview of a supercomputing facility with three virtual power centers (VPCs), a transaction server and a graphical user interface that are interconnected through the Internet.

FIG. 1A shows an overview of a supercomputing facility 10 with three VPCs 14(A), 14(B) and 14(C), a transaction server 16 and a graphical user interface (GUI) 18 that are interconnected through Internet 12. Transaction server 16 provides accounting and access control of users to VPCs 14 within supercomputing facility 10. In one example of operation, a user at GUI 18 may first interact with transaction server 16 to create a new account or to login to an existing account. Transaction server 16 then allows the user, through interaction with GUI 18, to utilize one or more of VPCs 14.

GUI 18 uses certain protocols to communicate with one or more VPCs 14 and transaction server 16, for example.

In particular, transactional server 16 may control GUI 18 to interact with the user to allow the user to select a certain account type, for example. Supercomputer facility 10 may, for example, support several user account types to satisfy a diverse range of customers. A user may, for example, choose a billable, prepaid, or credit card account type. In addition, GUI 18 may also support an account type that allows a user to access certain VPCs without incurring a charge to the user.

Once an account type is selected, GUI 18 and transaction server 16 guides the user through an account setup process; the user is prompted to fill in the information required to establish a valid account, for example. One or more users may be registered to the same account, and each user may have a unique identifier and password. Once the account is established and validated, the user may login to transaction server 16 and access one or more VPCs 14.

Figure 1B:
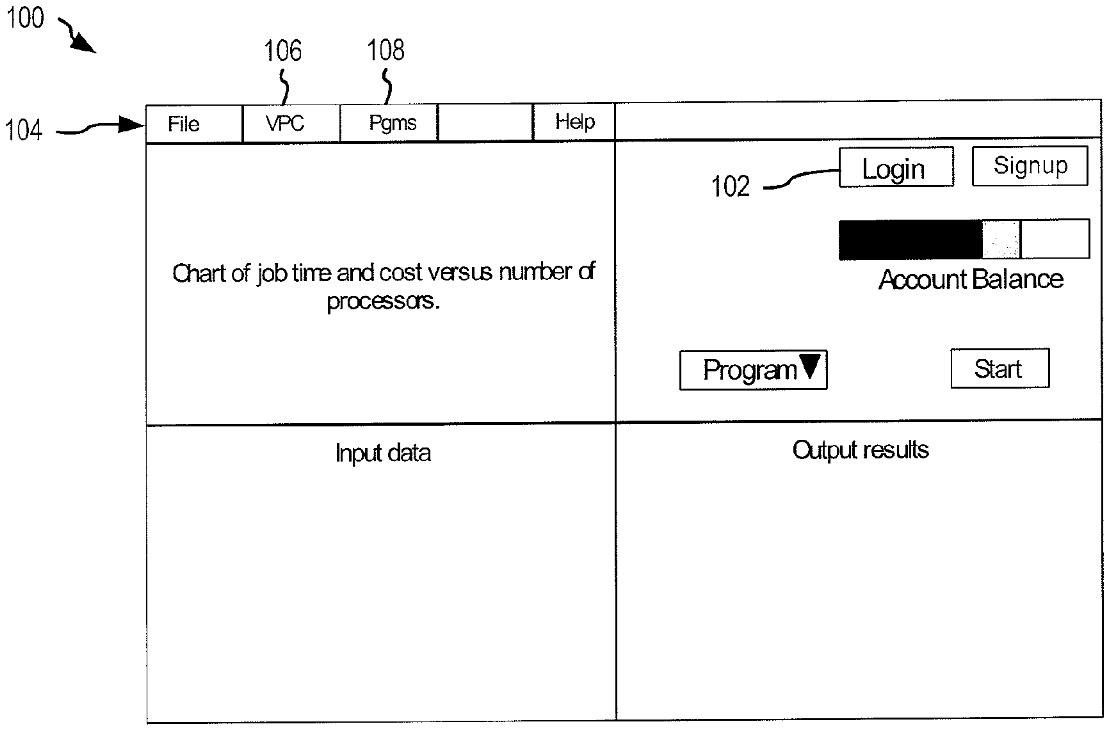
FIG. 1B shows one exemplary view of a graphical user interface for interacting with a virtual power center.

FIG. 1B shows one exemplary screen 100 of GUI 18 that allows a user to interact with transaction server 16 and VPCs 14. In one example of operation, the user selects login button 102 to establishes contact with transaction server 16 which accepts and authenticates the user's unique identifier and password to identify the user's account. Transaction server 16 then validates the user account, and if successful, grants access to one or more VPCs 14 of supercomputer facility 10.

As part of the login process, GUI 18 automatically obtains an up-to-date copy of the information necessary to support the features authorized for, and supported by GUI 18. GUI 18 may also obtain certain items of information from the user's account.

GUI 18 may allow the user to view their account status by selection of appropriate features through a pull-down menu object 104 of GUI 18. For example, if the user selects the "Account status" menu option from menu 104, GUI 18 displays a panel with a summary of the user's account balances. In a further example, if the user selects a "Details" button on the panel, another panel is displayed with an itemized list of jobs run, along with their execution statistics and individual cost. This lets the user know just how much cost has been incurred.

For prepaid accounts, GUI 18 may also allow the user to transact another prepayment.

GUI 18 may allow the user to request an update of software on the user's device by selection of an appropriate button on menu 104. GUI 18 may also include an update feature that checks for a newer version of the software automatically when the user logs in to their account.

The software update is facilitated by a server (e.g., transaction server 16) which interacts with GUI 18 to determine whether a newer version of the software is available. In automatic mode, when a newer version of the software is available, an update panel is displayed informing the user of the update and including an "Update" and a "Cancel" button to allow the user to perform the update or not.

If no update is available, then GUI 18 may display the update panel showing the current software version, but with the "Update" button dimmed to indicate that it is inactive. Selecting the "Cancel" button simply dismisses the update panel.

If an update is available, then the update panel may display both the current and the new software version. Selecting the "Cancel" button likewise declines the update and dismisses the update panel. Selecting the "Update" button initiates the software update process. The actual update process is consistent with that which is commonly used to download and install software on desktop computers. Once the update process is started, the user still has the ability to cancel the update up to the point when the new version is actually installed and replaces the current version.

Once the user has logged in to their account, and the account is authenticated, GUI 18 allows the user to select a VPC with which to communicate. For example, the user may initiate selection of a VPC using a VPC button 106 of menu 104. Upon selection of VPC button 106, GUI 18 may establish a connection to transaction server 16 to obtain information identifying which VPCs 14 are accessible by the user. GUI 18 may then provide a selection list to allow the user to select the desired VPC. Transaction server 16 may also supply information on the status and capability of each accessible VPC 14.

As appreciated, transaction server 16 may also represent a plurality of networked account servers without departing from the scope hereof. Transaction server 16 maintains a coherent view of all VPCs within supercomputer facility 10. Transaction server 16, or one or more servers of the plurality of networked servers, may be co-located with a VPC, or may be hosted at a separate location. Each VPC 14 maintains a list of transaction servers 16. If a VPC changes state (e.g., becomes unavailable due to maintenance), it sends a status update to one or more transaction servers 16. If the contacted transaction server 16 is unavailable, then another transaction server 16 is contacted. Transaction servers also operate to disseminate VPC status information to the other transaction servers. Likewise, if transaction server 16 changes state, status information is disseminated to the other transaction servers 16. By providing a network of VPCs and transaction servers within supercomputer facility 10, reliability and robustness of service is enhanced.

Figure 2:
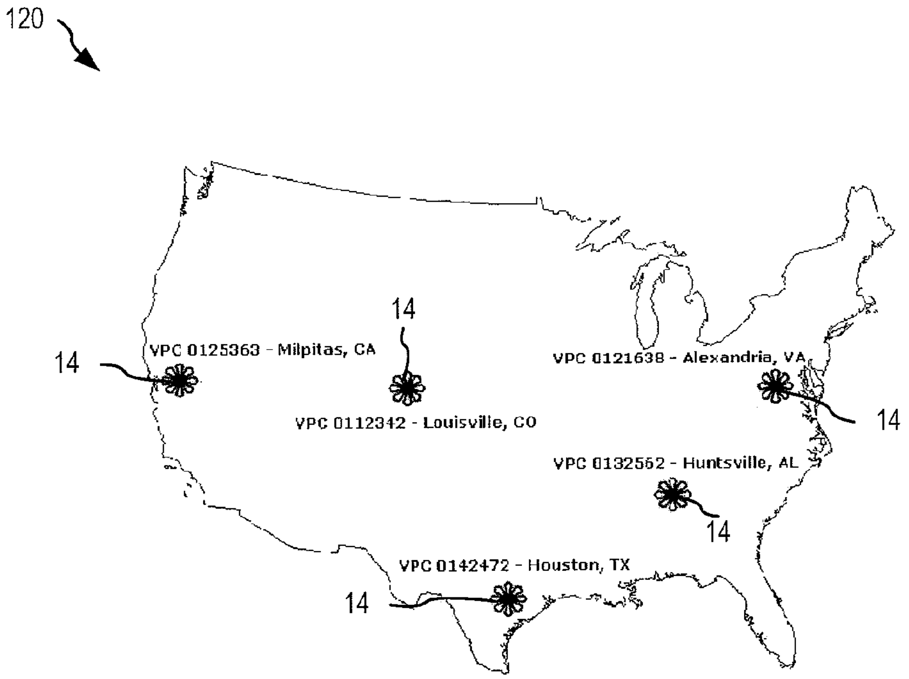
FIG. 2 shows a map of North America illustrating exemplary locations of virtual power centers.

Upon selection of a VPC from the displayed list by the user, GUI 18 may display information specific to the selected VPC. This information may include a list of applications available, as well as current status and usage statistics for the selected VPC. Upon selection of VPC button 106, GUI 18 may also offer a "Map" option for selection by the user. If this map option is selected, an interactive geographical map is displayed in a panel on GUI 18, showing the locations of available VPCs. The user may select a VPC directly from the map panel, resulting in similar operation as when the VPC is selected from the menu list. FIG. 2 shows one exemplary map panel 120 illustrating available VPCs 14 within North America.

VPCs may be generalized or specialized in terms of their supported applications. For example, one VPC may support a collection of commonly used applications across a wide variety of fields. Likewise, another VPC may support one or more specialized fields such as: bioinformatics, computational fluid dynamics, multi-dimensional physics simulation, etc. GUI 18 may store VPC information locally for future reference; this information is refreshed whenever a VPC status change is received from either a VPC or from a transaction server 16, or if the user selects VPC button 106 of menu 104.

In an alternate embodiment, if a user has already selected an application, a default VPC may be automatically designated for the job. This unburdens the user from having to choose a VPC. The user may, however, override the default VPC by selecting another VPC using menu 104 as described above. If a selected VPC does not support the designated application, then a panel displaying explanatory text and an "Ok" button is displayed by GUI 18.

One unique and innovative feature provided by GUI 16 automatically selects a VPC for a user based upon status and available of VPCs (obtained by querying VPC status information) and the application selected by a user; GUI 16 automatically selects the VPC capable of delivering the best service.

This powerful feature relieves the user from having to spend valuable time searching for a suitable VPC. This powerful feature also provides access to more applications, and if multiple VPCs supporting the user's selected application are available, it thereby provides redundancy. In the event that a VPC becomes inaccessible, or too busy, GUI 18 may automatically select an alternate VPC to perform the application. GUI 18 thus allows supercomputer facility 10 to provide the user with a consistently responsive service.

GUI 18 allows the user to select an application through use of a programs button 108 of menu 104. Upon selection of program button 108, a list of available applications is presented to the user by GUI 18. The list may, for example, be presented as a hierarchical structure that groups related applications into categories. Each categories may be nested to as many levels as necessary and each nested entry may be expanded through normal GUI list manipulation facilities know in the art.

In addition, a search feature may be provided to allow a user find a specific application using appropriate keywords. Search results may comprise a list of matched applications, from which an appropriate application may be selected. Upon selection of an application from the search result list, GUI 18 determines if the user is authorized access a VPC that hosts the application. If the user is authorized, then the application is selected, otherwise, a GUI panel is displayed with a message explaining the situation, and the procedure for requesting authorization.

GUI 18 also allows the user to interactively choose the number of processors used to run a job. In general, the more processors chosen, the less time it takes to complete a job. However, the detailed relationship between the number of processors chosen and job completion time may be complex. To a user whose main focus is getting a solution to their problem, having to understand these details presents a significant burden. The user is typically only interested in how long a job will take to complete, and how much it will cost.

Upon selection by the user, GUI 18 displays a processor selection panel that allows the user to request the number of processors to be allocated to a job. GUI 18 also provides a simple display that provides the user with direct insight into the completion time and cost of the job in relation to the number of processors allocated to it. GUI 18 displays a chart that clearly shows the relationship between job completion time and cost, versus the number of processors allocated to the job.

Figure 3:
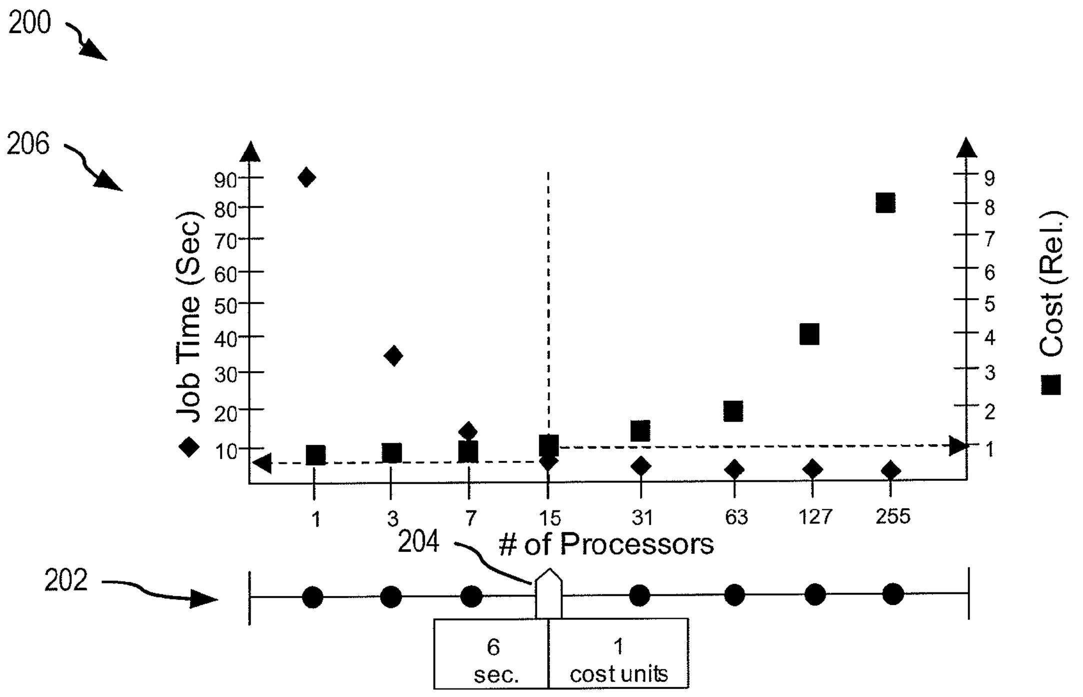
FIG. 3 shows a chart illustrating a relationship between job completion time and cost versus a number of processors allocated to the job where the job time reduces as the number of allocated processors increases.

One exemplary processor selection panel 200 is shown in FIG. 3. In particular, processor selection panel has a slider bar 202 type GUI object with a selector 204 that may be manipulated by the user to select the number of processors requested for the job. Processor selection panel 200 also shows a chart 206 that indicates projected job completion time versus the number of processors selected for the job, and job cost versus the number of processors selected for the job. Job completion time and job cost are drawn on separate vertical axes, and the number of processors is drawn on the horizontal axis. A numerical readout of the estimated job time and cost is attached below, and moves with, selector 204 on slider bar 202.

Chart 202 eliminates unnecessary detail while still providing the user with a clear, intuitive, view of the time vs. cost tradeoff. Annotating the chart with suitable symbols or text identifies the points of best value and performance. This simple, yet powerful, feature unburdens a user from the pedantic details of parallel processing and answers the two most important questions. How long will a job take, and how much will it cost? This allows a user to quickly and easily make informed decisions, and take informed actions, that fit their schedule and budget constraints.

Although chart 202 provides a complete view of the relationship between job time and cost versus the number of processors requested for the job, additional detail may be needed. As seen in FIG. 3, as the number of processors reaches the upper end of its range, the values of job time become increasingly difficult to resolve. This is precisely what is expected for efficient parallel processing systems that scale well. Ideally, as the number of processors increases the job times will become vanishingly small. However, in practice the job times are asymptotic, and job time will start increasing past the point where an application stops scaling.

Figure 4:
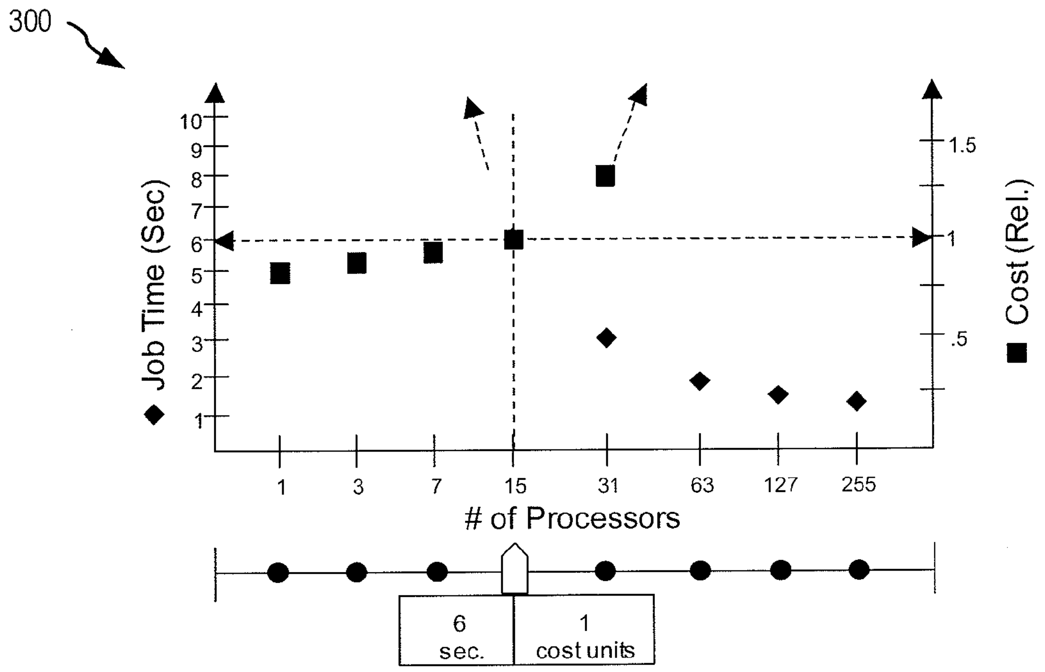
FIG. 4 shows a chart illustrating a relationship between job completion time and cost versus a number of processors allocated to the job where the job time increases due to poor scaling of the job.

GUI 18 allows the user to change the scale on the vertical axes. The same scaling factor is applied to both axes, thereby maintaining the relationship between time and cost. FIG. 4 shows a processor selection panel 300 based upon information of processor selection panel 200, FIG. 3, after scaling.

Figure 5:
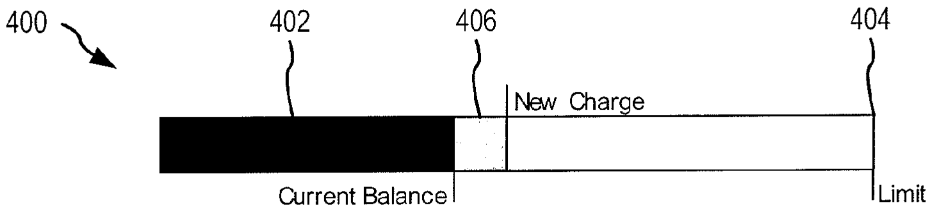
FIG. 5 shows a bar graph illustrating how the job will increase current charges to a users account.

GUI 18 may also provide a simple bar graph 400, shown in FIG. 5, that provides a relative indication of how the job will increase their current account charges. A first area 402 indicates a current account balance. A limit point 404 is defined when the account is created, or whenever the account is updated. The projected cost 406 of the job is appended to the current account balance 402, thereby providing a visual indication of account resource usage.

Many applications have a deterministic computational load that allows analytic methods to accurately estimate computational costs. Performance of these algorithms are measured when running with various processor counts, thereby taking into account the input and output datasets, the amount input data, the size of individual data elements being computed, and any application specific program parameters. By using actual performance data, performance estimates are dependable.

Where an application has a non-deterministic computational load that is not known apriori, statistical methods are used to estimate job time and cost. Again, these methods use performance information of the chosen application as measured on processors of the supercomputer facility 10, but certain assumptions must be made regarding the amount of computation that the job's input dataset might produce.

In this case, the worst-case amount of computation is estimated and an upper bound for the job completion time is generated, as well as, a not-to-exceed cost. Although this gives an overly pessimistic estimate in most cases, it prevents unpleasant surprises that could result in a disgruntled user.

In one example, job time and cost estimates take the overall operational costs, the number of processors used, and the amount of time that they are utilized into consideration. Other costing models may be applied to maintain a competitive pricing structure without departing from the scope hereof. The user is given a "good faith" estimate of how long it will take to run the job, and how much it will cost.

In order to further simplify the decision process, the interface provides two options to help select the number of processors. The "best value", and "best performance" options correspond to two choices that represent good tradeoffs between job completion time and cost. The tradeoff criteria are based on a measure of the parallel processing efficiency versus the number of processors. The "best value" option corresponds to largest cascade size where the parallel processing efficiency remains above 90 percent. The "best performance" option corresponds to the largest cascade size where the parallel processing efficiency drops below a predefined percentage. Going beyond this number has rapidly diminishing gains.

However, the suggestions for the number of processors provided by the method are advisory only and do not restrict the user from making other choices for the number of processors. The job time and cost associated with any choice are clearly indicated by GUI 18. The user is always in control.

Figure 6:
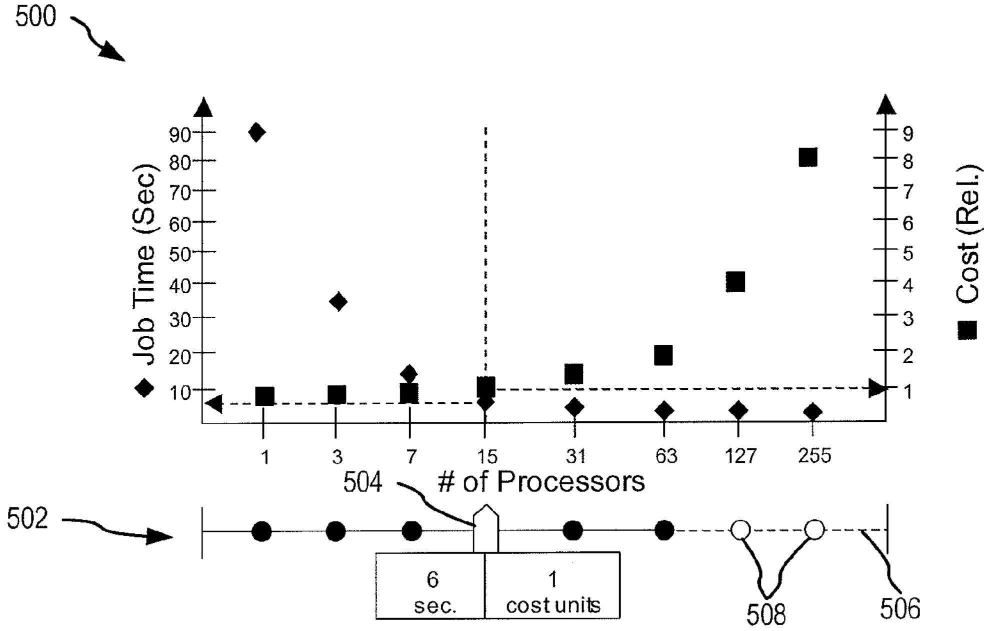
FIG. 6 shows a chart illustrating a relationship between job completion time and cost versus a number of processors allocated to the job where the number of available processors is limited.

In situations where a VPC becomes extremely busy, it's possible that the maximum number of processors the user is authorized to select is not currently available. FIG. 6 shows one exemplary panel illustrating a relationship between job completion time and cost versus a number of processors allocated to the job where the number of available processors is limited. A slider bar 502 has a selector 504 for selecting a number of processors requested for the job. Slider bar 502 is shown with a dashed line 506, and unfilled circles 508, along the portion of slider bar 502 corresponding to processor counts that exceed the number of processors currently available at the selected VPC 14.

GUI 18 also provides a very innovative method for increasing the number of processors allocated to a job after execution of the job has already started. As described in International Application Number PCT/US2005/016407, filed May 11, 2005, incorporated herein by reference, a job's complete context across a cascade of processors may be checkpointed, which allows the job to be restored to a larger, or smaller, cascade of processors.

Using this method to modify the number of processors allocated to a job proves particularly useful when the selected VPC is busy, and hence has fewer processors available than requested, and the user does not wish to change to, or does not have access to, another VPC. By selecting a deferred performance boost method, the user may specify a starting number of processors, and a final number of processors for the job. When a job is submitted using deferred performance boost method, the VPC starts the job as soon as the starting number of processors is available, and then, as more processors become available, checkpointing and restoring the job allows additional processors to be allocated to the job. By default, the job is checkpointed when enough processors become available to restore the job with the final number of processors. However, the user may select other options to choose when the job is checkpointed and restored as additional processors become available.

The user may also opt to allow GUI 18 to automatically choose when to increase the number of processors. By utilizing information, retrieved from the selected VPC 14, describing the execution profile for the jobs currently executing or scheduled for execution on the VPC, GUI 18 may project a sequence of performance boosts that tradeoff the time it takes to checkpoint a job and restore it on the next larger cascade increment versus the overall savings realized from running with more processors. The overall savings takes into consideration the projected rate at which additional processors will become available. If the time it takes to checkpoint and restore a job is less than the projected time to accumulate enough processors to reach an additional cascade increment, then an incremental increase will result in an overall improvement in performance.

Figure 7:
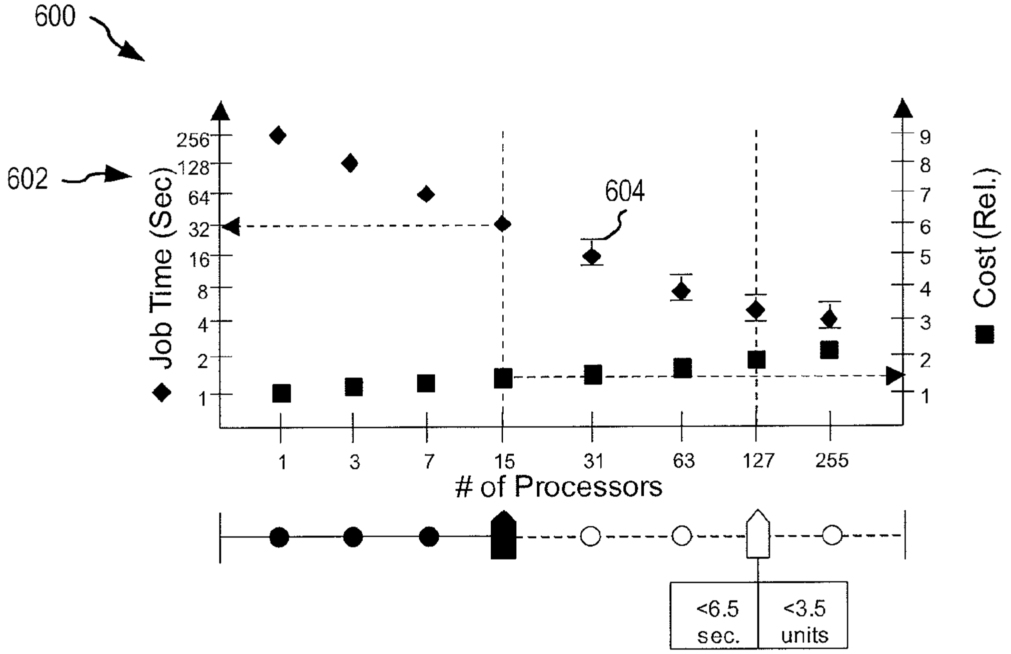
FIG. 7 shows a chart illustrating a relationship between job completion time and cost versus a number of processors allocated to the job where processors are allocated to a job as they become available.

The deferred performance boost method introduces some uncertainty in the job time and cost calculations. The MPT interface accommodates these uncertainties by expanding the job time and cost estimates into ranges that reflect the projected level of performance boost as a function of the number of processors. The method for estimating job time and cost automatically accounts for the estimated time to complete the jobs that are scheduled ahead of it. FIG. 7 shows a panel 600 with a chart 602 illustrating a projected relationship between job completion time and cost versus a number of processors allocated to the job where processors are allocated to a job as they become available (i.e., using the deferred performance boost method).

GUI 18 may also show an estimated time before processing will begin. Thus, if the user selects more processors than are currently available, the estimated time before processing begins indicated an estimated delay, which if too long, allows the user to reduce the number of processors to get an earlier start time, or to select another VPC.

Again, the user has a clear picture of the job time and cost tradeoffs as a function the number of processors selected to process the job. The user is given a definite not-to-exceed cost for running a job, as well as, a range for the estimated job time. This gives the advanced user an opportunity to obtain maximum benefit from supercomputer facility 10.

GUI 18 includes an option that allows the user to specify an input dataset. This option may be accessed through a pull-down menu item of menu 104. In one example of operation, the user selects the user selects the "Data input" item from the "File" pull-down of menu 104. A data input panel is then displayed allowing the user to specify a file containing the input dataset. The user may type the filename in directly, or use a "Browse" feature to find the file within a file system. Selecting the "Browse" feature accesses the operating system's graphical file system navigation tool. The user can browse through the file system to locate the input data file. Many applications require a set of input parameters to specify supported options. This is handled by including a script file with the input data file.

The data input panel may also includes an "Ok" and a "Cancel" button. Selecting the "Ok" button accepts the dataset and dismisses the data input panel. Selecting the "Cancel" button rejects the dataset selection and dismisses the data input panel.

Once the user has entered their selections, and is satisfied with the job time and cost estimates, selecting the "Start" button on the main panel starts the job. A status panel is created which indicates the job's status. Short, descriptive, text messages are displayed on the status panel to inform the user of the job's progress. In one example of operation, messages are displayed within the status panel to indicate when a connection has been established with the VPC, when the input dataset has been uploaded to the VPC, when the computation has begun, when the computation is complete and the output results are being downloaded to the user's machine, and when the job is complete. The overall progress may be indicated by a horizontal bar graph in the status panel. In addition, the estimated time to completion is displayed within the status panel in days, hours, minutes, and seconds format.

To satisfy a curious or impatient user, GUI 18 may provide additional detail on the job's progress. For example, if the user selects the "Details" button on the status panel, the status panel is extended to accommodate additional status information. This additional information shows a breakdown of the job's progress and gives an estimated time to completion for each step in the overall job sequence. This gives the user additional insight as to when an individual step will complete, relative to the overall job completion.

GUI 18 may also allow the user to launch multiple instances of an application concurrently, and if necessary to different VPCs, within the context of a single job. In one example, if a user wants to run an application with several different input datasets, instead of having to run these as separate jobs, the user may launch each input dataset to run concurrently. These may run on the same VPC if sufficient processors are available, or may run on other VPCs, as selected by the user. A major benefit of this feature is the additional computing resources made available to the user. This feature is, for example, accessed through a pull-down menu item of menu 104.

As the job completes and output datasets are returned to the user, GUI 18 may display these datasets (e.g., as filenames) on the main panel.

Price/Performance Model

Moore's law describes a relationship between hardware costs and performance. Amdahl's law describes a relationship between an algorithm and multiple chip speed-up effects. Moore's law and Amdahl's law may be combined with new communication models to maintain Moore's price/performance model.

Moore stated:

"The complexity for minimum component costs has increased at a rate of roughly a factor of two per year."

Originally, Moore's law was usually interpreted to mean "the number of transistors that can fit onto a square inch of silicon doubles every 12 months." However, Moore's statement covered much more than the density doubling discussed so often. This perspective is important if the law's life is to be extended using software.

Rather than a statement of raw density, this is instead a statement of the most cost effective chip manufacturing density, taking into consideration four factors:

1) the maximum number of transistors per square inch,
2) the size of the wafer,
3) the average number of defects per square inch, and
4) the costs associated with integrating multiple components (interconnection, packaging, PCB, other multi-chip integration costs).

A valid interpretation of Moore's cost and curve principal, showing Moore's results, is given by the following equation:

$$C_U=C_I(n_c)+f(n_f)(C_w n_c n_f A_f)/(P(n_f)A_w)$$

Where:

$C_U$=total cost per unit
$C_I$=chip integration cost per unit
$C_w$=wafer fabrication cost
$n_c$=number of chips per unit
$n_f$=number of features per chip
$A_f$=average feature area
$P(n_f)$=% yield for chips with $n_f$ features
$A_w$=size of wafer (area)
$f(n_f)$=percentage of $A_w$ covered by chips It is possible to relate the cost effective chip density to the number of features that can be placed upon a chip, or to the energy consumed by the chip and/or the chip clock rate. The idea of the number of features per chip is extended to include the idea that a feature is a structure that may transform a bit pattern. Since a mathematical algorithm performs a transform using the chip features, the ideas of transforms per unit time and algorithms may be associated.

If $n_f$ is fixed, then increasing the number of transforms per unit time requires an increase in the number of chips used (that is, the number of processors), according to the equation. When multiple processors are used, Amdahl's law may be applied.

Amdahl's law is a standard way of describing parallel speed-up. By deriving Amdahl's law directly from parallel communication and parallel information processing theory, communication channels, communication topology, and processor speeds each play roles in recasting the interpretation of the terms of the law. This demonstrates that a more in-depth interpretation of Amdahl's law requires coupling of communication and computation effects.

If communication overhead is given by:

$$\Omega=t_{\lambda 1}+t'_1+\Sigma \max((t'_{i,i+1}-t^1_{i+1}),0)+t_d$$

then Amdahl's law can be expressed as:

$$S(P)=(\Omega_{single}+t_p)/[\Omega_{multi}+t_c+T(t_p,P)/P]$$

Where:

$S(P)$≡Speedup of P processors (relative performance).
$\Omega_{single}$≡Single processor I/O overhead.
$\Omega_{multi}$≡Multi-processor I/O overhead.
$t_{\lambda 1}$≡initial communication latency.
$t_c$≡cross-communication data transfer time for current model
$t'_1$≡initial data priming time.
$t_d$≡data draining time.
$t'_{i,i+1}$≡cross communication data priming times.
$t_p$≡processing time on single processor.
$T(t_p,P)$≡processing time on P processors.
P≡number of processors.
$t^1_{i+1}$≡lead time from start of overlapped exchange to end of processing step i.

Figure 8:
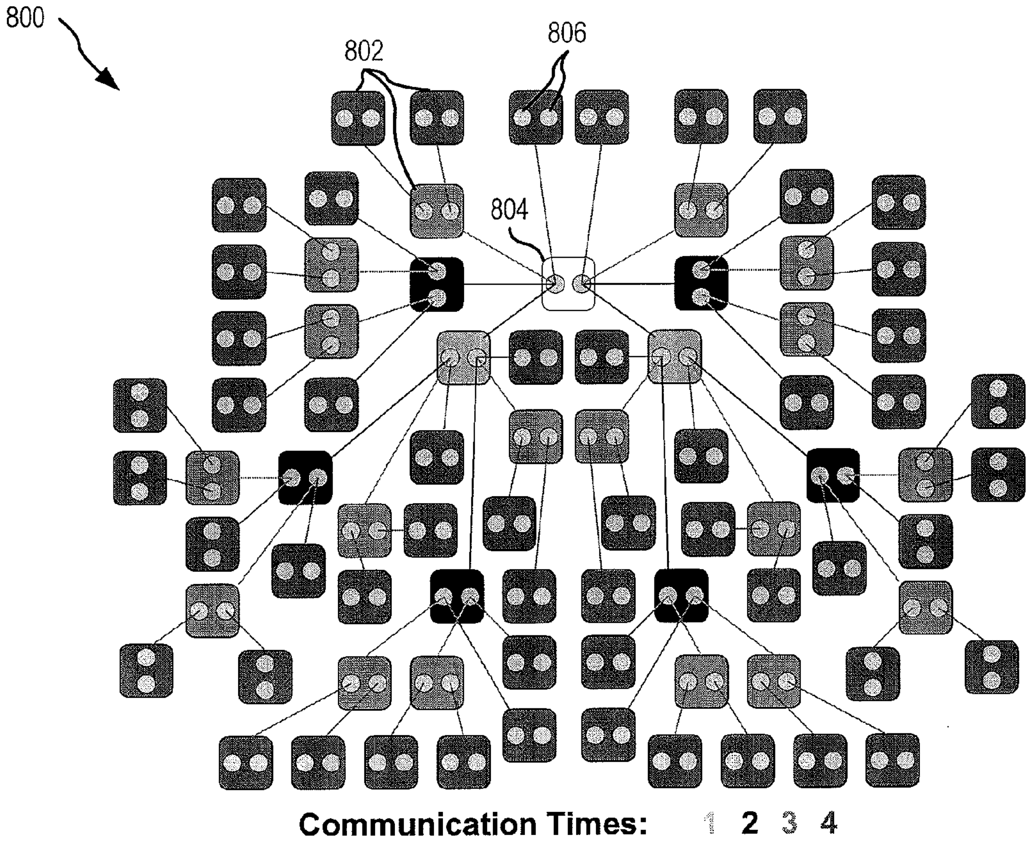
FIG. 8 shows one exemplary parallel processing system with 80 nodes, each node having two communication channels, illustrating a data scatter model that distributes data to all 80 nodes in four time steps.
Figure 9:
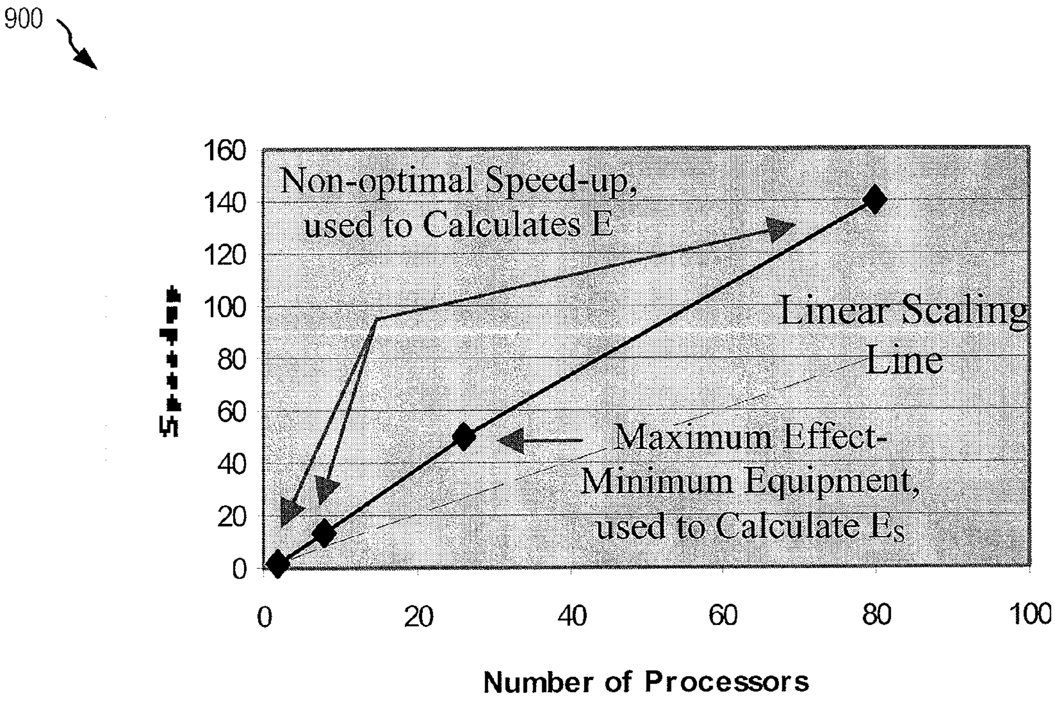
FIG. 9 is a chart illustrating an effect of using the data scatter model of FIG. 1B.

Combining the above Amdahl interpretation with several new communication models demonstrates how software can be used to extend the life of Moore's law. FIG. 8 shows one example of a logical scatter/gather model 800 with eighty processors 802, where each processor 802 has two communication ports 806. In model 800, data may be 'scattered' from a home node 804 (one of the eighty processors 802) to all other processors 802 in four communication steps. The bisection bandwidth is therefore equivalent to twenty times the individual processor port bandwidths, since data may be disseminated to all eighty processors 802 within model 800 in four communication time periods (where one period is the time taken to transfer the data from one processor to another). FIG. 9 shows a chart 900 illustrating the (end-to-end effect) speedup resulting within model 800. Software in this example consists of both the communication model and the algorithm used.

Moore's law may be expressed in terms of operations per second by defining a function $O(n_f,a)$ which defines the number of operations per second achieved by a processor with $n_f$ features on some algorithm a. Since this cost analysis applies to one processor, Moore's law may be extended to multi-processor systems with the aid of Amdahl's Law. The integration cost of a multi-processor system and the total system cost may be defined as:

$$CI(P)=P*N*(Cnic+C\text{fabric})$$

$$Cs(P)=PCU+CI(P)$$

Where:

CI(P)≡parallel integration cost

CS(P)≡total system cost

P≡number of processors

N≡number of channels per processor

Cnic≡interface cost per channel

Cfabric≡network fabric cost per processor

The effective cost performance factor for parallel systems then takes the form:

$$E=S(P)((PCU+CI(P))/(P*O(nf,a))$$

The optimized system cost ES may be defined as the minimum of E with respect to P. This is the minimum cost needed to achieve a performance level given the hardware and software characteristics of a system and the algorithm it is operating on.

Figure 10:
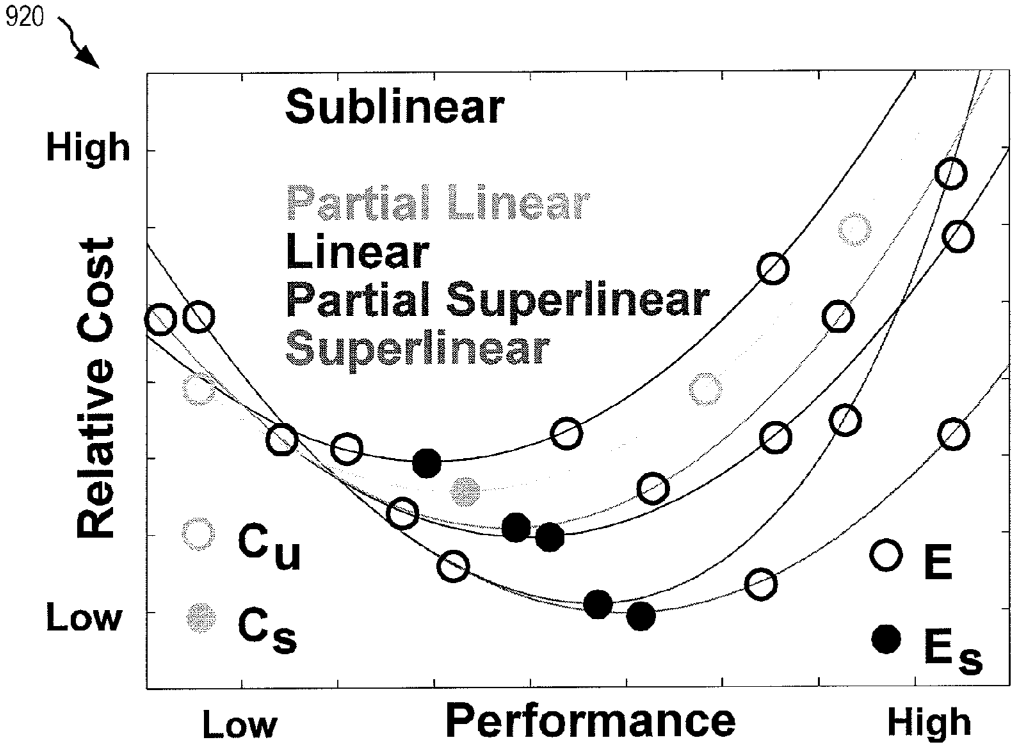
FIG. 10 is a chart illustrating change of price performance ratio with different communication models.
Figure 11:
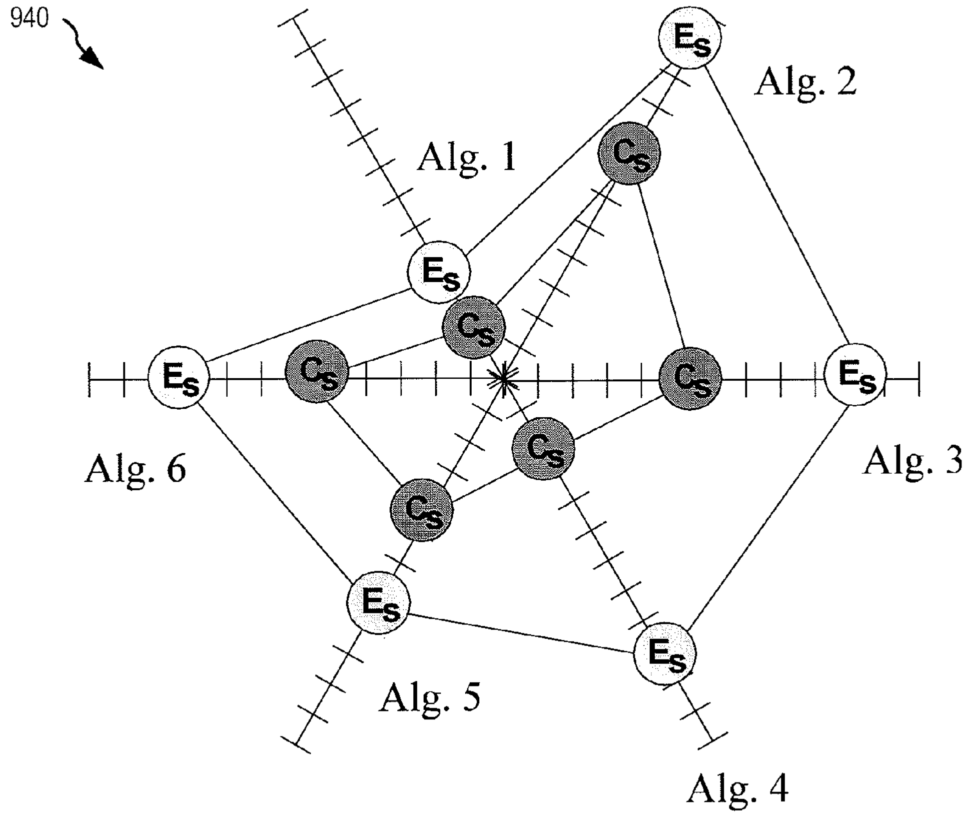
FIG. 11 is a Kiviat diagram illustrating one representation of system performance for a mixed problem.

FIG. 10 shows a modified Moore cost performance chart 920. By fixing the optimized hardware cost, the price/performance ratio may be changed by using different communication models and different numbers of processors appropriate to a particular algorithm (E). Any adjustment which moves the cost curve to the right and/or down, such as shown by $E_S$, represents an effective hardware performance improvement. FIG. 11 shows a Kiviat diagram 940 representing system performance for a mixed problem based upon $E_S$ for several algorithms and dataset sizes.

Methods for Performing Overlapped Input and Output

As shown above, communication forms a major part of the cost in parallel processing systems. To improve communication speed where data is distributed to multiple nodes, input and output within each node may be overlapped. There are two types of overlapped I/O; a first type where data input overlaps with data output, and a second type where data input, data output, and data processing overlap.

A standard broadcast exchange incurs one latency time unit and one communication time unit to exchange the data. Since a broadcast exchange does not guarantee the receipt of the data by all participants, a message passing interface (MPI) of a tree-broadcast exchange will be analyzed together with a cascade exchange.

Standard Broadcast Exchanges

Figure 12:
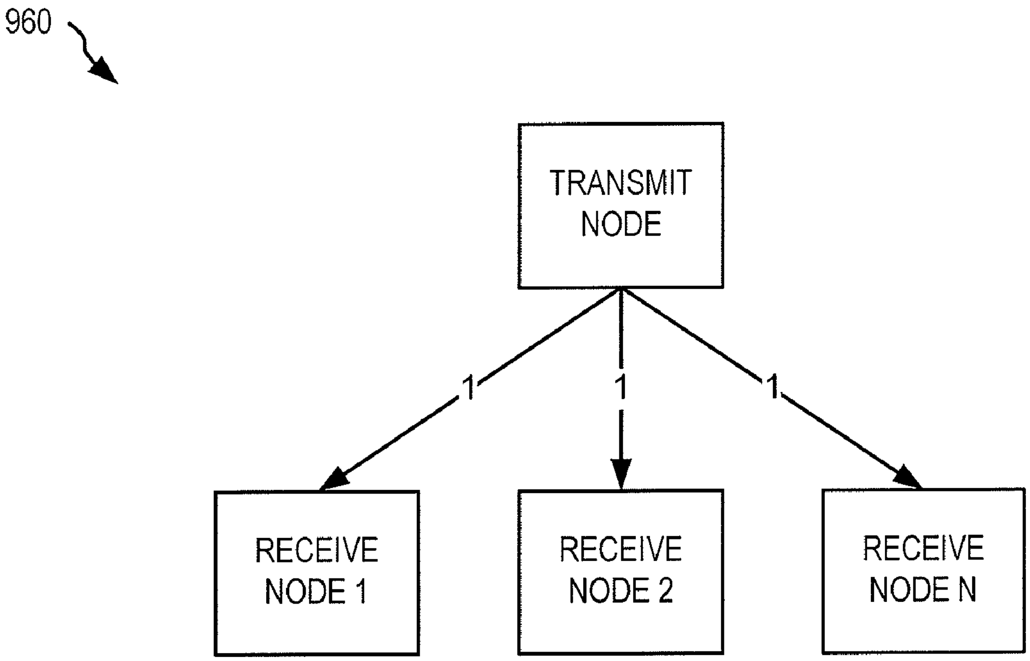
FIG. 12 is a flowchart illustrating a time unit during a Broadcast Exchange, in one embodiment.

A broadcast exchange is used in two completely different scenarios. The first scenario is to simply move data from one node to multiple nodes, while the second scenario is as a component of an all-to-all broadcast exchange. The standard Broadcast exchange performs the following two actions:

1) Identify all nodes that are to receive the data;
2) Transmit a message from one node to all receiving nodes in one data exchange time step, as shown in FIG. 12 and described by Equation 1. Broadcast Exchange Time.

In FIG. 12, the number shown on each communication path represents the time unit during which data transfer occurs. In practice, true broadcasts are generally avoided, since they tend to use unreliable protocols, or require special hardware assistance to achieve reliability. However, the concept of a broadcast forms a good basis for comparing the performance of other communication models. An equation that describes the amount of time it takes to move the data from the transmit node to all of the receive nodes is:

$$T_{broadcast}=D/b \qquad \text{Equation 1. Broadcast Exchange Time}$$

Where:

D≡the number of bytes to transmit b≡the bandwidth of the connecting channel

Equation 1 is true because the standard broadcast exchange is only defined for a single point-to-point communication channel. The broadcast exchange, although efficient, is rarely used because it does not guarantee that the messages are received by all of the receive nodes. For example, if a receive node is not listening when the broadcast occurs, the data will be missed by that node.

Figure 13:
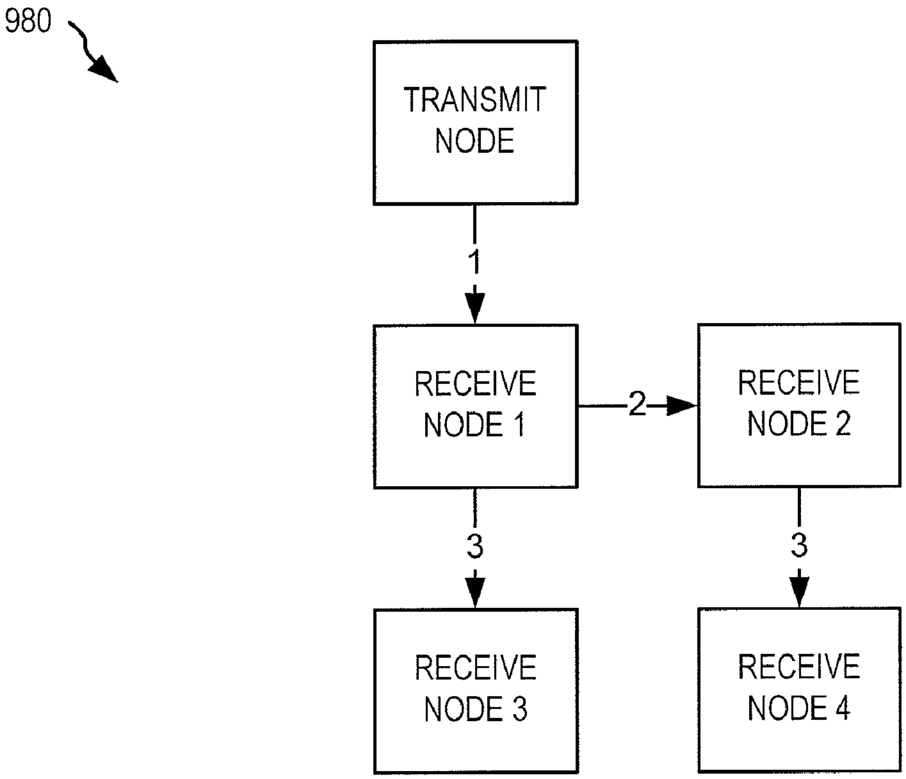
FIG. 13 is a flowchart illustrating a MPI Tree Broadcast Exchange, in one embodiment.

A Message Passing Interface (MPI) based tree broadcast provides one mechanism whereby a guaranteed data transfer occurs. A binary-tree communication pattern is shown in FIG. 13 and timing is given by Equation 3 below.

The exchange shown above performs the following actions:

1) Build a point-to-point connection between the transmit node and the first receive node
2) transmit the data the receive node
3) Build a point-to-point connection between the upper level receive node(s) to the lower level receive nodes
4) repeat steps 2 and 3 until the tree is complete The equation that describes the amount of time it takes to move the data from the transmit node to all of the receive nodes is given by:

$$T_{tree\text{-}broadcast}=D(\phi-1)/b_{full} \qquad \text{Equation 2. MPI Tree Broadcast Exchange Time}$$

Where:

ϕ≡the number of tree expansion times $b_{full}$≡the bandwidth of the full duplex connecting channel Note: For MPI Tree Broadcast Exchange times ϕ starts with zero.

$$N=2^{\phi} \qquad \text{Equation 3. Binary-Tree Expansion Rate}$$

Therefore:

$$\phi=\log 2N \qquad \text{Equation 4. Binary-Tree Time Multiplier}$$

where:

N=the number of receive nodes

Although the MPI Tree Broadcast Exchange (MTBE) can guarantee that the exchange completes, it does so with a large cost, the effect is to multiply the dataset size by (ϕ−1). Overlapped communication is shown in configuration 1000 of FIG. 14.

Figure 14:
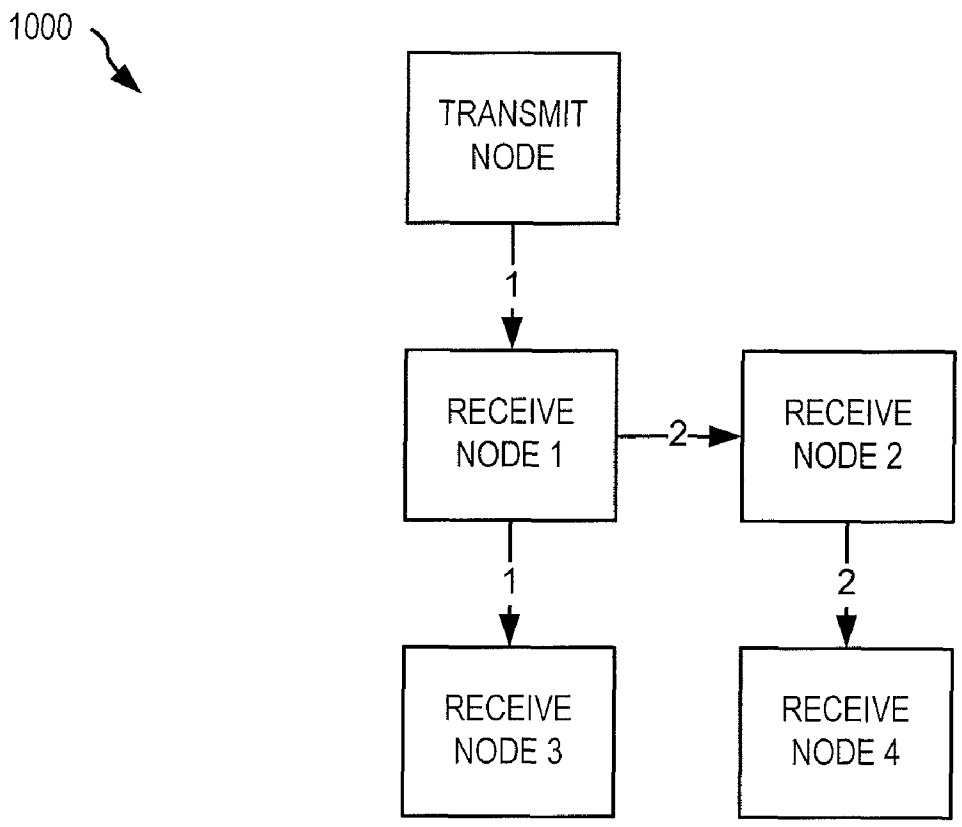
FIG. 14 is a flowchart illustrating a partially overlapped MPI Tree Broadcast Exchange.

In order to fully understand FIG. 14, analysis is required of the data movements from the Transmit Node to Receive Node 1 and from Receive Node 1 to Receive Node 3. In addition, analysis is required of the data movement from Receive Node 1 to Receive Node 2 and Receive Node 2 to Receive Node 4. Note: Receive node 1 does not transmit to Receive node 2 until after Receive node 1 transmits to Receive node 3.

Figure 15:
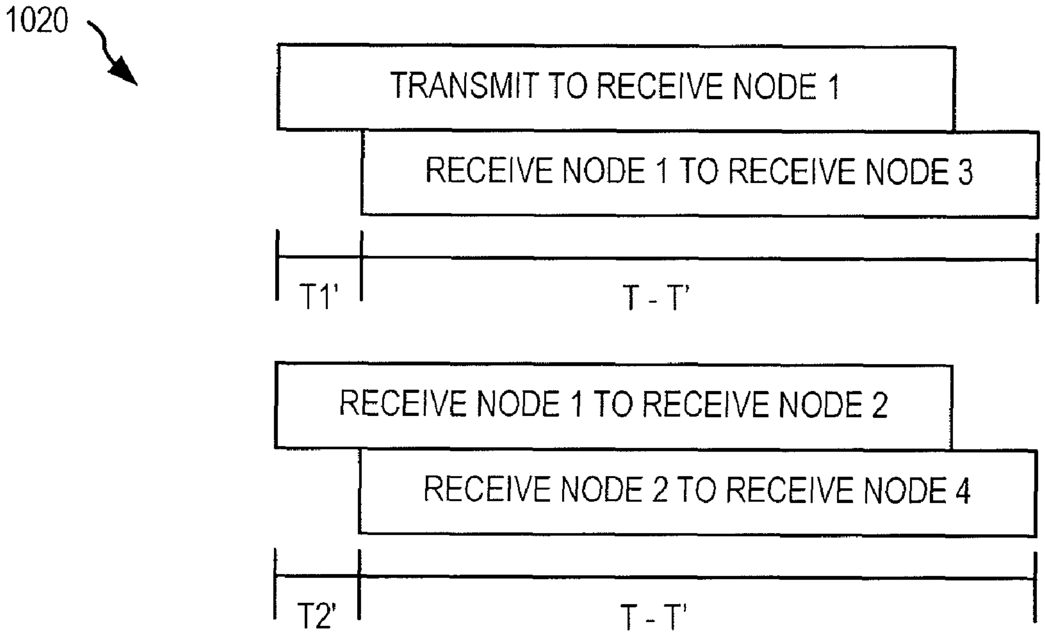
FIG. 15 shows a timing diagram illustrating that when data is transmitted from the Transmit Node to Receive Node 1 it takes T time units to move the data.
Figure 16:
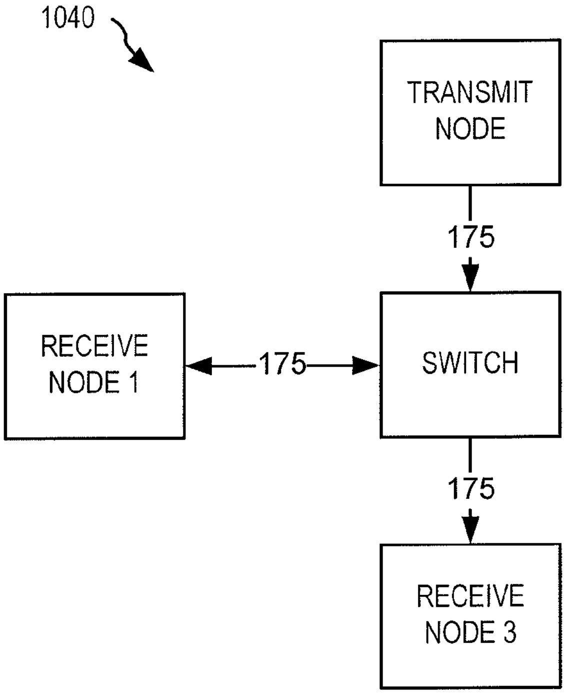
FIG. 16 shows an exemplary switching fabric with an example subnet address used to perform this data transfer.

FIG. 15 shows a timing diagram 1020 illustrating that when data is transmitted from the Transmit Node to Receive Node 1 it takes T time units to move the data. It takes a small amount of time to send the received data back through the same channel (full duplex) such that it is received by Receive node 3. FIG. 16 shows an exemplary switching fabric 1040 with an example subnet address used to perform this data transfer.

This means that switching fabric 1040 as shown in FIG. 16 takes T+T1' time units to complete. Since moving data from Receive Node 1 to Receive Node 2 to Receive Node 3 is analogous it will take T+T2' time units to complete. So, configuration 1000 of FIG. 14 takes:

$$TPO\text{-}MTBE=T+T1'+T+T2'$$

Since T1'=T2' if let T1'=T' then this gives:

$$TPO\text{-}MTBE=2T+2T'$$

Thus:

$$T_{PO\text{-}MTBE}=T'D\phi/b_{full}$$ Equation 5. Partially Overlapped MTBE Time Since T' is negligible this gives:

$$T_{tree\text{-}broadcast}>T_{PO\text{-}MTBE}$$

Although this is better it is clear that even better performance is possible.

Partially Overlapped Single Channel Cascade Broadcast (SCCB)

Figure 17:
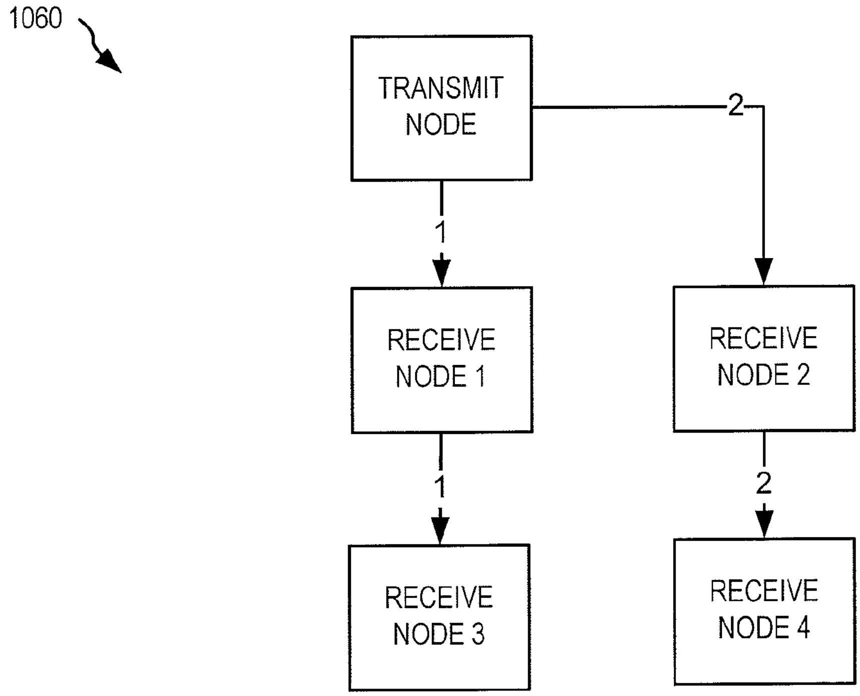
FIG. 17 shows one exemplary configuration for a partially overlapped single channel cascade broadcast.
Figure 18:
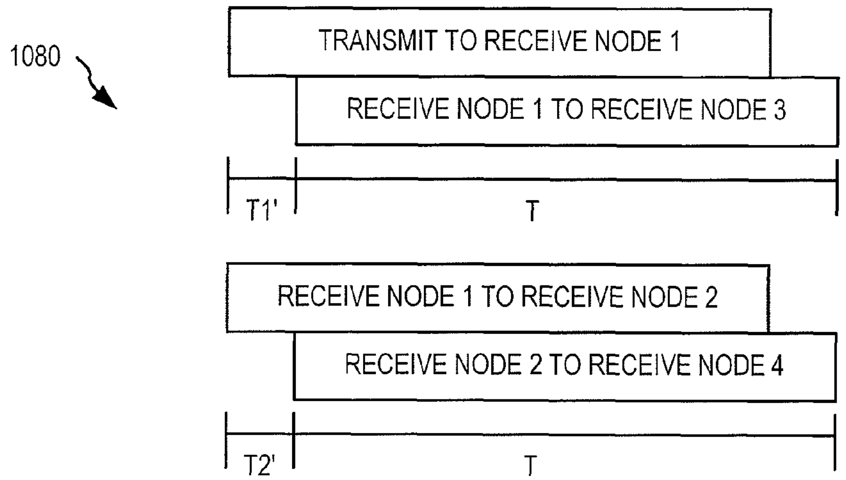
FIG. 18 shows a timing chart illustrating timing for the configuration of FIG. 17.

FIG. 17 shows a configuration 1060 for a partially overlapped single channel cascade broadcast, which although faster than the MPI-Tree Broadcast is very similar in structure. As with MTBE this translates into a timing chart 1080 shown in FIG. 18.

As can be seen in FIG. 15, the timing of the partially overlapped SCCB is exactly the same as it is for the partially overlapped MTBE. In order to increase performance for both MTBE and SCCB, a fully overlapped single channel model is needed. So configuration 1060 of FIG. 17 takes:

$$TPO\text{-SCCB}=T+T1'+T+T2'$$

Since T1'=T2', let T1'=T' to give:

$$TPO\text{-SCCB}=2T+2T'$$

Thus:

$$T_{PO\text{-}SCCB}=T'D\phi/b_{full}$$ Equation 6. Partially Overlapped MTBE Time Since T' is negligible this gives:

$$T_{tree\text{-}broadcast}>T_{PO\text{-}MTBE}$$

Fully Overlapped Single Channel Model (FOSCM)

Figure 19:
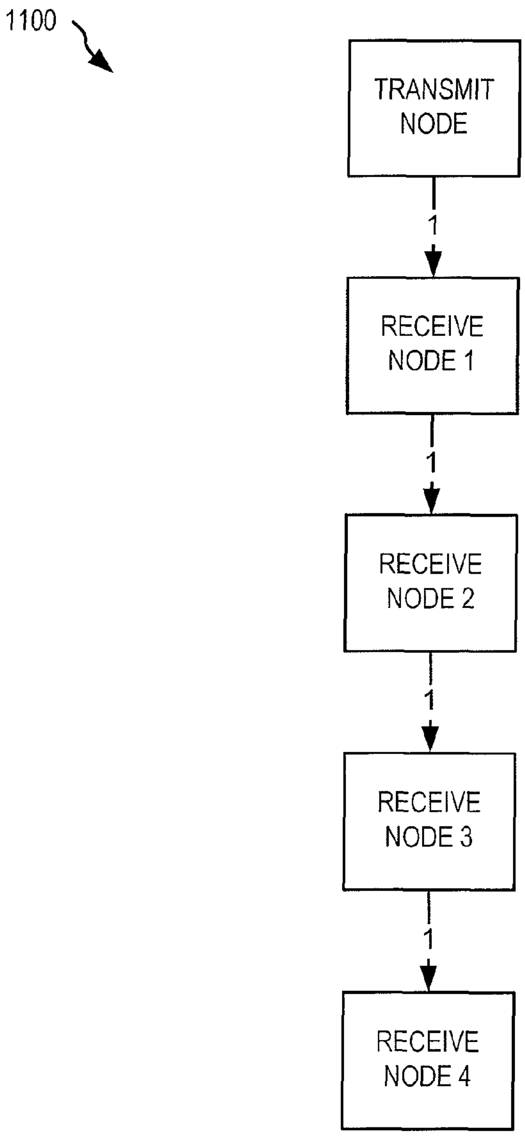
FIG. 19 shows a linear structure produced from overlapping the I/O of single channel tree and cascade structures.

Overlapping the I/O of single channel tree and cascade structures produce a linear structure 1100, as shown in FIG. 19. Linear structure 1100 shows that each node transmits its data as soon as it can after receiving data from the level above it. All data transmissions with the exception of the first and last data transmission are accomplish in full duplex mode.

Figure 20:
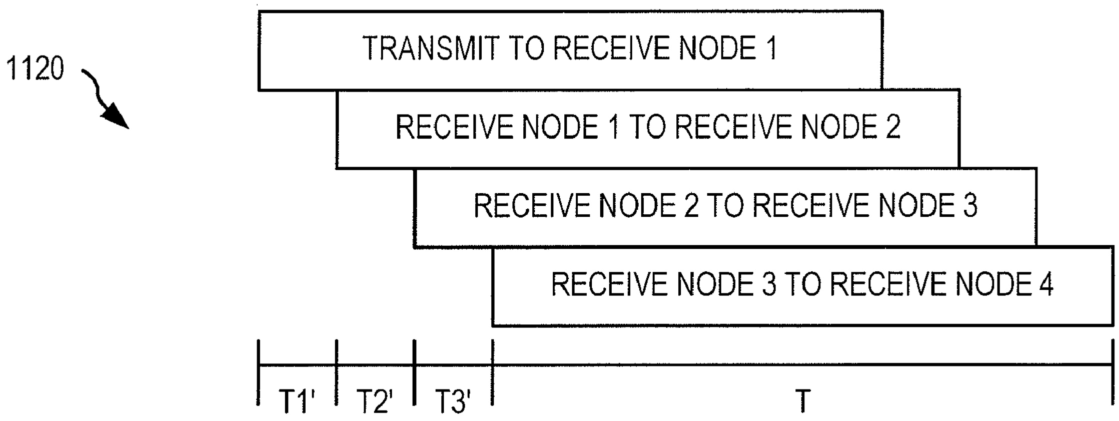
FIG. 20 shows a timing chart illustrating timing of the linear structure of FIG. 19.

As shown in timing chart 1120 of FIG. 20, linear structure 1100 of FIG. 19 takes:

$$T_{LS\text{-}FOSCM}=T+T_1'+T_2'+T_3'$$

Since $T_1'=T_2'=T_3'$ then assuming $T_1'=T'$ this gives:

$$T_{LS\text{-}FOSCM}=T+3T'$$

Figure 21:
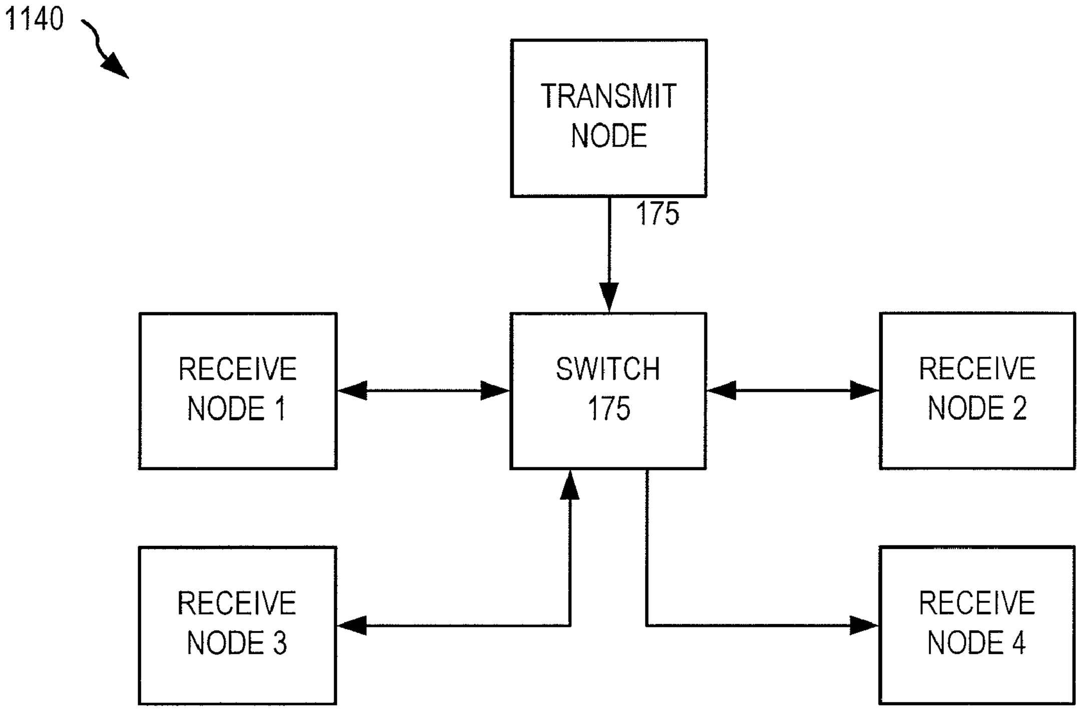
FIG. 21 shows an exemplary switching fabric for the linear structure of FIG. 19.

FIG. 21 shows an exemplary switching fabric 1140 for the linear structure 1100 of FIG. 19, illustrating connectivity between nodes to perform this data transfer. Of note, receive nodes 1, 2 and 3 each utilize a full duplex channel connection to the switch.

The general equation for the linear structure for LS-FOSCM is given by:

$$T_{Ls\text{-}FOSCM}=[T'(N-1)+T]/b_{full}$$ Equation 7. Linear FOSCM Timing

Where:

N≡the number of receive nodes Iff N≧1

Analysis of Node Level Threads and Data paths

Figure 22:
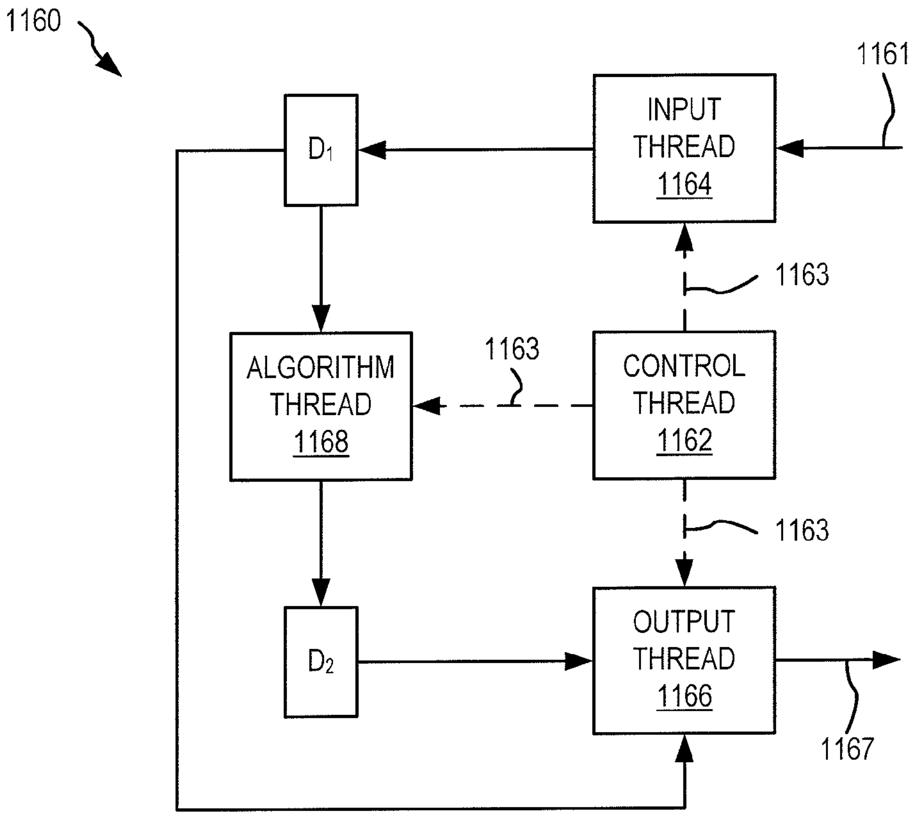
FIG. 22 shows exemplary data paths and threads for the Receive Node 1 of FIG. 21.

In order to achieve the LS-FOSCM multiple threads may be implemented within a node. FIG. 22 shows exemplary data paths and threads for Receive Node 1 of FIG. 21.

The control thread 1162 creates 1163 each of an input thread 1164, an output thread 1166 and an algorithm thread 1168. Data is received 1161 by input thread 1164 and saved in a data storage area $D_1$. This data may then follow two paths; the pass-through data path and the processed data path. For the pass-through data path, control thread 1162 informs output thread 1166 that data for output is to arrive 1163 from D1. This means that T' is equal to the time it takes to both activate output thread 1166 and for output thread 1166 to start transmitting 1167 data. For the processed data path, control thread 1162 first activates algorithm thread 1168 and then waits to allow enough time such that an appropriate amount of data has been processed by algorithm thread 1168 and stored in a data storage area $D_2$, prior to transmitting the processed data. Once there is sufficient data in $D_2$, control thread 1162 activates output thread 1166 to use $D_2$ as its data source.

Output thread 1166 utilizes the following information from the control thread:

1) Data location

2) Destination node

Data storage locations $D_1$ and $D_2$ may be either a file, or a location within memory; the data location is thereby identified as a file or a memory location. Adequate storage should be available at the data location to save the maximum dataset size that is to be stored prior to transmission.

TABLE 1

Round-robin Data Storage Method

| | 1 | 2 | ... | n |
|---|---|---|---|---|
| 1 | Start | | | |
| 2 | | | | |
| ... | | | | |
| n | | | | End |

In one embodiment, a round-robin data storage method starts receiving data at the start location. It continues receiving data until the end location is stored. The next location stored after the end location is the start location again. Because the data storage area is continuously reused, and further since the results are transmitted continuously it is possible (Using the round-robin data storage method with the LS-FOSCM) to increase the amount of total data that a single problem can have.

To ensure that the overlapped timing is as predicted by Equation 5 and Equation 7, the communication connections to all possible output destination node addresses must be pre-staged.

TABLE 2

Multiple Communication Channel, Multiple Destination Node Address Table

| Destination Node Address Channel 1 | Destination Node Address Channel 2 | Destination Node Address Channel n |
|---|---|---|
| Address 1 | Address 1 | Address 1 |
| ... | ... | ... |
| Address n | Address n | Address n |

Pre-staging the output destination node addresses means that all of the connections required to communication to the node in question are setup before they are used. For example if the communication technology is TCP/IP then all of the required bindings etc. are done at system start. The channel is not released until system shutdown. Pre-staging eliminates the overhead of constructing a communication channel.

Multiple Communication Channels

There are five general types of fully overlapped multiple channel models. They are:

1) Multiple transmit node channels single receive node channel.
2) Multiple transmit node channels, multiple receive node channels. Transmit and receive channels equal in number.
3) Multiple transmit node channels, multiple receive node channels. The number of transmit channels is greater than the number of receive channels. The number of transmit channels are an even multiple of the number of receive channels.
4) Single transmit node channel, multiple receive node channels.
5) Multiple levels of transmit nodes with multiple channels, multiple receive node channels.

Multiple Channel Type 1

Figure 23:
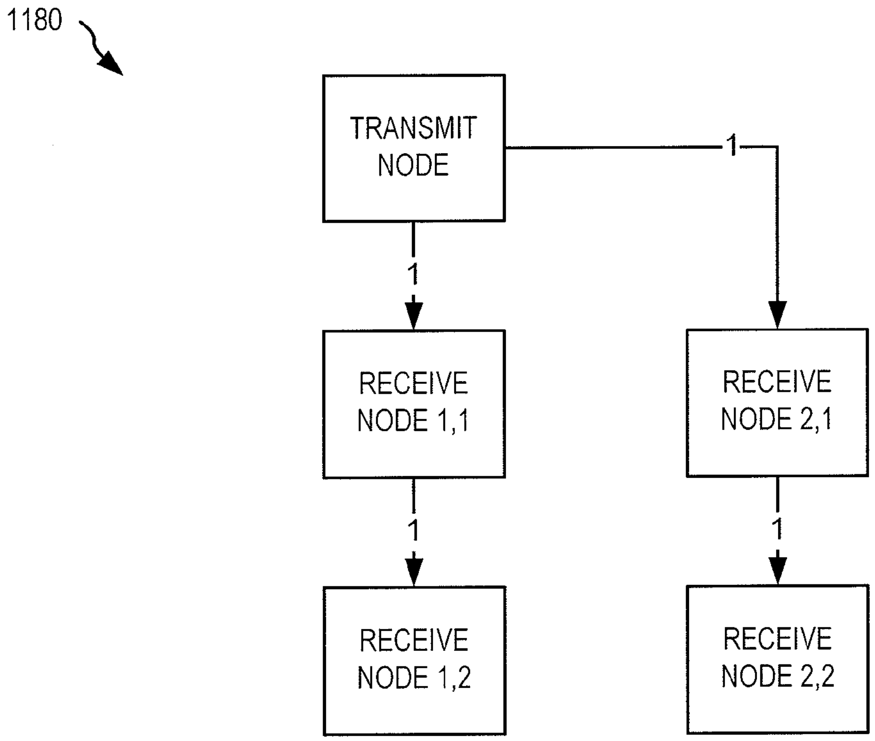
FIG. 23 shows one exemplary configuration where the transmit node has two communication channels and each receive node has one communication channel.

Referring to configuration 1100 of FIG. 19, if the transmit node has two communication channels and all of the receive nodes each have only one communication channel, a configuration 1180 may be formed, as shown in FIG. 23.

In configuration 1180, each node transmits its data as soon as it can after receiving data from the level above it. All data transmissions with the exception of the first and last data transmission are accomplish in full duplex mode. Having multiple channels at the transmit node level divides the number of T' time units by the number of transmit node channels.

Figure 24:
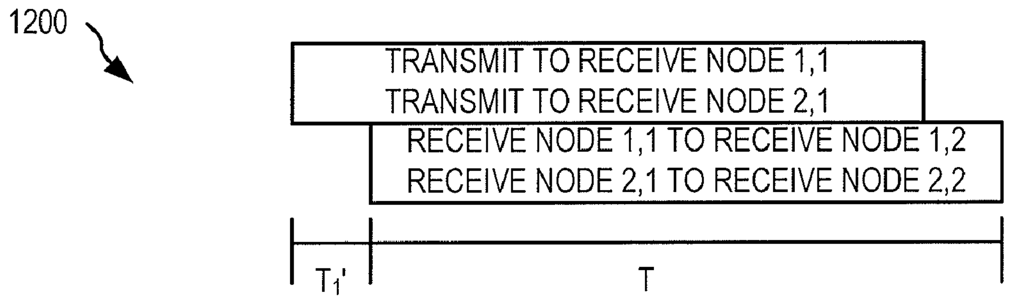
FIG. 24 shows a timing diagram for the configuration of FIG. 23 and illustrating that the number of latency time units has decreased from 3 to 1.

As can be seen in a timing diagram 1200 of FIG. 24, the number of latency time units has decreased from 3 to 1 while the number of receive nodes has gone from 5 to 4. This means that on a per node basis, the latency is reduced from 5/3 to 4/1 and since 4>1.7 the type 1 multiple channel method has the advantage.

So, for configuration 1180 of FIG. 23:

$$T_{MTNSRN}=T+T_1'$$

If $T_1'=T'$ then this gives:

$$T_{MTNSRN}=T+T'$$

$$T_{MTNSRN}=[T'(N-1)+T]/\nu b_{full}$$

Equation 8. Multiple Channel Type 1 Timing

Where:

ν≡number of channels per transmit node

Figure 25:
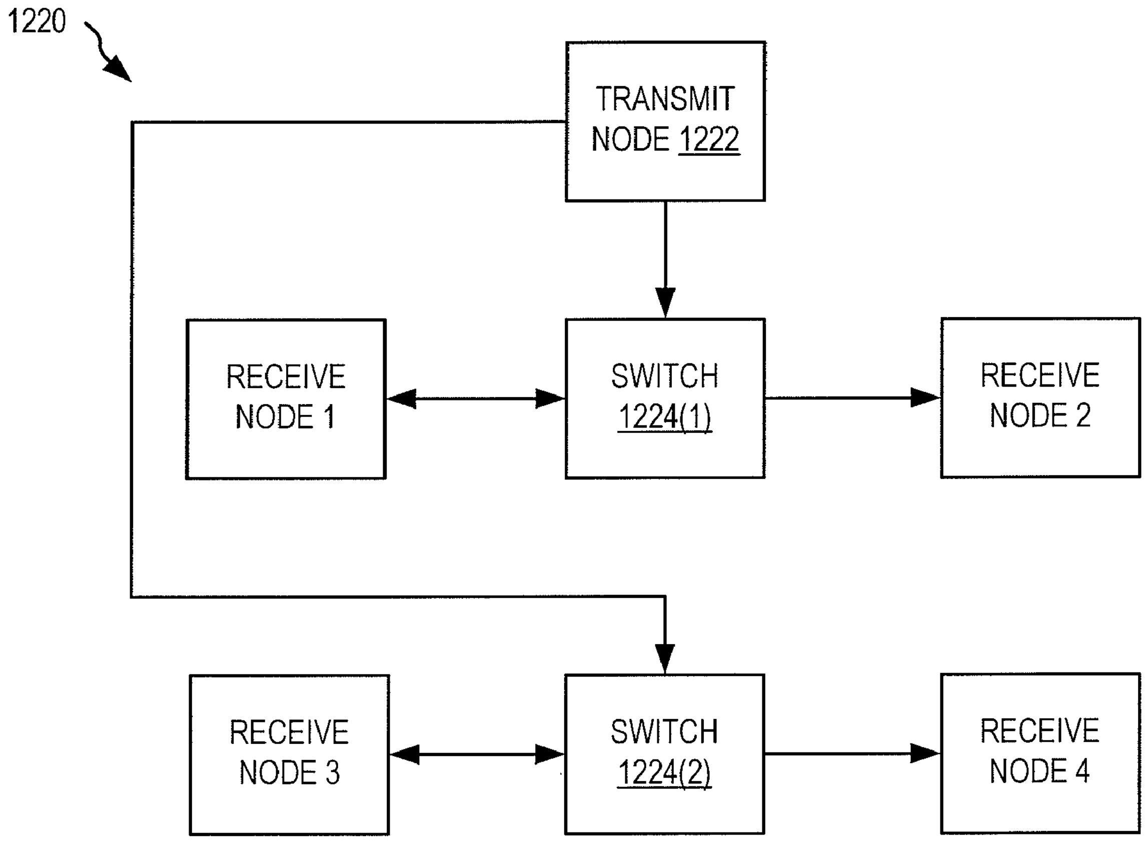
FIG. 25 shows one exemplary switching fabric based upon the configuration of FIG. 23.

FIG. 25 shows one exemplary switching fabric 1220 based upon configuration 1180 of FIG. 23. A transmit node 1222 connects to two switches 1224(1) and 1224(2). Switch 1224(1) connects to a receive node 1 and a receive node 2; switch 1224(2) connects to a receive node 3 and a receive node 4.

Figure 26:
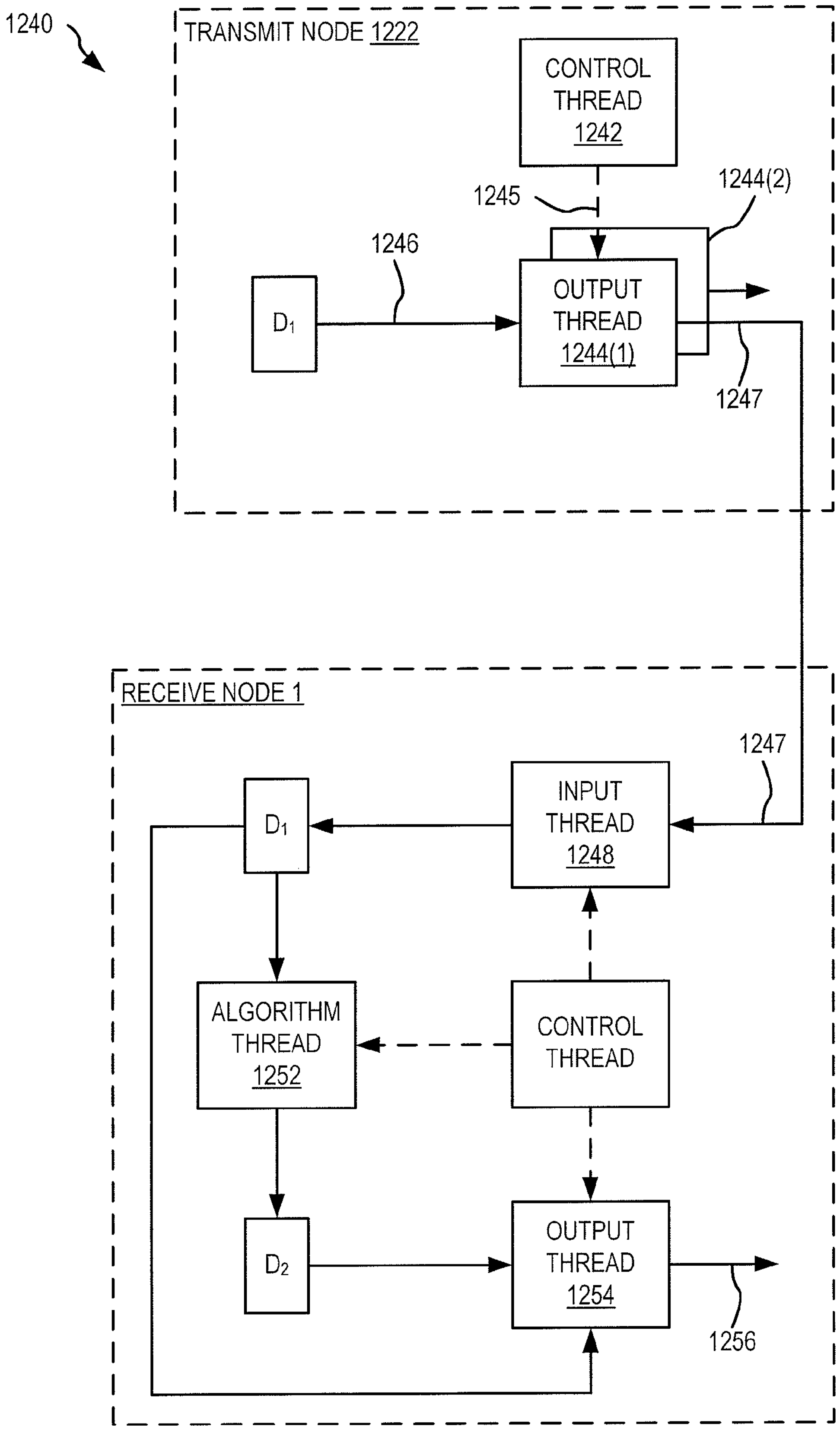
FIG. 26 shows the thread level interaction between the transmit node and the receive node 1 of FIG. 25.

FIG. 26 shows the thread level interaction between transmit node 1222 and receive node 1 of FIG. 25. As shown, transmit node 1222 has a control thread 1242 and two output threads 1244(1) and 1244(2). Output thread 1244(1) is shown transmitting 1247 data to an input thread 1248 of receive node 1. Similar to operation of FIG. 22, input thread 1248 stores the input data within a data storage location $D_1$ and notifies an output thread 1254 to transmit 1256 the data from $D_1$. An algorithm thread 1252 may then be started to process at least part of the data stored in $D_1$ into $D_2$, which in turn may be output by output thread 1254.

Multiple Channel Type 2

Figure 27:
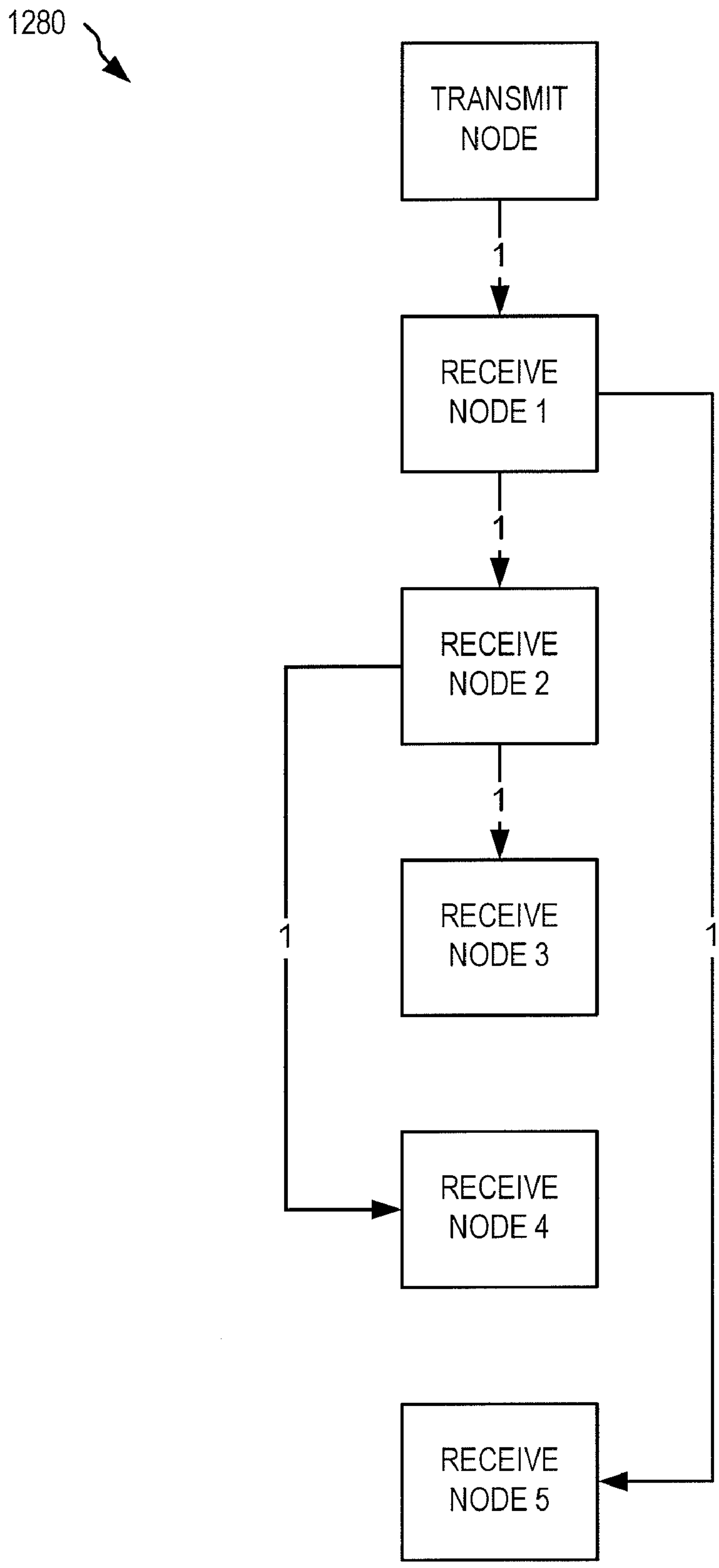
FIG. 27 shows one exemplary configuration where a transmit node has only a single channel and each of the receive nodes has multiple channels.

FIG. 27 shows one exemplary configuration 1280 where a transmit node has only a single channel and each of the receive nodes has multiple channels. Each node transmits its data as soon as it can after receiving data from the level above it. All data transmissions with the exception of the first and last data transmission are accomplish in full duplex mode.

Figure 28:
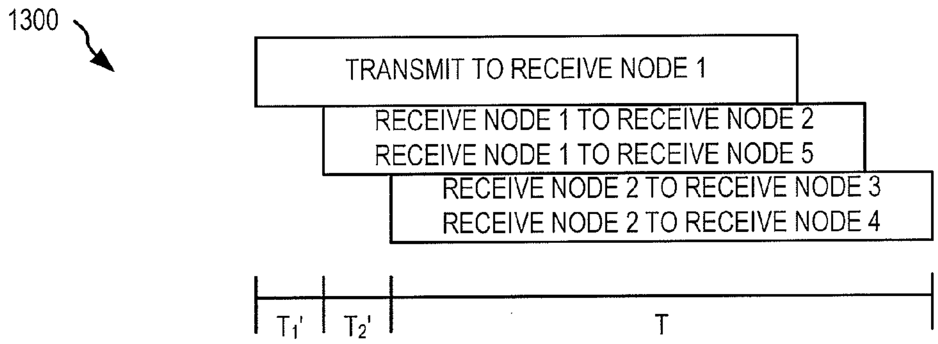
FIG. 28 shows a timing chart based upon the configuration of FIG. 27 and illustrating that adding additional channels to the receive nodes only gives about half of the effect of additional transmit node channels.

FIG. 28 shows a timing chart 1300 based upon configuration 1280 of FIG. 27 and illustrating that adding additional channels to the receive nodes only gives about half of the effect of additional transmit node channels.

$$T_{STNMRN}=T+\phi T'$$

Equation 9. Multiple Channel Type 2 Timing

Figure 29:
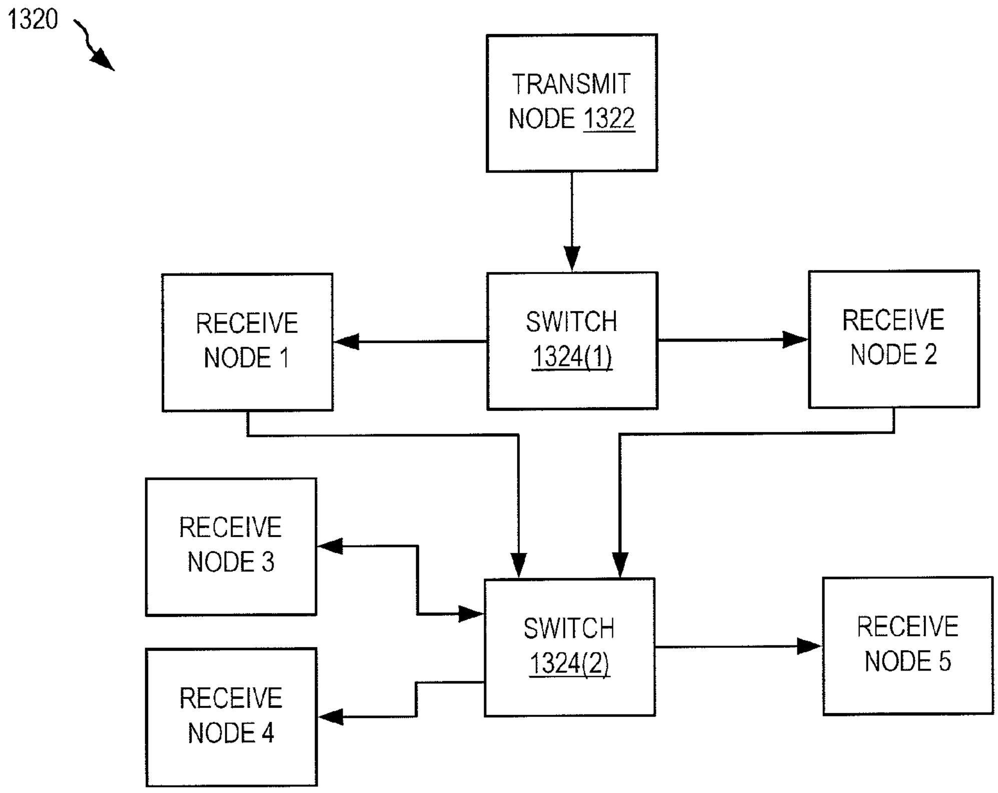
FIG. 29 shows one exemplary switching fabric based upon the configuration of FIG. 27.

FIG. 29 shows one exemplary switching fabric 1320 based upon configuration 1280 of FIG. 27 and showing transmit node 1322, receive nodes 1 and receive node 2 connected to a first switch 1324(1) and receive nodes 3, 4 and 5 connected to a second switch 1324(2) that is also connected to receive nodes 1 and 2.

Multiple Channel Type 3

Figure 30:
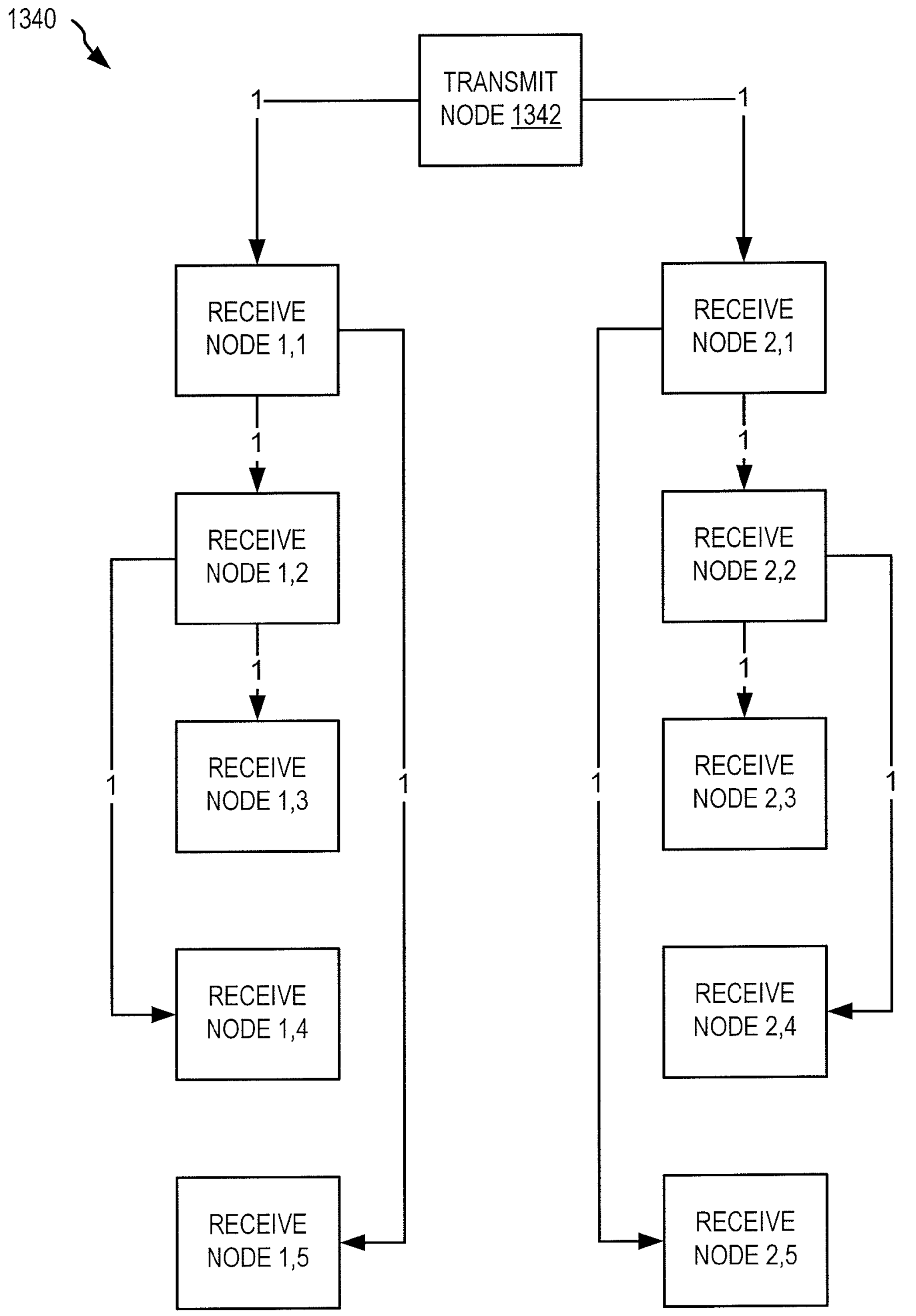
FIG. 30 shows one exemplary configuration where a transmit node and each of receive node has the same number of channels.
Figure 31:
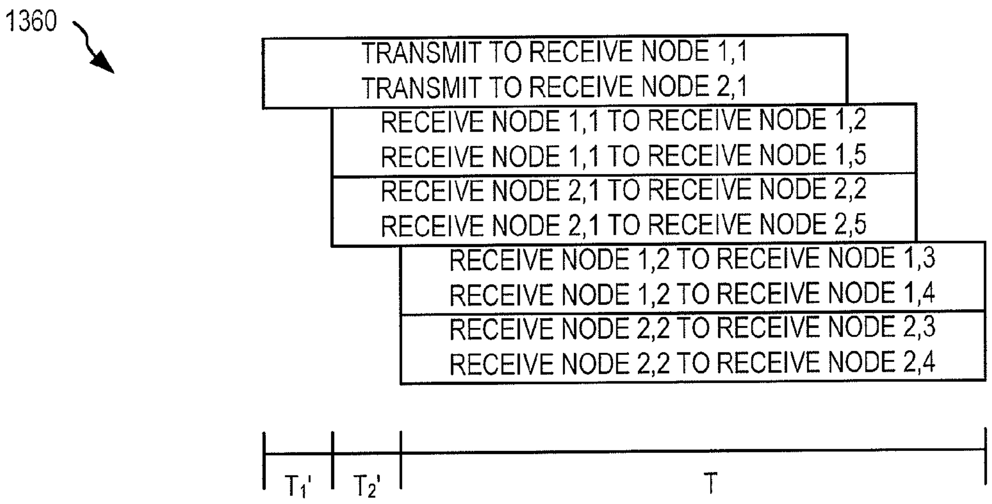
FIG. 31 shows a timing diagram for the configuration of FIG. 30.
Figure 32:
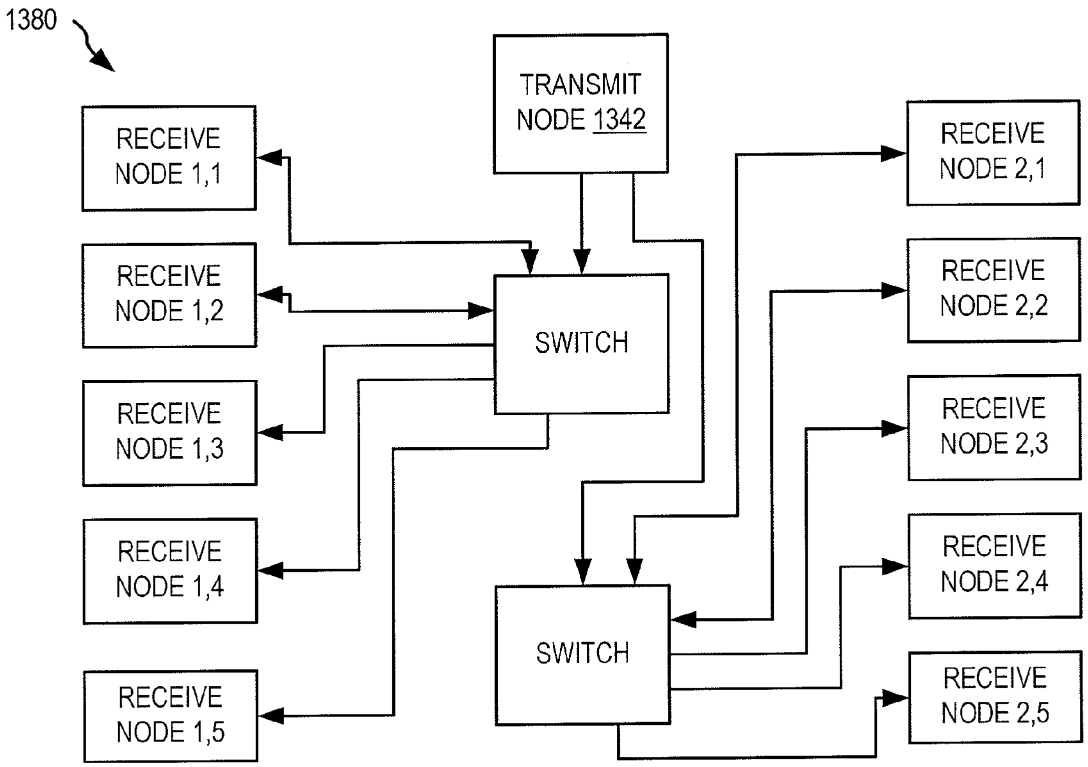
FIG. 32 shows an exemplary switch fabric for the configuration of FIG. 30.
Figure 33:
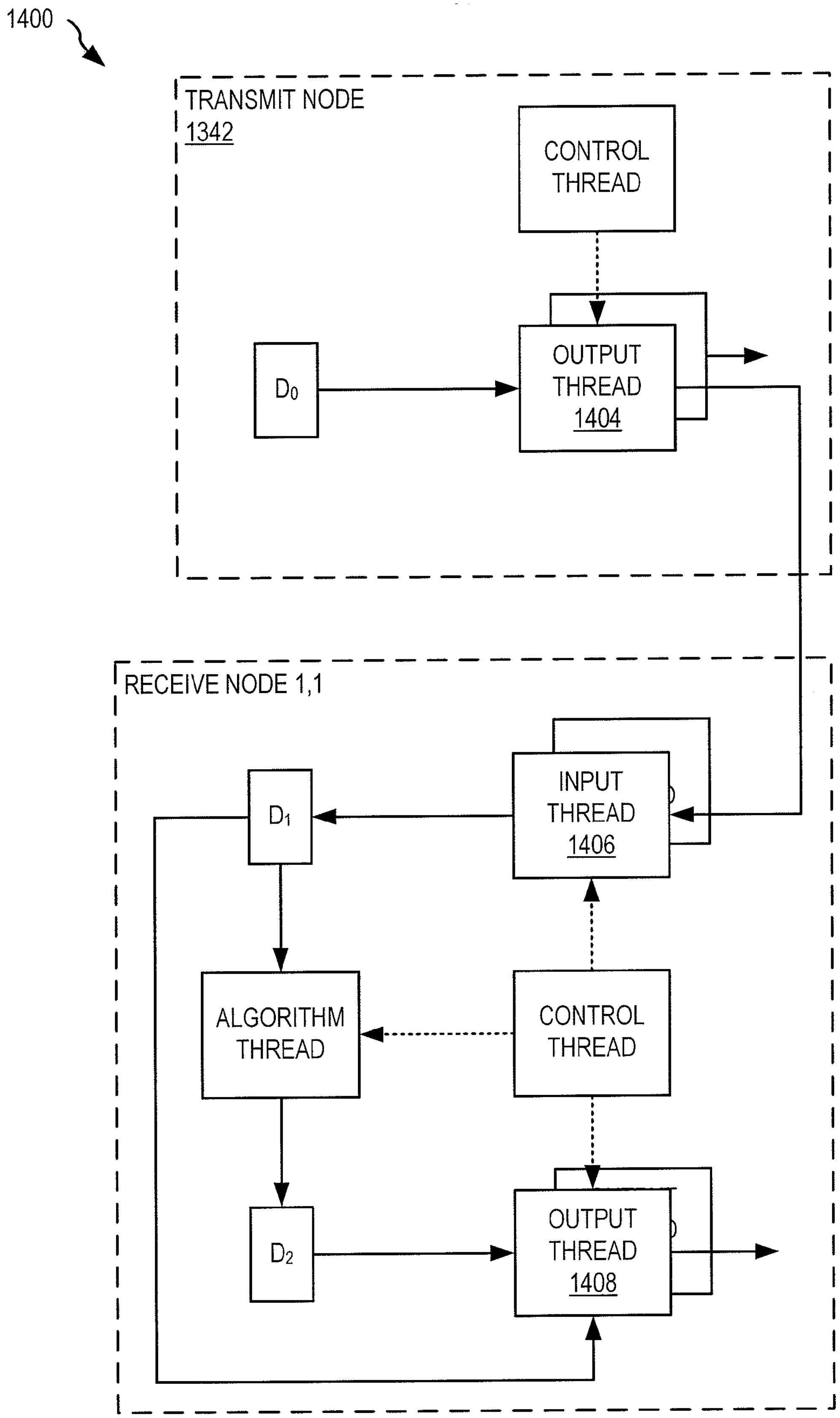
FIG. 33 shows exemplary thread level interaction between the transmit node and the receive node of the configuration of FIG. 30.

FIG. 30 shows one exemplary configuration 1340 where a transmit node 1342 and each receive node has the same number of channels. FIG. 31 shows a timing diagram 1360 illustrating that the number of latency time units remains at 2 while the number of nodes involved has grown from 5 to 10. As shown in FIG. 31, having multiple channels at all levels greatly decreases the data transmission overhead. FIG. 32 shows an exemplary switch fabric 1380 for configuration 1340 of FIG. 30. FIG. 33 shows thread level interaction between transmit node 1342 with multiple output threads 1404 and receive node 1, 1 with multiple input threads 1406 and multiple output threads 1408.

So FIG. 30 takes:

$$T_{MTNMRN-1}=T+2T_1'$$

time units to broadcast to ten receive nodes. Equation 10 shows the general formula:

$$T_{MTNMRN}=(T+\phi T')/\nu b_{full}$$

Equation 10. Multiple Channel Type 3 Timing

Where φ≡the number of expansion cycles required to meet the receive node count.

Multiple Channel Type 4

Figure 34:
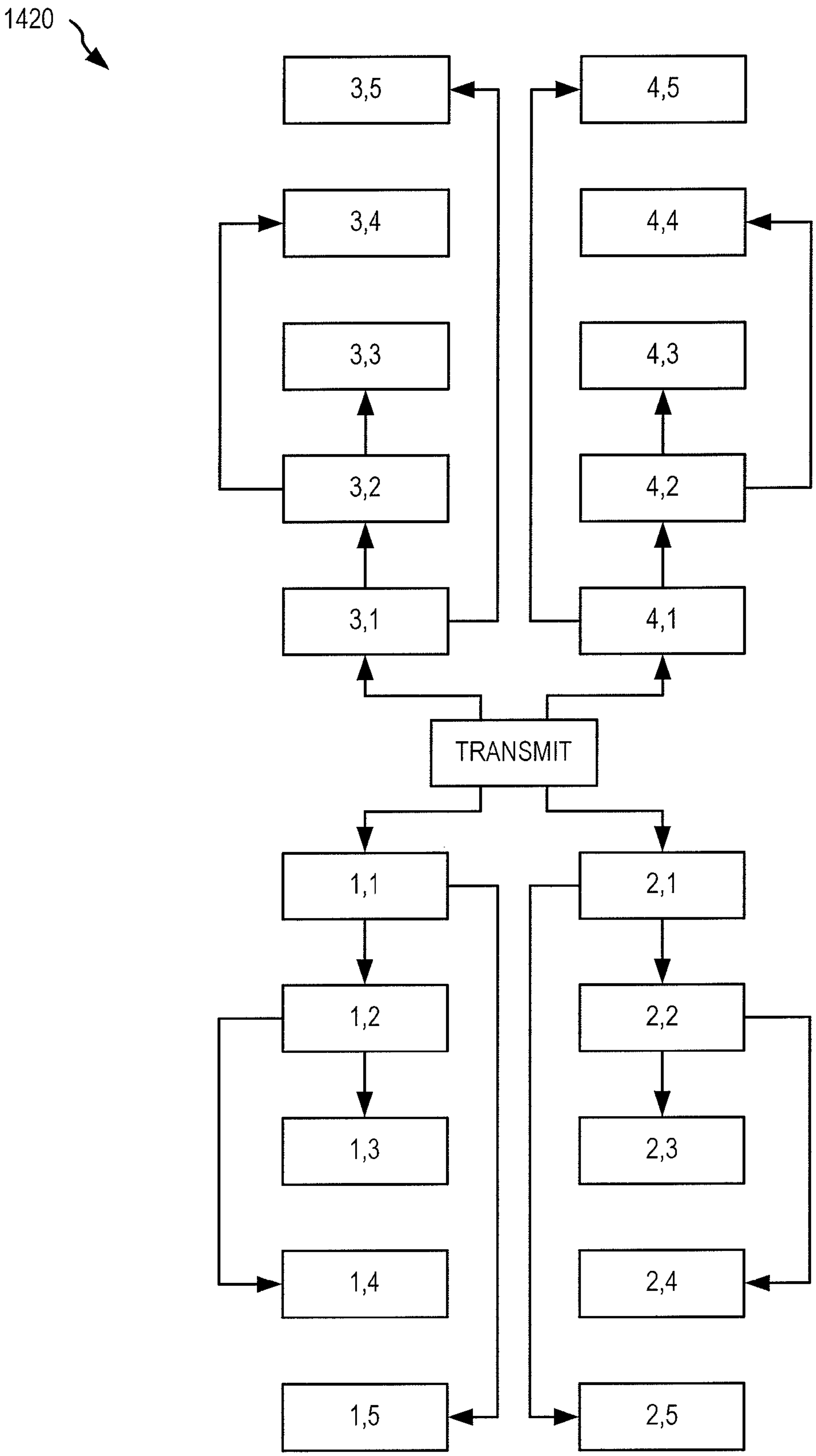
FIG. 34 shows one exemplary configuration having a transmit node and a plurality of receive nodes, the transmit node and each receive node having multiple channels and where the number of channels on each receive node is less than the number of channels on the transmit node.

FIG. 34 shows one exemplary configuration 1420 having a transmit node and a plurality of receive nodes, the transmit node and each receive node having multiple channels and where the number of channels on each receive node is less than the number of channels on the transmit node. In the example of FIG. 34, the transmit node is shown with four channels, and each receive node is shown with two channels.

Figure 35:
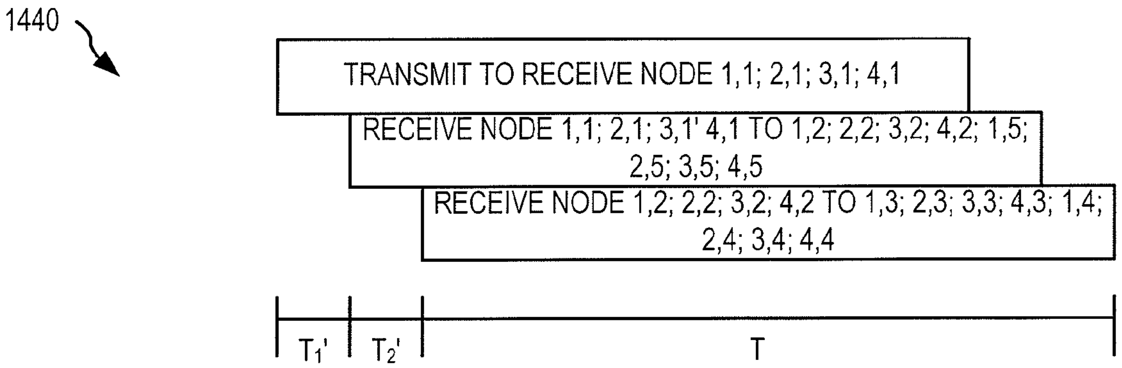
FIG. 35 is a timing diagram based upon the configuration of FIG. 34 and showing that the number of latency periods has stayed at 2 time units.

FIG. 35 is a timing diagram based upon configuration 1420 of FIG. 34 and showing that the number of latency periods has stayed at 2 time units. However, as shown in FIG. 34, the number of receive nodes involved has increased from 10 to 20.

So FIG. 34 takes:

$$T_{MTNMRN-2}=T+2T_1'$$

$$T_{MTNMRN}=(T+\phi T')/\psi\nu b_{full}$$

Equation 11. Multiple Channel Type 4 Timing

Where: ψ≡the number of expansion cycles required to meet the transmit node count.

Figure 36:
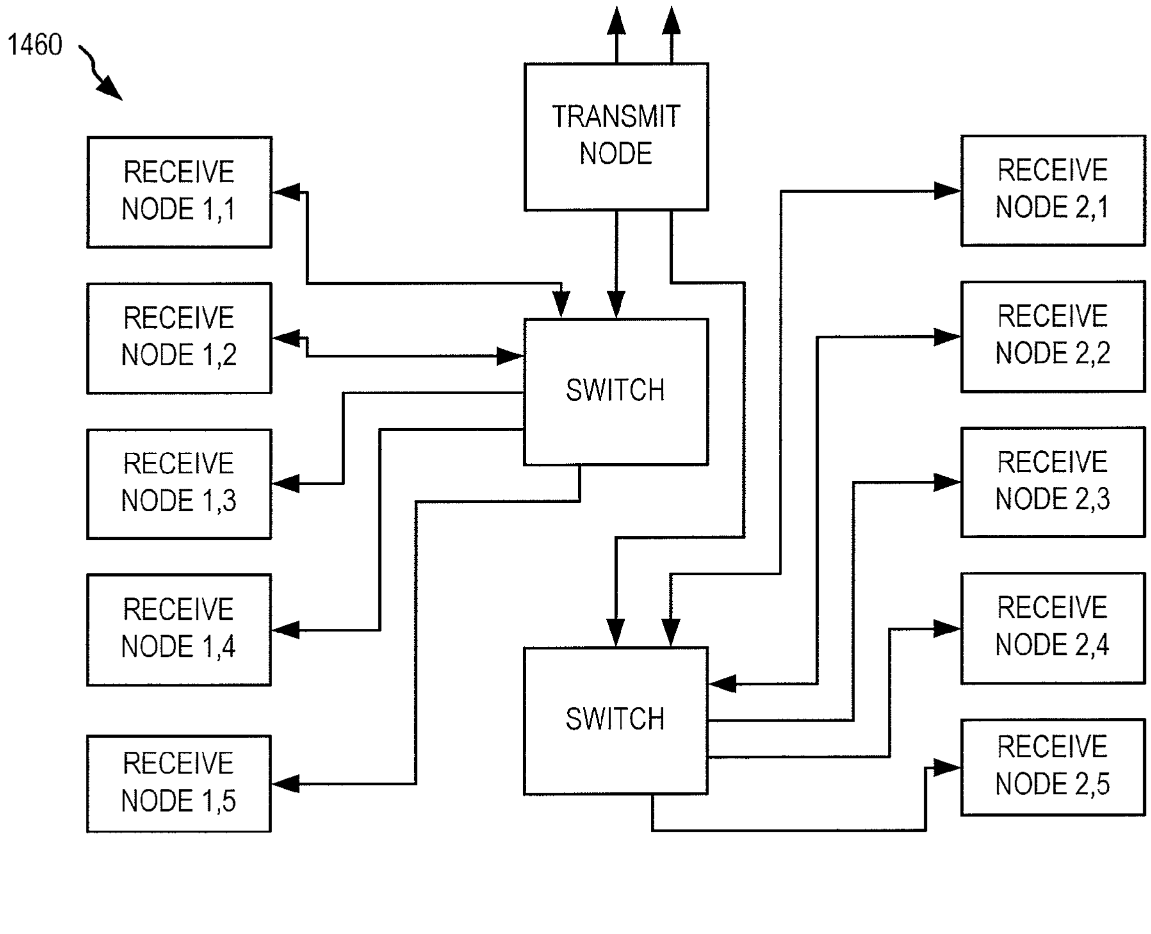
FIG. 36 shows part of one exemplary switch fabric based upon the configuration of FIG. 34, illustrating connectivity of two switches and ten nodes.

FIG. 36 shows part 1460 of one exemplary switch fabric based upon configuration 1420 of FIG. 34, illustrating connectivity of two switches and ten nodes. The transmit node also connects to ten other receive nodes via two other switches.

Multiple Channel Type 5

By connecting together multiple levels of transmit nodes that each have multiple channels, two new manipulations are obtained:

a) All Transmit node levels have the same number of channels.

b) The upper-most transmit levels have larger channel counts.

c) Multiple top most level transmit nodes.

Multiple Channel Type 5a

Figure 37:
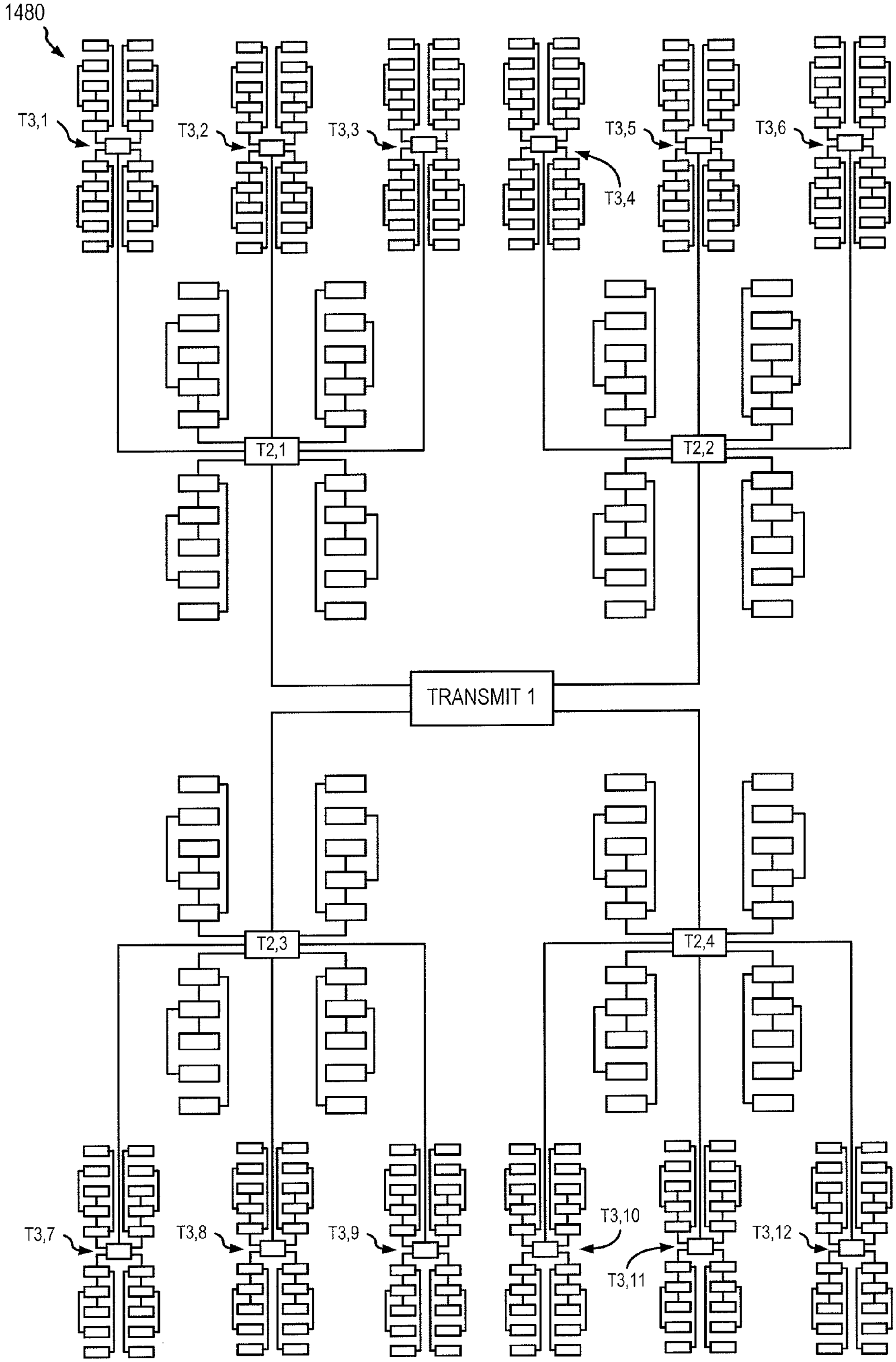
FIG. 37 shows a configuration with two transmit levels.
Figure 38:
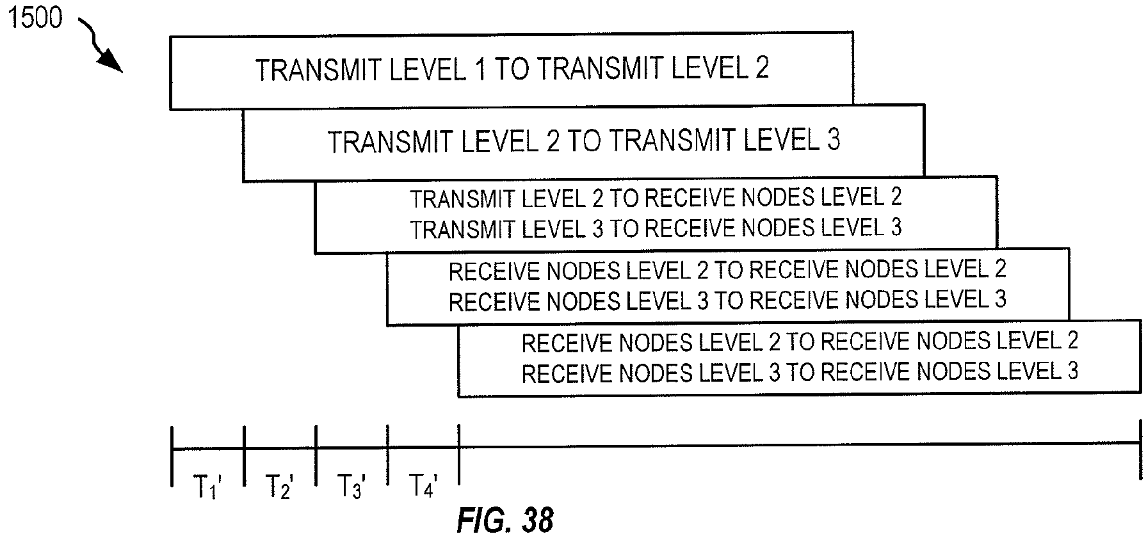
FIG. 38 shows a timing diagram based upon the configuration of FIG. 37 and illustrating that the number of latency periods has increased from 2 time units to 4 time units.

FIG. 37 shows a configuration 1480 with two transmit levels. Each transmit node has four communication channels regardless of its level and each receive node has two communication channels. FIG. 38 shows a timing diagram 1500 based upon configuration 1480 of FIG. 37 and illustrating that the number of latency periods has increased from 2 time units to 4 time units. However, the number of nodes involved has increased from 20 to 320.

Multiple Channel Type 5b

Figure 39:
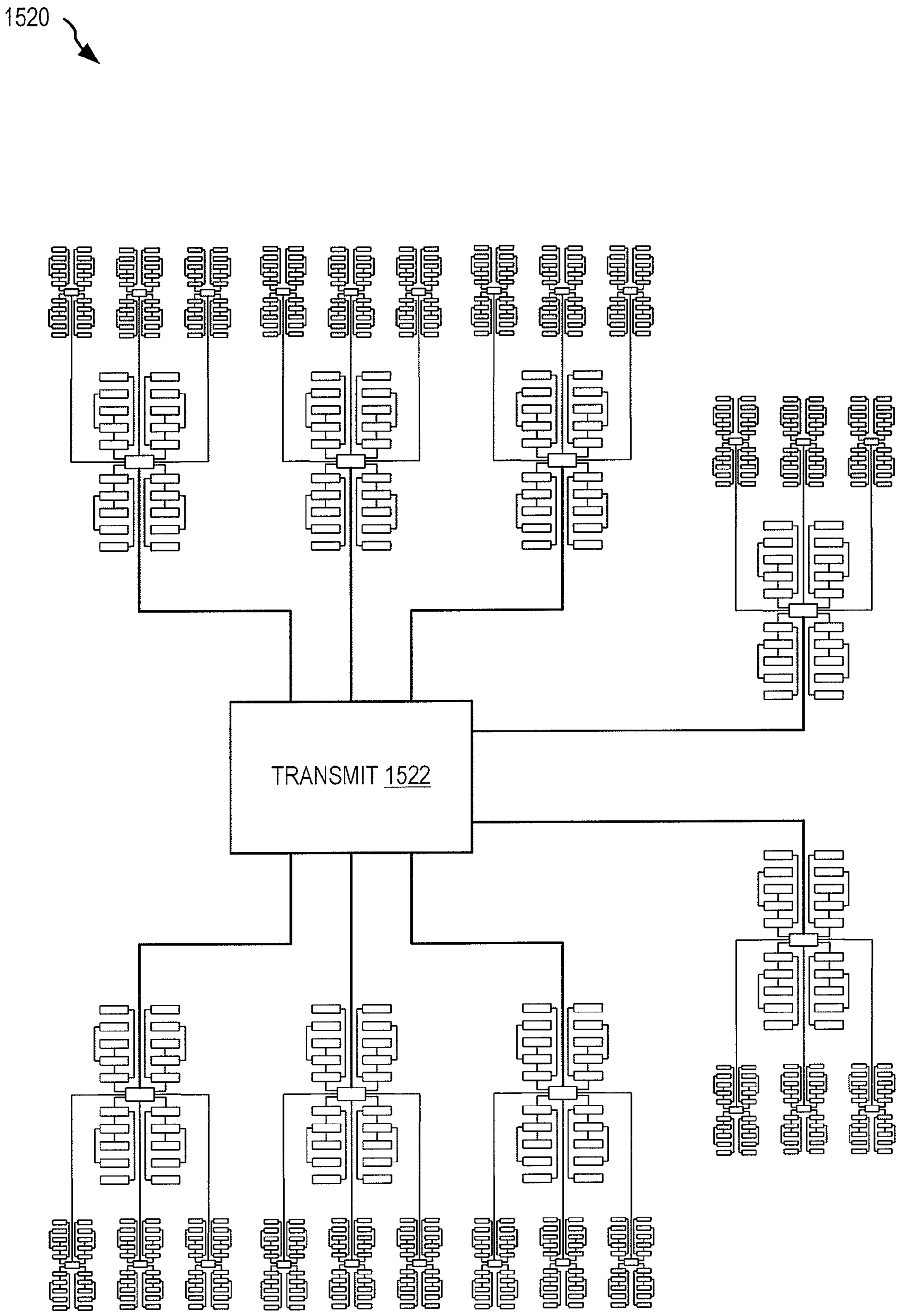
FIG. 39 shows one exemplary configuration with three transmit levels.

FIG. 39 shows one exemplary configuration 1520 with three transmit levels. The top level transmit node 1522 has eight communication channels and the lower level transmit nodes each have four communication channels. This is an example of the upper transmit nodes having more communication channels than the lower level transmit nodes.

The MTNMRN-Type 5b shown in FIG. 39 keeps the number of time units at 4 but increases the number of receive nodes to 640.

Multiple Channel Type 5c

Figure 40:
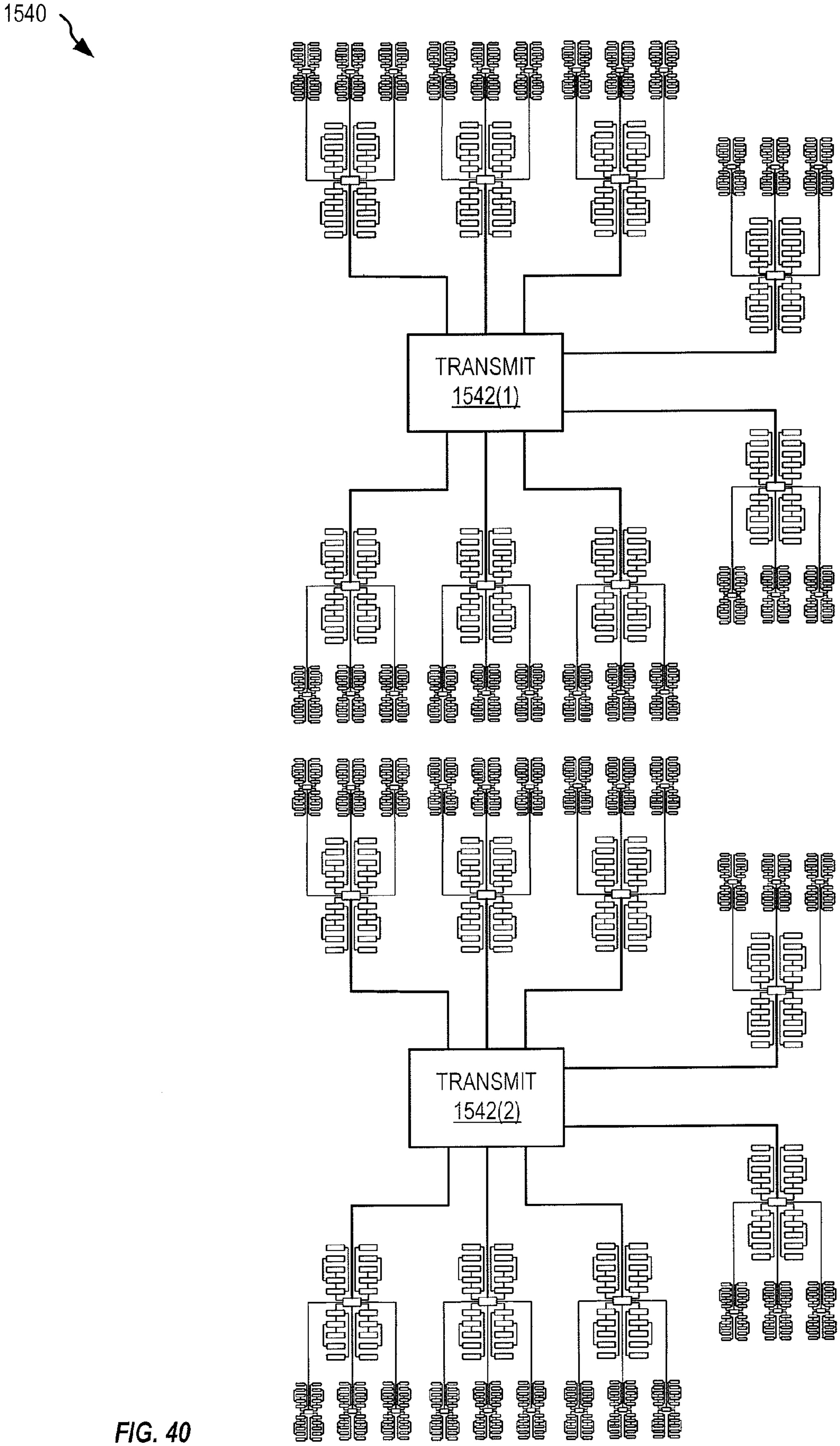
FIG. 40 shows one exemplary configuration with three transmit levels.

FIG. 40 shows one exemplary configuration 1540 with three transmit levels. The top level has two nodes 1542(1) and 1542(2), each with eight channels, and the lower level transmit nodes each have four communication channels. Configuration 1540 has multiple top level transmit nodes, each with more communication channels than the lower level transmit nodes. The MTNMRN-Type 5c shown in FIG. 40 keeps the number of time units at 4 but increases the number of receive nodes to 1280.

System Configuration and Capability from Emergent Behaviors

The parallel processing framework, known as Howard®, may be effectively configured using self-organizing processes that allow higher-order processing capabilities to appear as emergent behavior. That is, the various nodal roles required by Howard® can be self-selected rather than explicitly directed and system function arises as a collective capability rather than being orchestrated by a system controller. This lack of a central coordinator allows arbitrary networks (rather than just cluster computing networks) to be used as true supercomputers.

The communication and parallel processing functions of Howard® depend on the participating nodes fulfilling one of 4 different roles: home node (H), compute node (C), diagnostic node (D) and spare node (S). Nodes filling these roles operate independently of one another, requiring no central coordination mechanism within the system.

The D nodes provide environmental and status monitoring of C, H, and S nodes. They form a central repository for information about the system but take no active role in the operation or control of the system. The H nodes form the upper level system organization. At this level, one node is expected to perform weakly defined control functions, such as tracking job and resource assignments and managing dynamic load balancing. At the same time, H nodes provide various types of non-cluster to cluster I/O communication, as well as serving as the primary connection to the outside world. Partial problem decomposition occurs as job data moves through this level (H nodes) to the C nodes.

The C nodes form the processing level organization. These are basically the computational or data processing nodes. Final problem decomposition occurs at this level, along with C to H node communication, data gather/scatter, cross-communication between C nodes, and primary computations.

The S nodes are undifferentiated nodes that can be selected to perform the role of any other nodes. They come into play during error recovery, and expansion and contraction of available node resources. They allow for dynamic system size changes and rapid response to node faults.

Why Differentiate Agents

Parallel processing is a complex task. Any complex task has many roles that must be filled. Each task role can be ascribed to a processing agent. Hereinafter, the terms role and agent may be used interchangeably. Each agent type represents a different set of atomic capabilities and all agent types may be required simultaneously to achieve desired system functions. Therefore, during a system initiation process, each node takes on a role of a particular agent type as the cluster is formed.

The traditional method of differentiating the node roles is for a human (i.e. the programmer) to explicitly assign a separate role to each node. This can be time-consuming as each network is different, and the need to assure identical information is provided to every node opens many opportunities for error. The methods discussed herein allow for greatly increased flexibility and for ad hoc creation of supercomputing platforms when and where needed.

To accomplish such automatic cluster formation, each node must be capable of fulfilling each role. This is acceptable because if the role selection is automated then no particular role selection need be permanent.

Stigmergy

The concept of stigmergy was introduced by Pierre-Paul Grasse in the 1950's to describe the indirect communication taking place among individuals in social insect societies. In chaos theory, stigmergy is an agent's use of the environment to communicate and interact. If there is more than one agent interacting with the environment (which may include other agents) then this may be considered a swarm. If there is additional behavior that occurs from the interaction of the agent with its environment that is not directly predicable from the activity of the individual agents then this is emergent behavior. The capability of self-organization is required if any emergent behavior, beneficial or not, is to arise from the swarm.

There are two types of self-organization. The first occurs as a consequence of the random activity of the agents while the second type only requires locally directed interaction. Both self-organization types eliminate the need for external control as all control activity originates from the agent interacting with its environment.

Emergent behavior is the direct result of interaction between multiple individual agents and their environment. Each individual agent's environmental reactions, i.e. the behaviors of an agent are a function of the individual agents' internal state.

Agent States and Activities

The state is comprised of all of the behaviors that are currently applicable to an agent at a particular point in time. The behavior of an agent is determined by its state, and since its state is derived from interaction with the environment (which includes interaction with neighboring agents), it is necessary to define the states and rules of transition between states.

First, some necessary terminology:

| | |
|---|---|
| Association | Alignment of A agents with a particular T agent channel. |
| Association Size | The number of agents in an association list. |
| Cycling | An agent sequentially processing a list in order to act upon the contents. |
| Goal State | Final states for fully differentiated nodes. |
| MaxA | Maximum association size. |
| List | A data structure which stores the members of an association or resource. |
| State | A group of one or more behaviors used to define an environmental response. |
| Sub-state | A group of activities that occur while a node is in a particular state. It consists of some or all of the state behaviors. |
| X agent | An agent in the X state. |

Various list data structures are used to track the node roles and availability.

| | |
|---|---|
| Association List | List of all agents in an association. |
| AA List | List of all active agents. |
| C List | List of all C agents. |
| H List | List of all H agents. |
| I List | List of all system agents indicating if they are active or inactive. |
| S List | List of all S agents. |
| Connection Information | Data received from the connected agent, including: state, association size, and T agent. |

The states available to a node are as follows:

| | |
|---|---|
| A State | General state for nodes which have joined an association. |
| A-acquired State | Agent is in an association and is open to connection from other agents. |
| A-compare State | An A-acquired agent has been connected to by a T agent, and tests the connection data. |
| A-QT State | System quiescence wait time has been exceeded. A-acquired agent determines its final goal state. |
| Connect | An agent has established a communication port/path with another agent. |
| Disconnect | An agent has closed its connection with another agent. |
| CT State | General state during the code transmission phase. |
| CT-compare | Node has been connected to and is comparing information. |
| CT-init | Node initial state during code transmission. |
| CT-transmit | Node is actively relaying code to other nodes. |
| I State | General state for nodes waiting to be initialized. |
| I-inactive State | Agent is not active. |
| I-active State | Agent is active. It is attempting to acquire access to the AA List, and is open to connection from other agents. |
| I-compare State | I-active agent has been connected to by a T agent, and tests the connection data |
| Goal State | Fully differentiate node. There are currently 4 states possible. |
| C State | A system goal state indicating an agent is ready to participate in a cluster as a compute node. |
| D State | A system goal state indicating an agent is ready to start monitoring the status, temperature, and activity of the newly emerged cluster agents. |
| H State | A system goal state indicating an agent is ready to participate in a cluster as a home node. |
| S State | A system goal indicating an agent is ready to participate in a cluster as a spare node. |
| T State | General state for top level nodes actively building associations. |
| T-compare State | A T-init agent has opened a connection with another agent, either to another agent, or from another T-init agent, and tests the connection data. |

-continued

| | |
|---|---|
| T-init State | Top level agent which attempts to build associations. |

Environmental Parameters

The environment in which the agents reside consists of a reasonably flat communication network that supports point wise full-duplex communication between agents. The environment contains MaxA and a system quiescence wait time. The environment must also manage the I, AA, H, C, D, and S lists.

Before the nodes can be differentiated there needs to be a capability distribution phase (e.g., the distribution of executable code and data to each node). The capability distribution phase starts with some remote host that transmits a copy of the undifferentiated code to each node within the network. Multiple remote hosts may be used to send copies of the undifferentiated code to the nodes within the network.

Phase I—Network Environment Preparation

In order to prepare the network (which includes all of the processors within the network) for supercomputer utilization the code is transmitted to each node within the network and one node is selected to contain the list of all agents; other nodes are placed in the initial state called the I-Inactive state.

Figure 41:
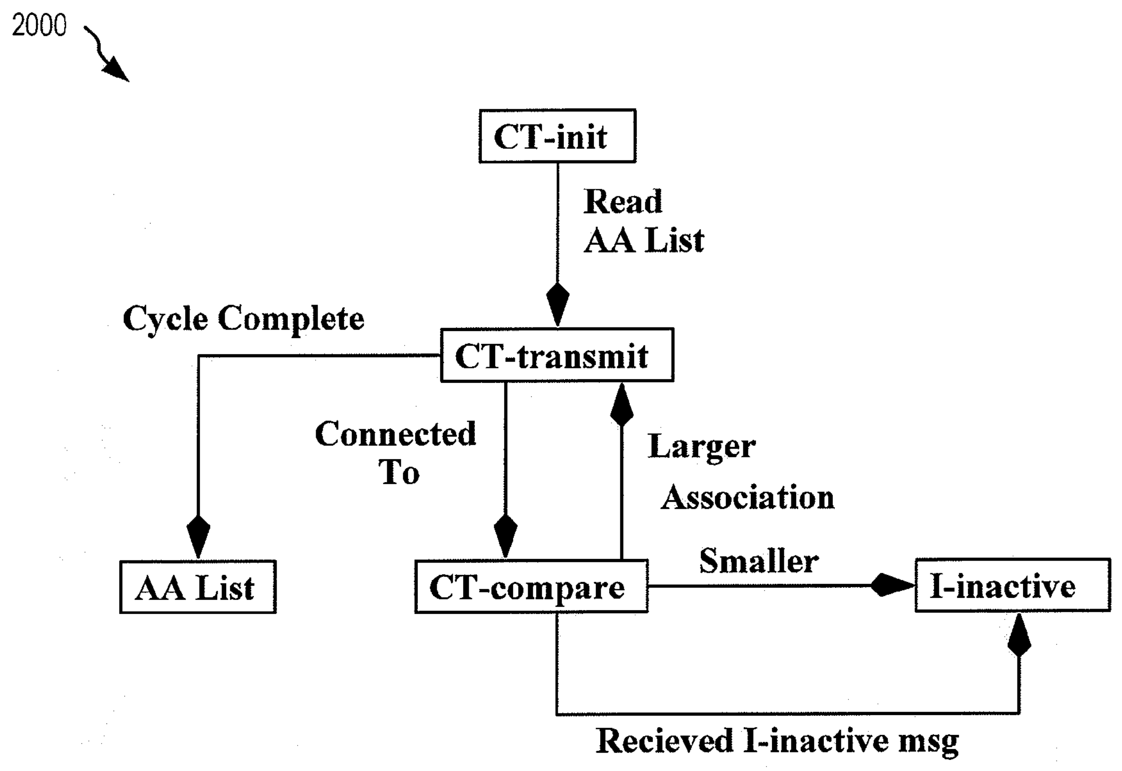
FIG. 41 shows an exemplary code transmission state diagram.

FIG. 41 shows an exemplary code transmission state diagram 2000. Below are the code transmission rules that are required to distribute the code to the various nodes within the network. At the end of this distribution, a single node contains both the AA and I lists and the other nodes each have the location of the node with the AA and I lists.

Phase-I Transition Rules

The state transition rules used during Phase I are listed below:

CT-init→CT-transmit: The CT-init state reads its input file. This input file contains the location of every node in the network. Once read the CT-init state will randomize the file entries and then transition to the CT-Transmit state CT-transmit→CT-compare: If another node connects to the current node then their respective association sizes are compared.

CT-transmit→AA-list: If all nodes within the network have been accessed, copy the AA-list into the I-list and set the active flag for each node in the I-list, then transition to the AA-list goal state.

CT-compare→CT-transmit: If the contacted node does not have MPT code then transmit the code to the other node. Send an I-inactive message to the other node. If the association size of the current node is larger than the association size of the other node then send I-inactive messages and the current node location to all nodes in smaller association absorbing the nodes into the current association.

CT-compare→I-inactive: If the contacting node sends an I-inactive message to the current node or if the association size of the current node is smaller than the association size of the other node, or if the association sizes are the same then the association with the lowest (or highest depending upon request) transmission node location address will then transition to I-inactive state.

EXAMPLE 1

1 Transmission Node

Figure 42:
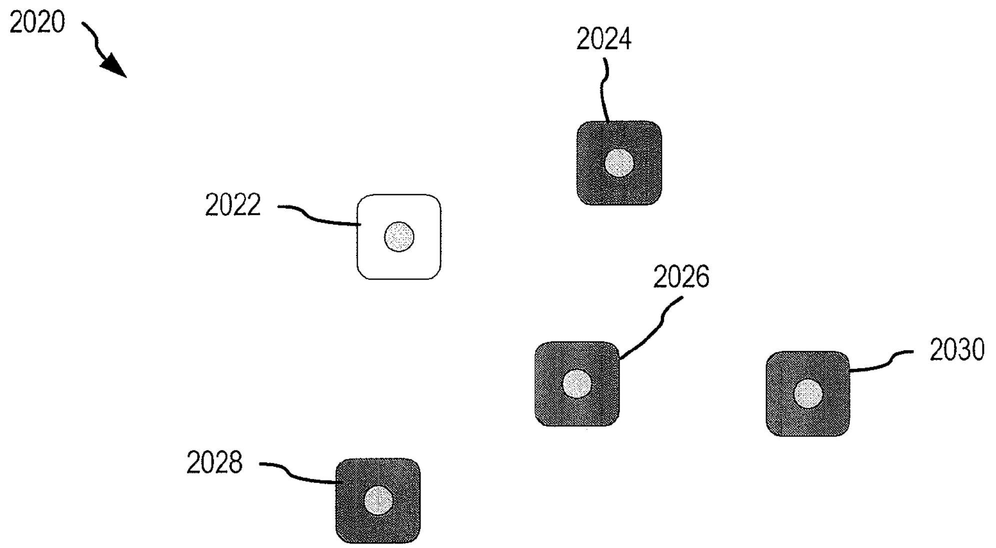
FIG. 42 shows a network of nodes in an initial state, where only one copy of the code is stored on a node within the network.

FIG. 42 shows a network of nodes in an initial state 2020, where only one copy of the code is stored on a node 2022 within the network. The transmission may be better served using a broadcast mechanism. Node 2022 contains the code and the locations of all other nodes in the network. Other nodes 2024, 2026, 2028 and 2030 do not contain the code.

Figure 43:
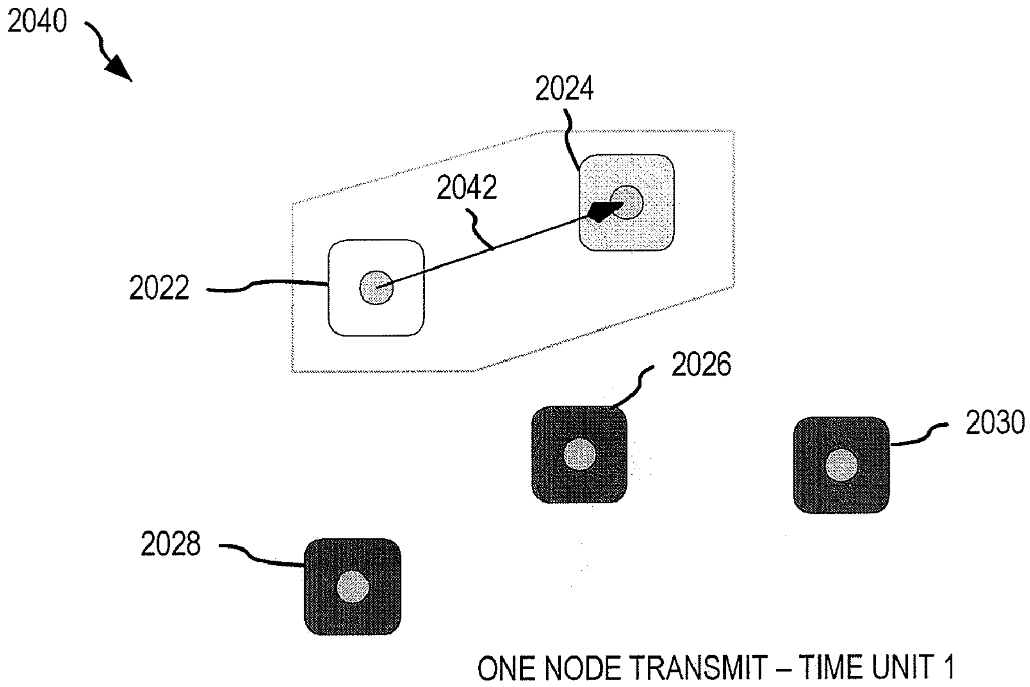
FIG. 43 shows the state of the network of FIG. 42 after one time unit.

FIG. 43 shows the state of the network of FIG. 42 after one time unit 2040. Node 2022 has the code and is in the CT-transmit state after the first time unit; node 2022 transmits 2042 the code to node 2024.

Figure 44:
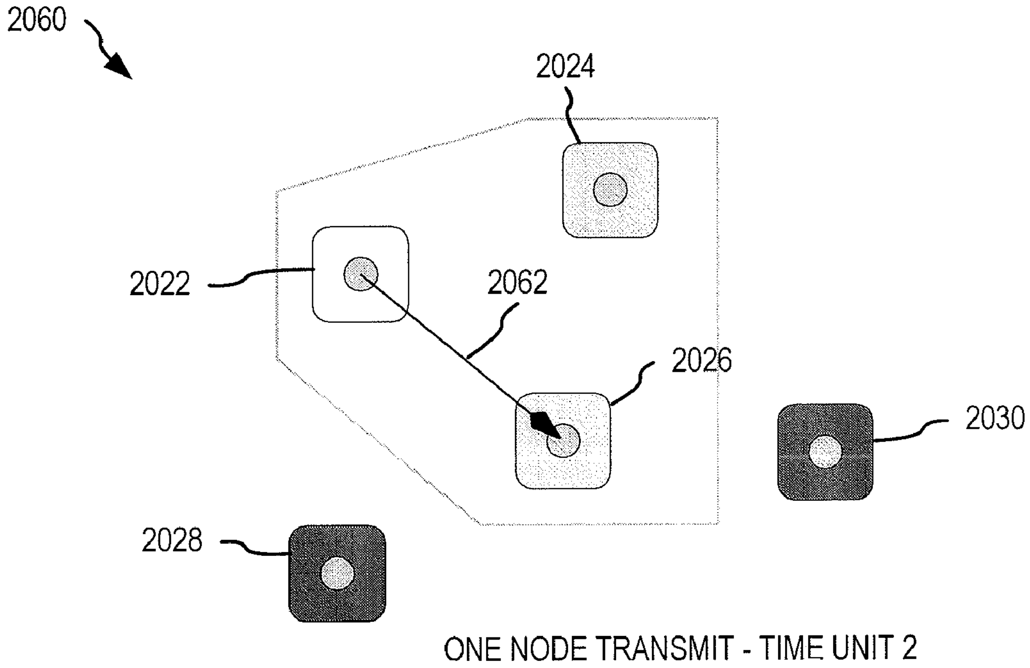
FIG. 44 shows the state of the network of FIG. 42 after a second time unit, illustrating an association formed of two nodes.
Figure 45:
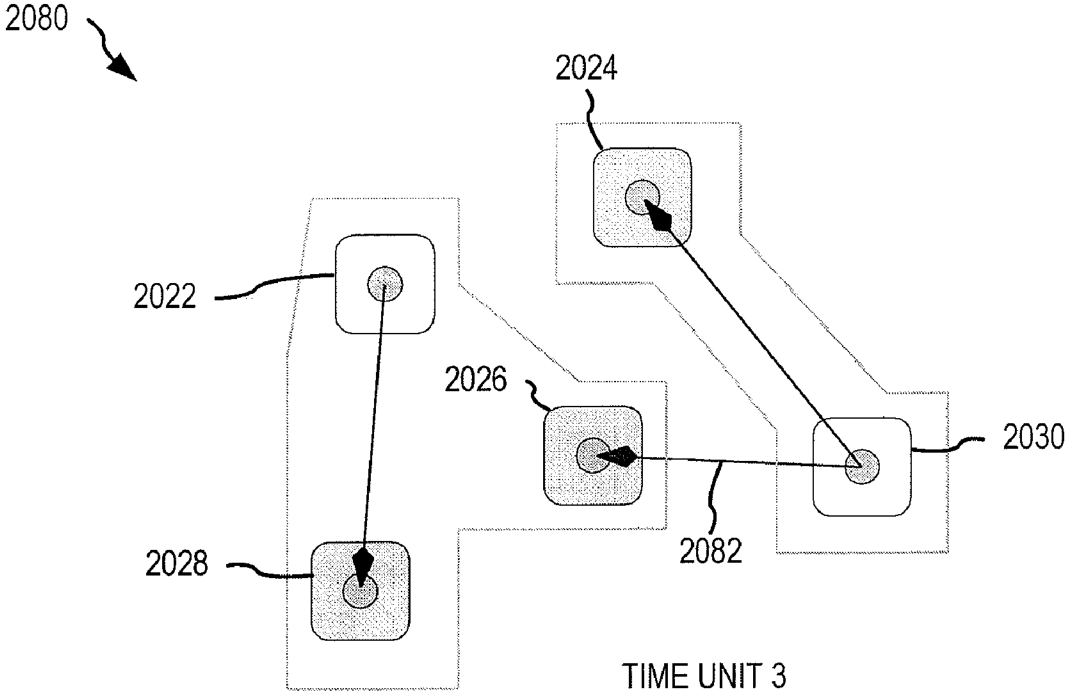
FIG. 45 shows the state of the network of FIG. 42 after a third time unit, illustrating an association formed of three nodes and a second association formed of two nodes.
Figure 46:
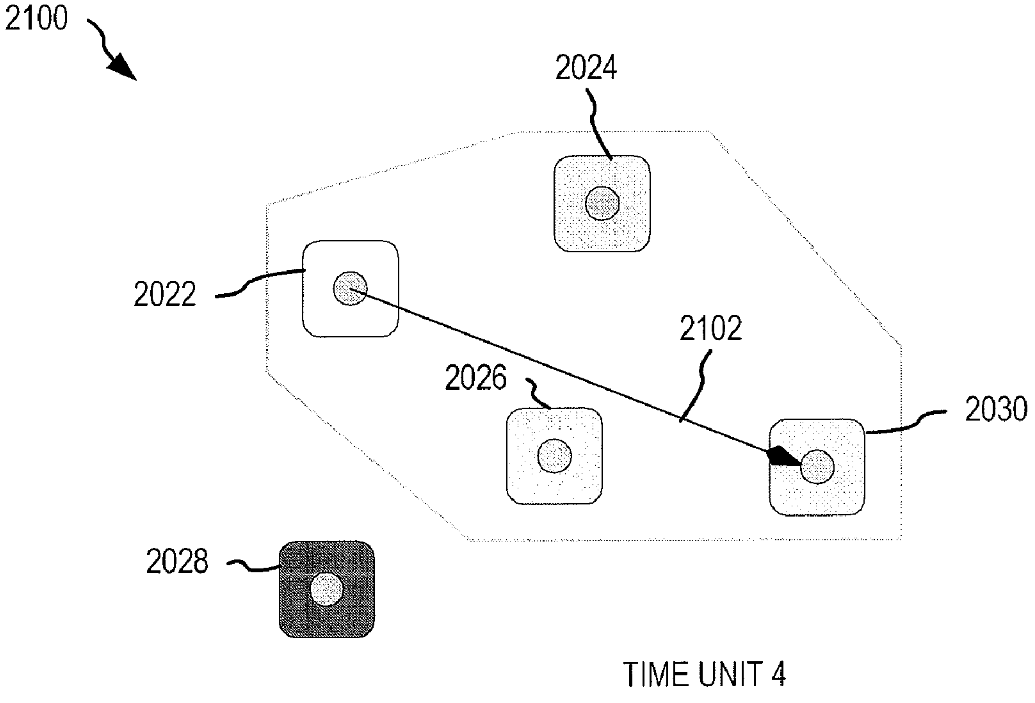
FIG. 46 shows the state of the network of FIG. 42 after a fourth time unit, illustrating an association formed of four nodes.

In the second time unit 2060, shown in FIG. 44, an association is formed with node 2024 and node 2026 is placed into I-inactive state. A node in the I-inactive state that is contacted by a node in the CT-Transmit state will compare its association size. The third time unit 2080 is shown in FIG. 45 and the fourth time unit 2100 is shown in FIG. 46.

Figure 47:
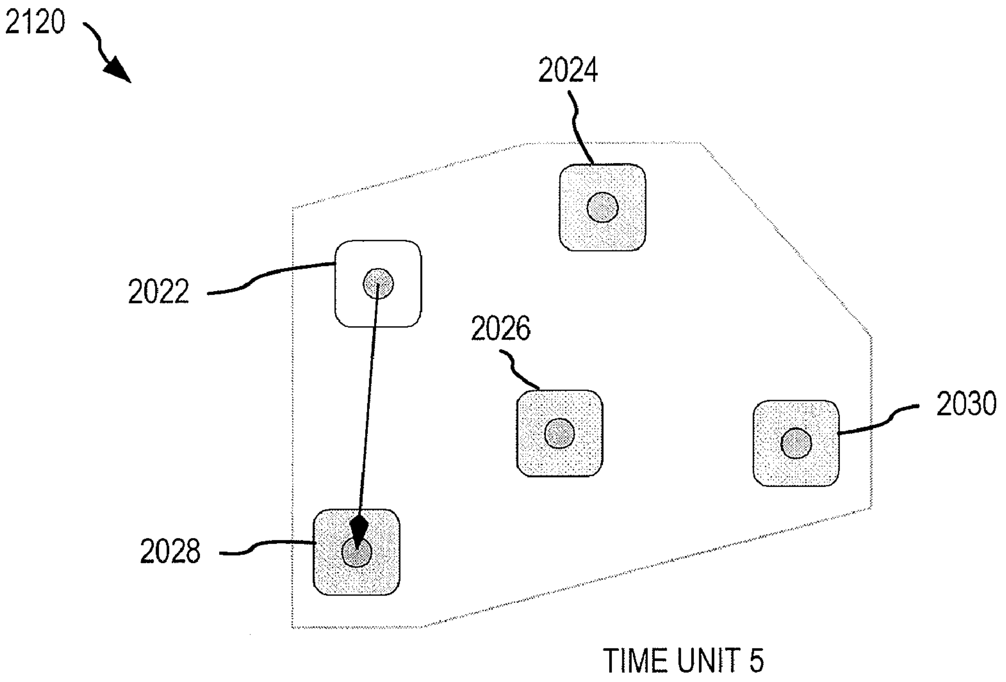
FIG. 47 shows the state of the network of FIG. 42 after a fifth time unit, illustrating an association formed of five nodes.
Figure 48:
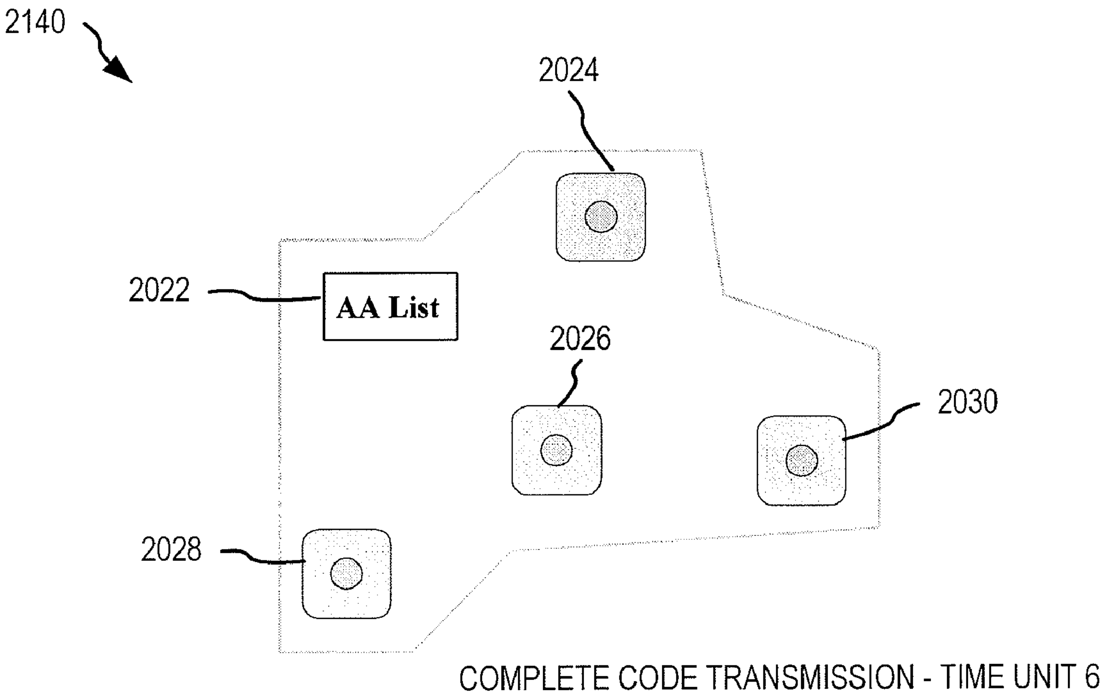
FIG. 48 shows the state of the network of FIG. 42 after a sixth time unit, illustrating conversion of the transmitting node into an AA list node.

By time fifth unit 2120 as shown in FIG. 47, nodes 2022, 2024, 2026, 2028 and 2030 are in the same association. It now takes only one additional time unit to convert the transmitting node 2022 into an AA-list node, as shown in state 2140 of FIG. 48.

EXAMPLE 2

2 Transmission Nodes

This example shows how these rules allow multiple transmission nodes to select the transmission node that should become the AA-List node.

Figure 49:
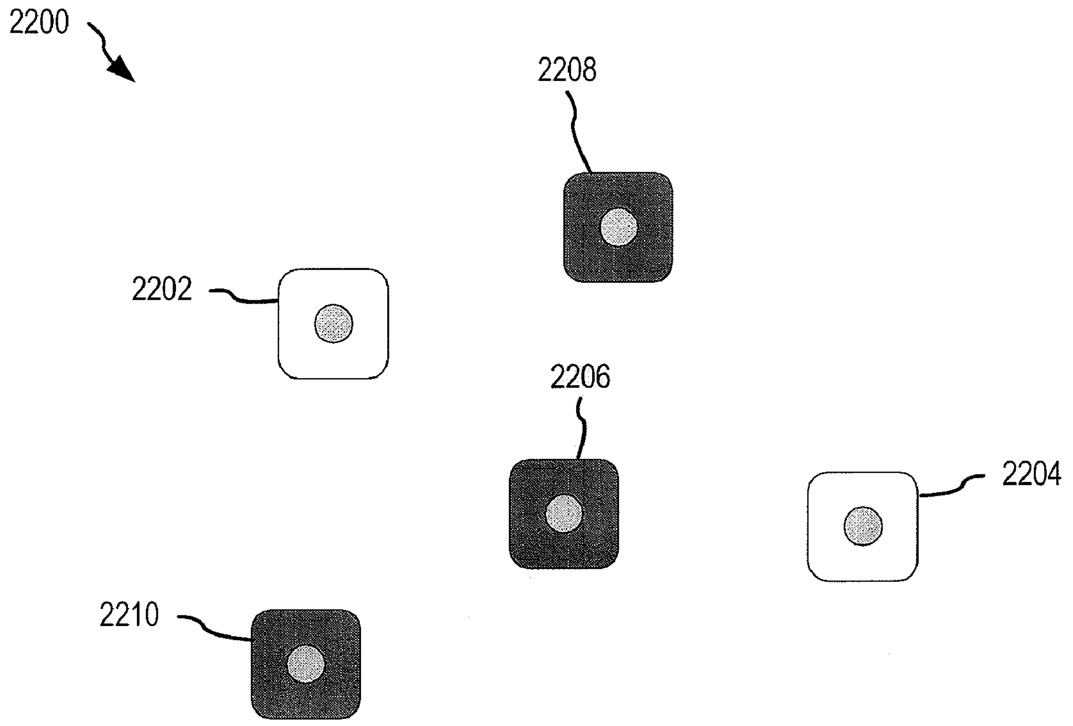
FIG. 49 shows one exemplary network at a first time unit with two nodes containing the code and the same list of available nodes in the network.
Figure 50:
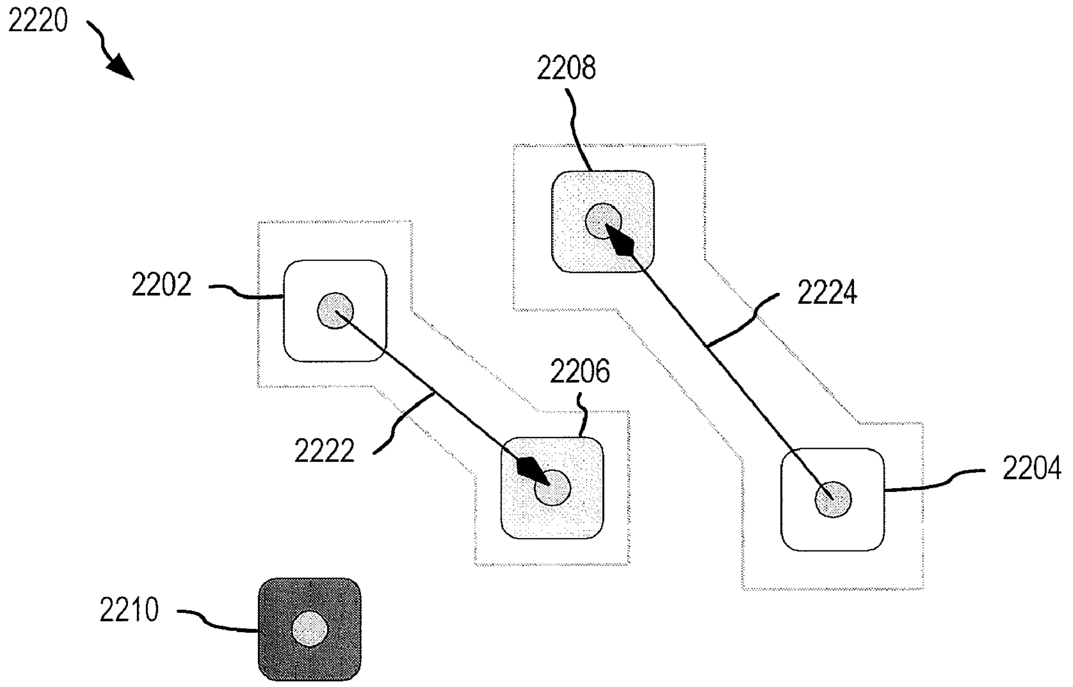
FIG. 50 shows the network of FIG. 49 after a second time unit, illustrating the formation of two associations.
Figure 51:
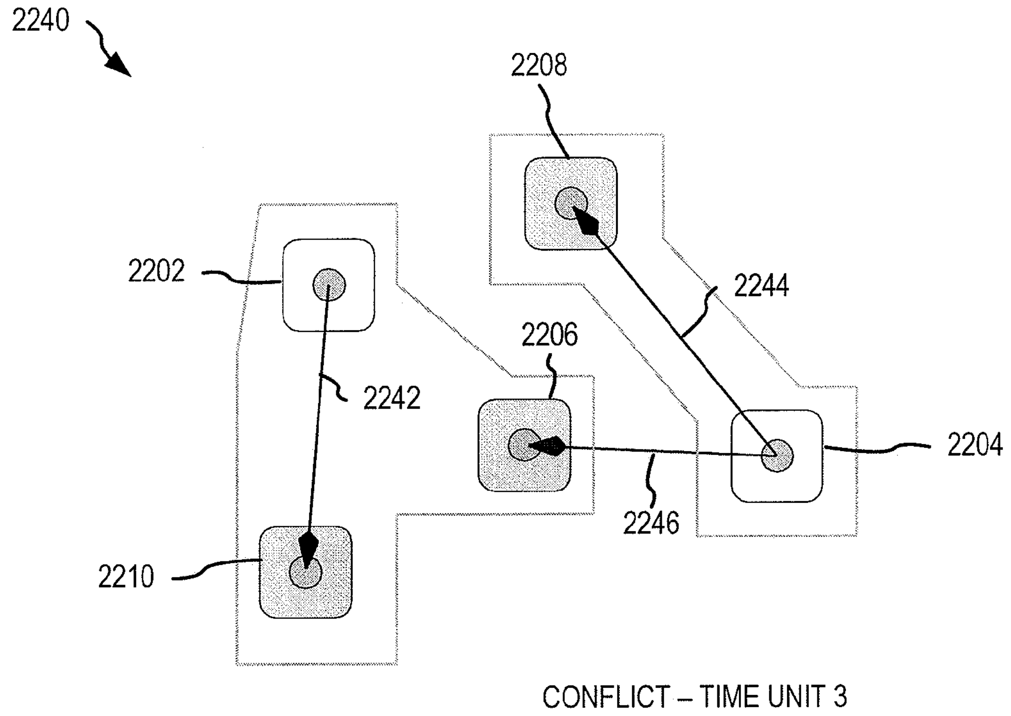
FIG. 51 shows the network of FIG. 49 after a third time unit, illustrating a conflict when one node attempts to acquire a node already in another association.
Figure 52:
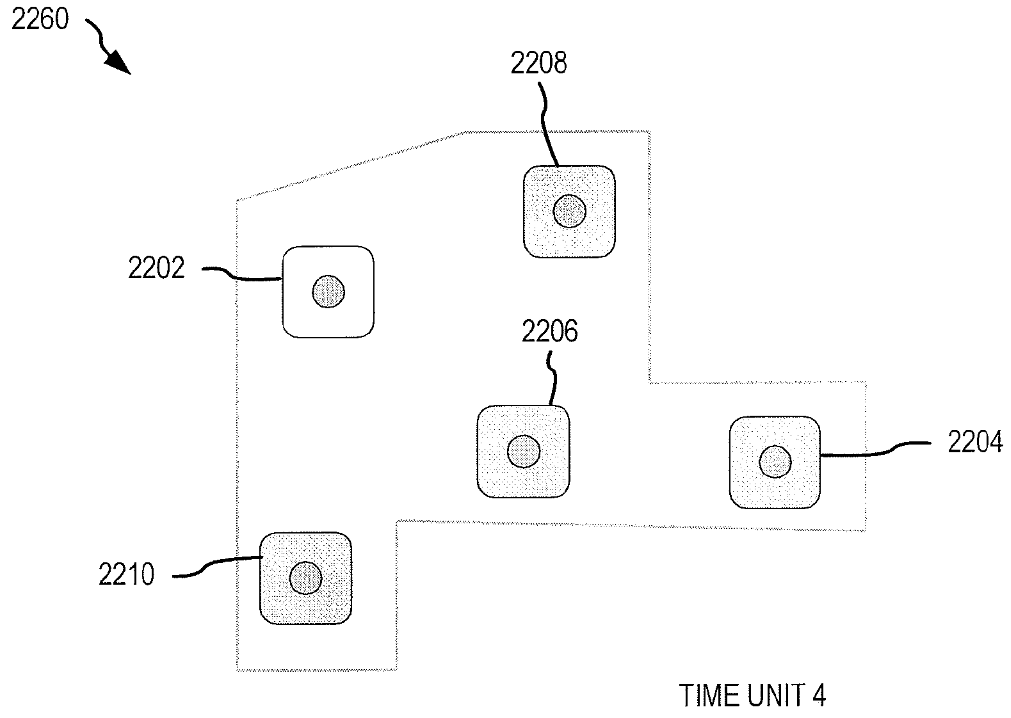
FIG. 52 shows the network of FIG. 49 after a fourth time unit, illustrating the joining of two associations.
Figure 53:
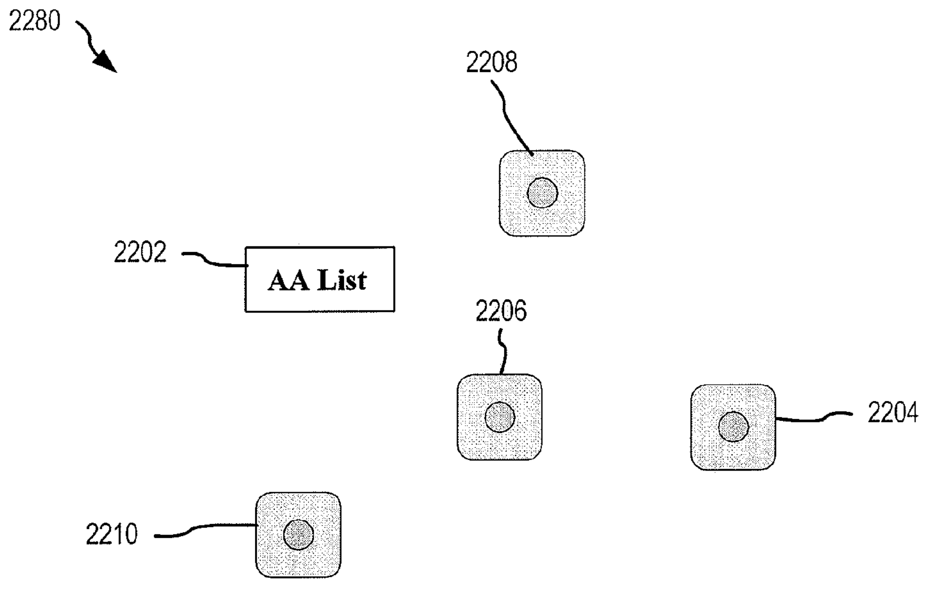
FIG. 53 shows the network of FIG. 49 after a fifth time unit, illustrating formation of the AA list node.

FIG. 49 shows one exemplary network at a first time unit 2200 with two nodes 2202 and 2204 containing the code and the same list of available nodes in the network. The available node lists in nodes 2202 and 2204 each includes nodes 2206, 2208 and 2210 and the other transmission nodes 2204 and 2202, respectively. Since the transmission nodes randomize their node lists they can start acquiring their associations. A second time unit 2220 is shown in FIG. 50, where node 2202 acquires 2222 node 2206 and node 2204 acquires 2224 node 2208. FIG. 51 shows a third time unit 2240 where node 2202 acquires node 2210 and node 2204 attempts to acquire node 2206. Since node 2206 is already in an association, the association size is compared and nodes 2204 and 2208 join the association of node 2202, as shown in the fourth time unit 2260 of FIG. 52. FIG. 53 shows a fifth time unit 2280 where node 2202 becomes the AA list holder.

Thus, for any number of transmission nodes, the code transmission will complete with only one AA-List node and with all of the other nodes in the I-active state.

Phase II—Agent Differentiation

Figure 54:
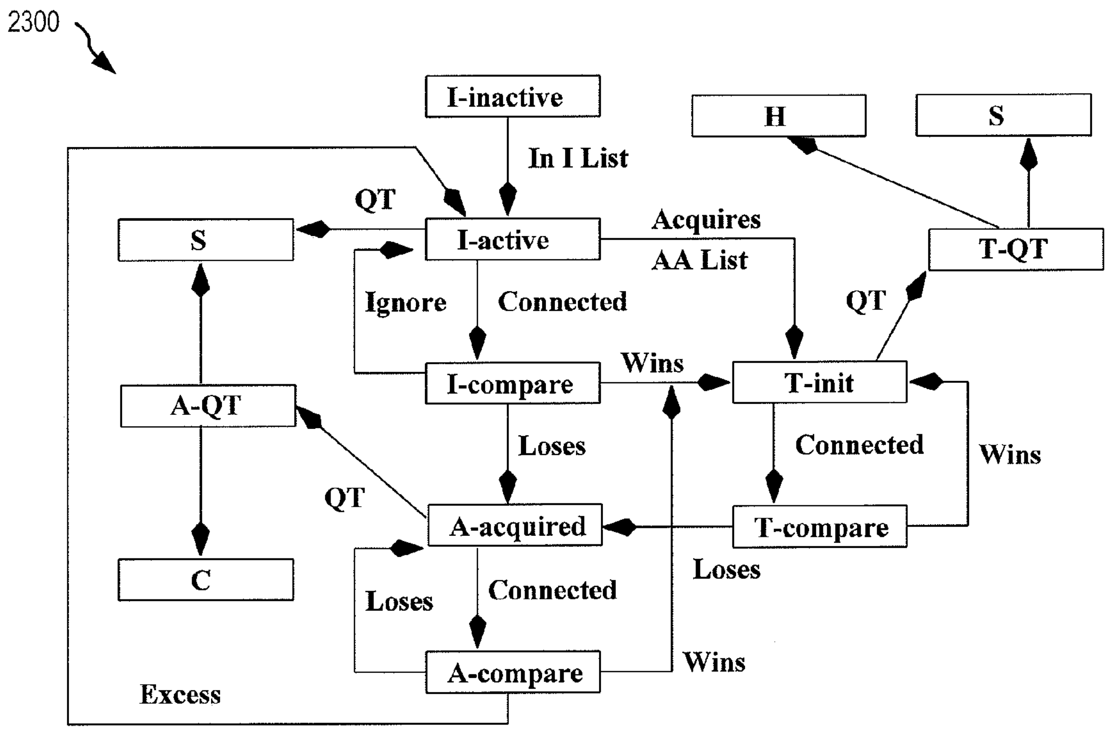
FIG. 54 shows one exemplary agent state diagram illustrating how an agent's state is determined based upon state transition rules.

These rules are dependent only on information available to the individual agents. Their application leads to the emergent behavior of fully differentiated cluster nodes. FIG. 54 shows one exemplary agent state diagram 2300 illustrating how an agent's state is determined based upon state transition rules, described below.

Phase-II Transition Rules

The state transition rules during Phase-II are as follows:

- I-inactive→I-active: An I-inactive agent periodically examines the I list. Transition occurs if it finds itself marked as active.
- I-active→T-init: An I-active agent periodically attempts to acquire the AA List. Transition occurs once it does.
- I-active→S: System quiescence time reached; not associated.
- I-active→I-compare: An I-active agent is connected to by a T-init agent and tests the connection data. An I-compare agent performs the following tests based on the data from the connecting T-init agent: 1) if the I-compare agent's channels are greater than the T-init agent's channels, the I-compare agent assumes the role of the T-init agent, and the T-init agent becomes an A-acquired agent; 2) if T-init agent's association size is greater than MaxA, ignore the connection attempt and transition back to I-active; or 3) transition to A-acquired and join the T-init agent's association.
- A-acquired→C: The system quiescence time has been exceeded, and the current node has been forced to join another association, that is, it has been acquired.

A-acquired→A-compare: An A-acquired agent has been connected to by some other T-init agent. The connection data is tested in the A-compare state as follows: 1) if A-acquired agent's T-init agent's channels are greater than connecting T-init agent's channels, the connecting T-init agent and its association join the A-acquired agent's association; or 2) the A-acquired agent, other A-acquired agents in its association, and possibly its T-init agent join the connecting T-init agent's association, up to MaxA. Excess agents transition back to the I-active state.

- A-acquired→A-QT: If system quiescence time is reach, then the A-acquired agent determines its goal state: 1) if in an association of size MaxA, it transitions to the C state; or 2) it transitions to the S state.
- T-init→T-QT: If system quiescence time is exceeded, the agent transitions to T-QT and determines its final goal state: 1) if its association size equals MaxA, it transitions to the H state and sends a D-state message to the AA-List agent; or 2) it transitions to the S state.
- T-init→T-compare: A T-init agent connects to another agent and tests the connection data as follows: 1) if connected to an H, C, or S agent, ignore connection; 2) if connected agent's channels or those of its T-init agent are less than its channels, assume the agent, its associated agents, and possibly its T-init agent, up to MaxA agents; or 3) release the current agents association (including the current agent) to the connected agent's association.

Emergent Behavior

It should be noted that the end product of agent differentiation is that all of the agents have selected one of three different operational roles. There are no direct low-level behaviors that force any particular agent to take on any particular role. In fact looking at the behavior activities presented, it is not possible to look at the behavior within any of the agents and determine that agent differentiation is the goal. The selection of each agent's goal state is achieved strictly by the low level behaviors of multiple agents interacting. The goal state selections emerged from the lower order behaviors of the entire system of agents.

EXAMPLE 3

Homogeneous 1-Channel Agents, 1 Home Node Goal

Figure 55:
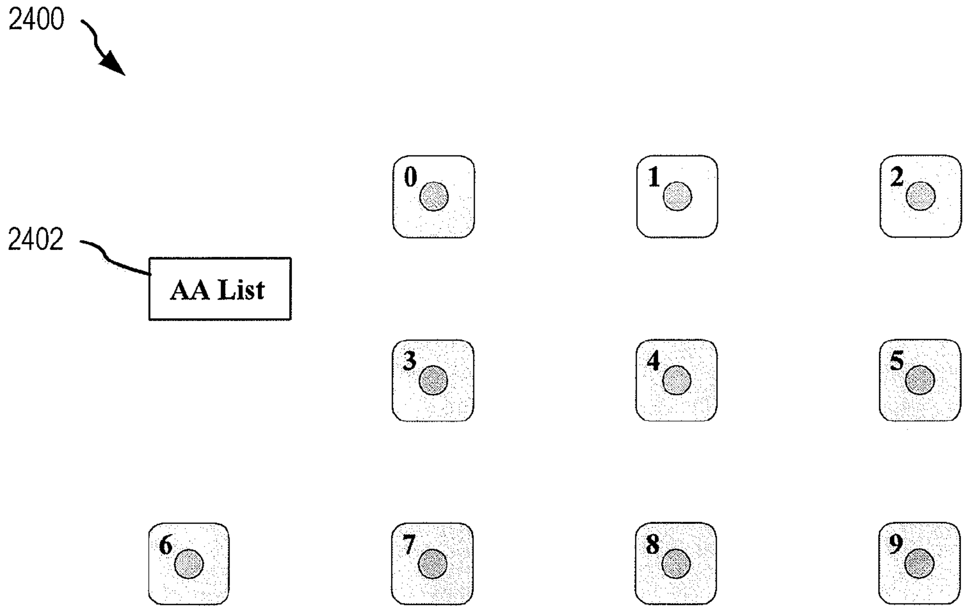
FIG. 55 shows one exemplary environment at a first time unit and having ten undifferentiated homogeneous nodes, each with a single communication channel, and an AA list node.

For the first example, the environment is set to produce a large number of C nodes and one H node. FIG. 55 shows one exemplary environment at a first time unit 2400 and having ten undifferentiated homogeneous nodes, each with a single communication channel, labeled 0 through 9, and an AA list node 2402. The initial state of each of these nodes is given in Table 3. Example 3, Initial States. The maximum association size is set to seven and the system quiescence wait time is set to three.

TABLE 3

| Example 3, Initial States | |
|---|---|
| Node # | State |
| 0 | I-active |
| 1 | I-active |
| 2 | I-active |
| 3 | I-active |
| 4 | I-active |
| 5 | I-active |
| 6 | I-active |
| 7 | I-active |
| 8 | I-active |
| 9 | I-active |

Figure 56:
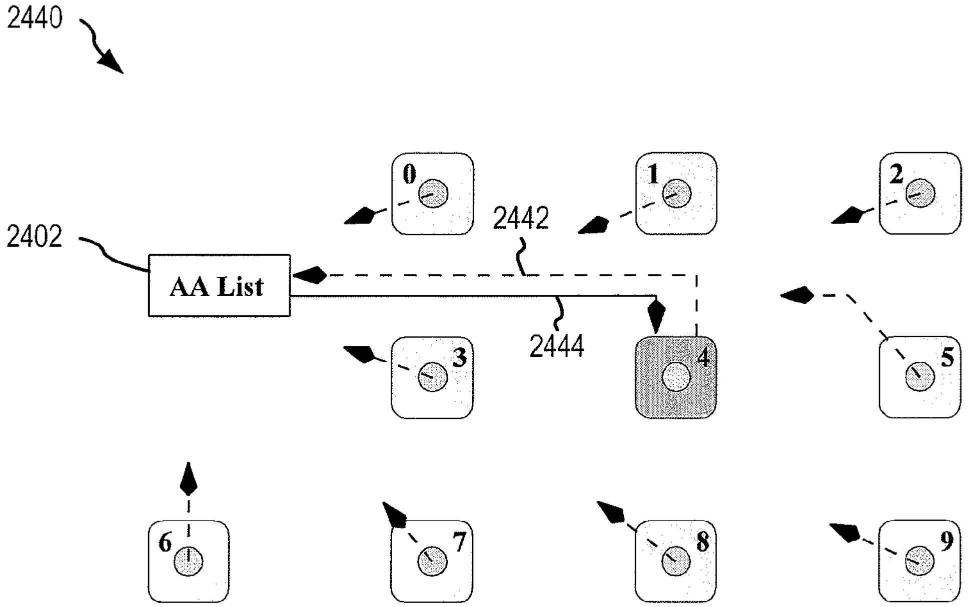
FIG. 56 shows the environment of FIG. 55 at a second time unit, illustrating a first node accessing the AA list node.

The number of nodes that can access the AA List is limited to one. FIG. 56 shows the environment of FIG. 55 at a second time unit 2240, where node 4 is the first to access 2442, 2444, AA list node 2402. It then transitions to T-init state, as shown in Table 4. Example 3, Time Unit 2 States.

TABLE 4

| Example 3, Time Unit 2 States | |
|---|---|
| Node # | State |
| 0 | I-active |
| 1 | I-active |
| 2 | I-active |
| 3 | I-active |
| 4 | T-init |
| 5 | I-active |
| 6 | I-active |
| 7 | I-active |
| 8 | I-active |
| 9 | I-active |

Figure 57:
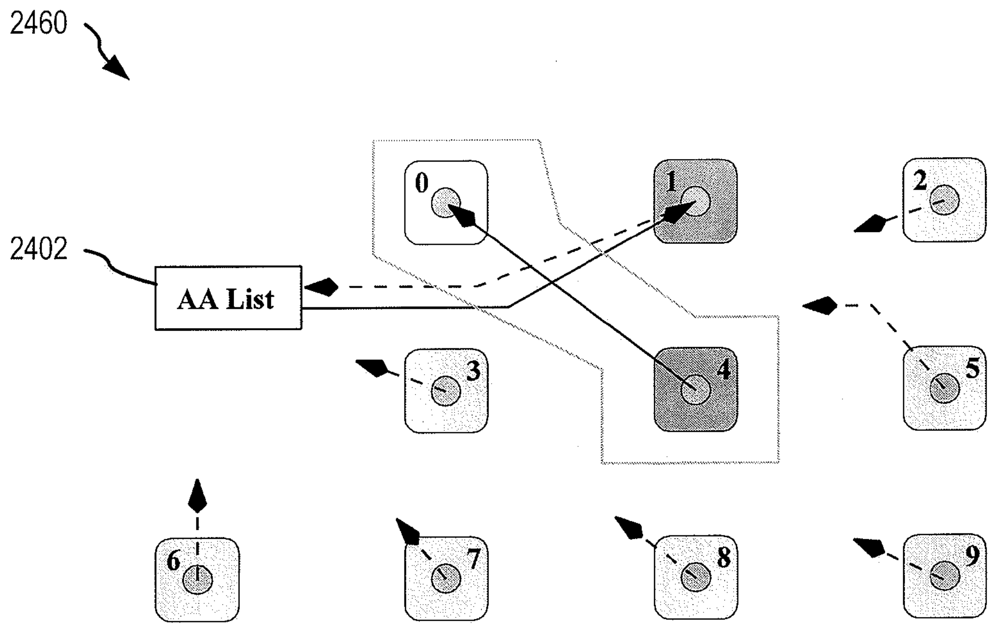
FIG. 57 shows the environment of FIG. 55 at a third time unit, illustrating a second node accessing the AA list node and the first node forming an association with another node.

Node 4 attempts to make contact with the other nodes, while they in-turn continue to attempt to acquire the AA List. Assuming node 1 is the next one to access AA list node 2402, and node 0 is contacted by node 4, as shown in third time unit 2460 of FIG. 57. Node 0 joins node 4's association and the node states are shown in Table 5. Example 3, Time Unit 3 States.

TABLE 5

| Example 3, Time Unit 3 States | |
|---|---|
| Node # | State |
| 0 | A-acquired |
| 1 | T-init |
| 2 | I-active |
| 3 | I-active |
| 4 | T-init |
| 5 | I-active |
| 6 | I-active |
| 7 | I-active |
| 8 | I-active |
| 9 | I-active |

Figure 58:
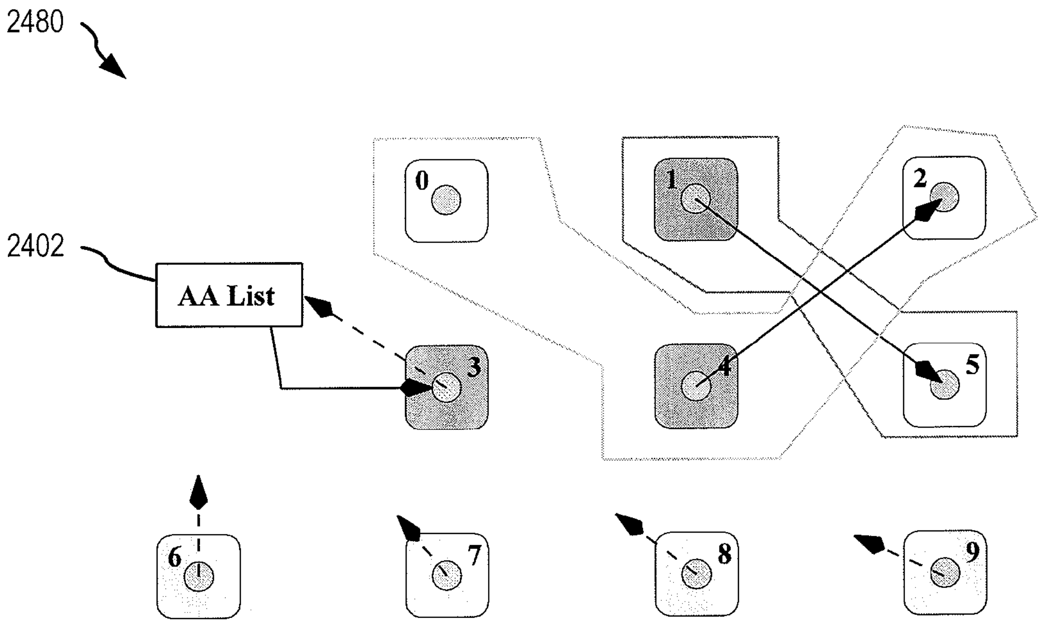
FIG. 58 shows the environment of FIG. 55 at a fourth time unit, illustrating the formation of a second association.

In the next step, shown in fourth time unit 2480 of FIG. 58, node 3 successfully acquires the AA List, while node 4 adds node 4 adds node 2 to its association, and node 1 adds node 5 to its association. Node states are shown in Table 6. Example 3, Time Unit 4 States.

TABLE 6

| Example 3, Time Unit 4 States | |
|---|---|
| Node # | State |
| 0 | A-acquired |
| 1 | T-init |
| 2 | A-acquired |
| 3 | T-Init |
| 4 | T-init |
| 5 | A-acquired |
| 6 | I-active |
| 7 | I-active |
| 8 | I-active |
| 9 | I-active |

Figure 59:
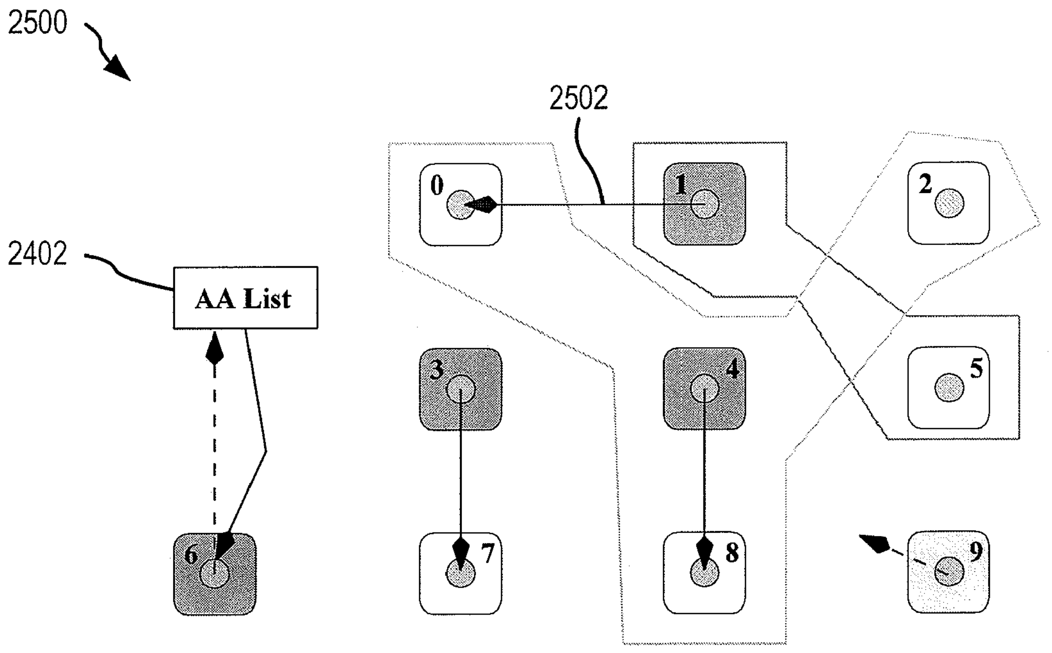
FIG. 59 shows the environment of FIG. 55 at a the start of a fifth time unit where the second association attempts to acquire a node within the first association.
Figure 60:
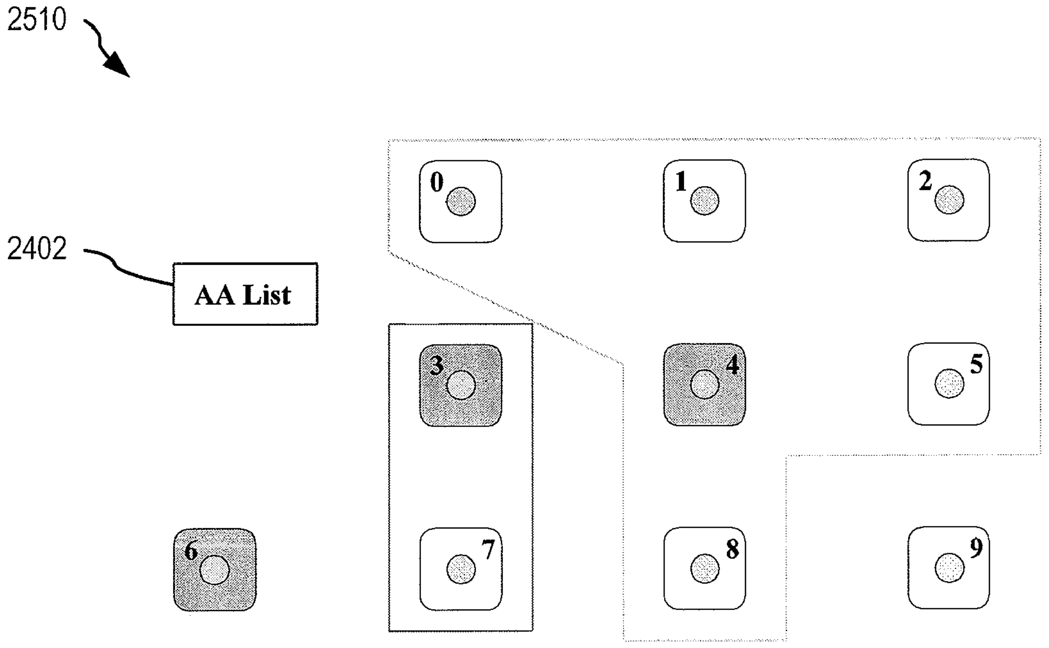
FIG. 60 shows the environment of FIG. 55 at a the end of the fifth time unit, illustrating the resulting association where nodes of the second association join the first association, and a third association is formed independently of this join.

FIG. 59 shows initial fifth time unit 2500 where node 1 attempts 2502 to contact node 0, while node 6 accesses the AA List, node 3 acquires node 7, and node 4 acquires node 8. Node 1 will lose to node 4, adding itself and node 6 to node 4's association, as shown in a final fifth time unit 2510 of FIG. 60 and Table 7. Example 3, Time Unit 5 Final States.

TABLE 7

| Example 3, Time Unit 5 Final States | |
|---|---|
| Node # | State |
| 0 | A-acquired |
| 1 | A-acquired |
| 2 | A-acquired |
| 3 | T-Init |
| 4 | T-init |
| 5 | A-acquired |
| 6 | T-init |
| 7 | A-acquired |
| 8 | A-acquired |
| 9 | I-active |

Figure 61:
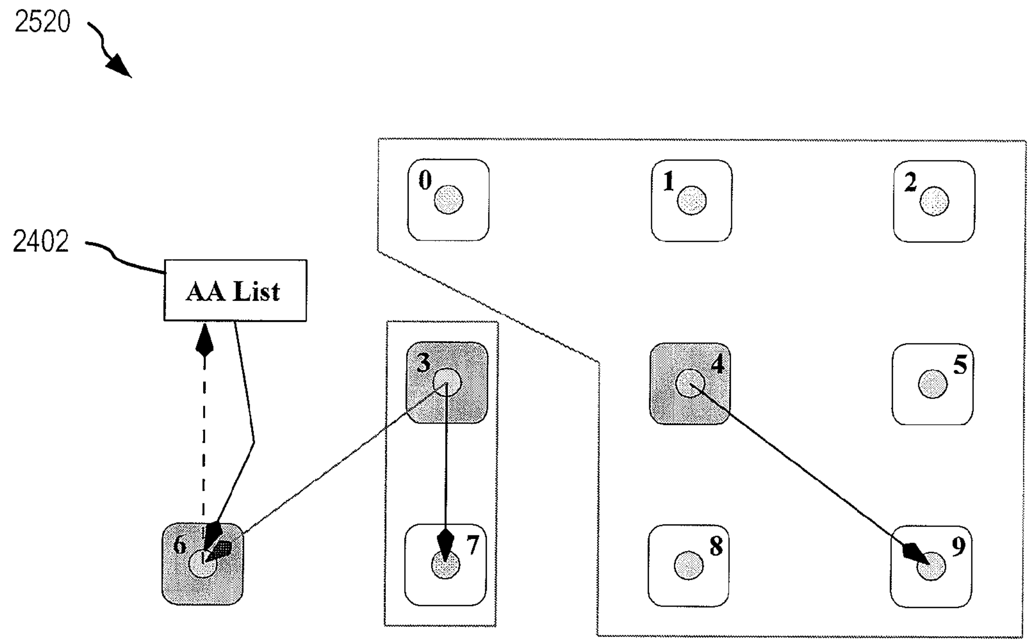
FIG. 61 shows the environment of FIG. 55 at the start of a sixth time unit where the first association attempts to acquire one of the two remaining nodes, and the third association attempts to acquire the other remaining node.
Figure 62:
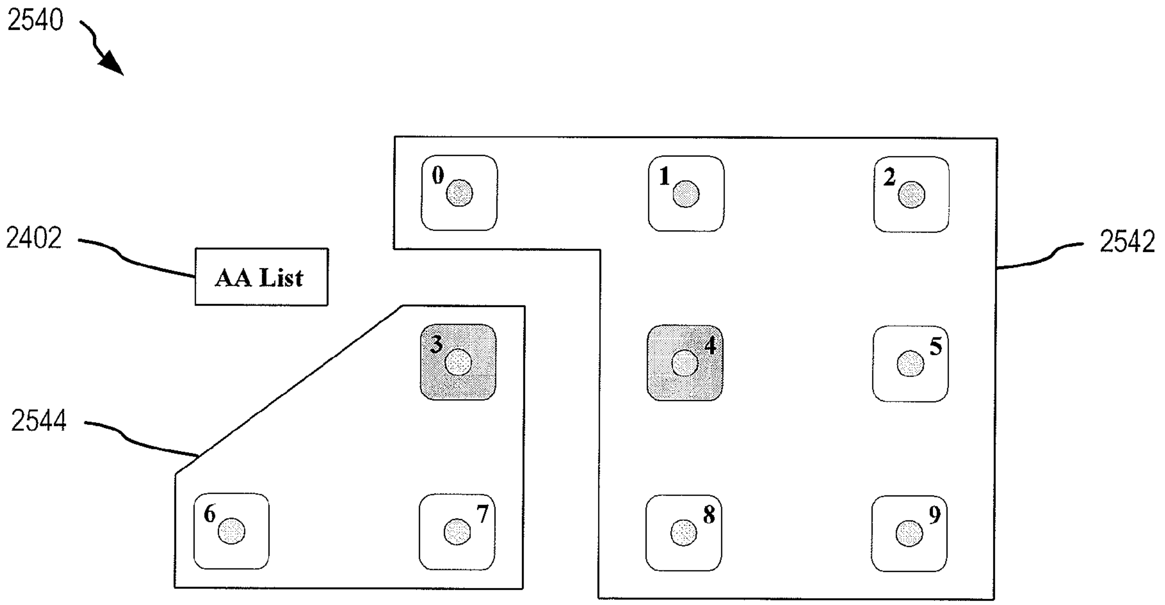
FIG. 62 shows the environment of FIG. 55 at the end of the sixth time unit, illustrating all nodes acquired between the first and the third associations.

Several sequences of events are possible next, but conflicts will tend to arise in most since all but one node are left in the I-init state. One relatively simple sequence, as shown in an initial sixth time unit 2520 of FIG. 61, would have Node 4 contact Node 9, thereby acquiring it within association 2542, while Node 3 contacts Node 6, causing Node 6 to become an acquired node within association 2544, as shown in final sixth time unit 2540 of FIG. 62 and Table 8. Example 3, Time Unit 6 Final States.

TABLE 8

| Example 3, Time Unit 6 Final States | |
|---|---|
| Node # | State |
| 0 | A-acquired |
| 1 | A-acquired |
| 2 | A-acquired |
| 3 | T-Init |
| 4 | T-init |
| 5 | A-acquired |
| 6 | A-acquired |
| 7 | A-acquired |
| 8 | A-acquired |
| 9 | A-acquired |

Figure 63:
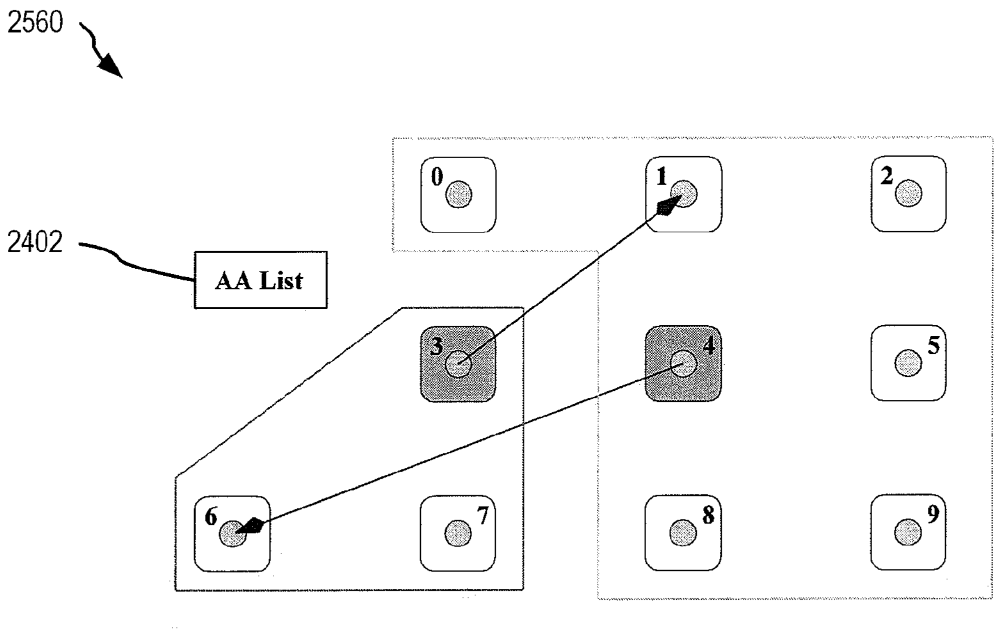
FIG. 63 shows the environment of FIG. 55 at the start of a seventh time unit where the first association attempts to acquire a node in the third association and the third association attempts to acquire a node in the first association.
Figure 64:
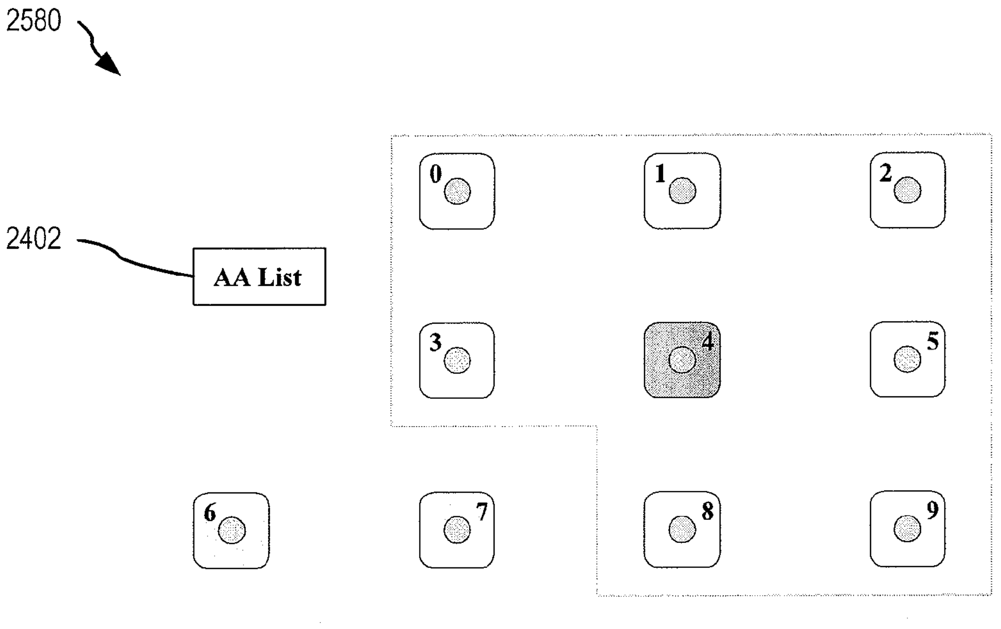
FIG. 64 shows the environment of FIG. 55 at the end of the seventh time unit, illustrating one node from the third association joining the first association, leaving two nodes without an association.

As shown in an initial seventh time unit 2560 of FIG. 63, node 3 and node 4 both experience conflicts during the next step when attempting to acquire nodes 1 and 6, respectively. As shown in final seventh time unit 2580 of FIG. 64, node 3 determines that the association of node 4 (via its contact of node 1) is greater, and therefore attempts to merge its association with the association of node 4. However, since the maximum node count for an association is defined as seven, only node three joins the association of node 4, leaving nodes 6 and 7 without an association.

Figure 65:
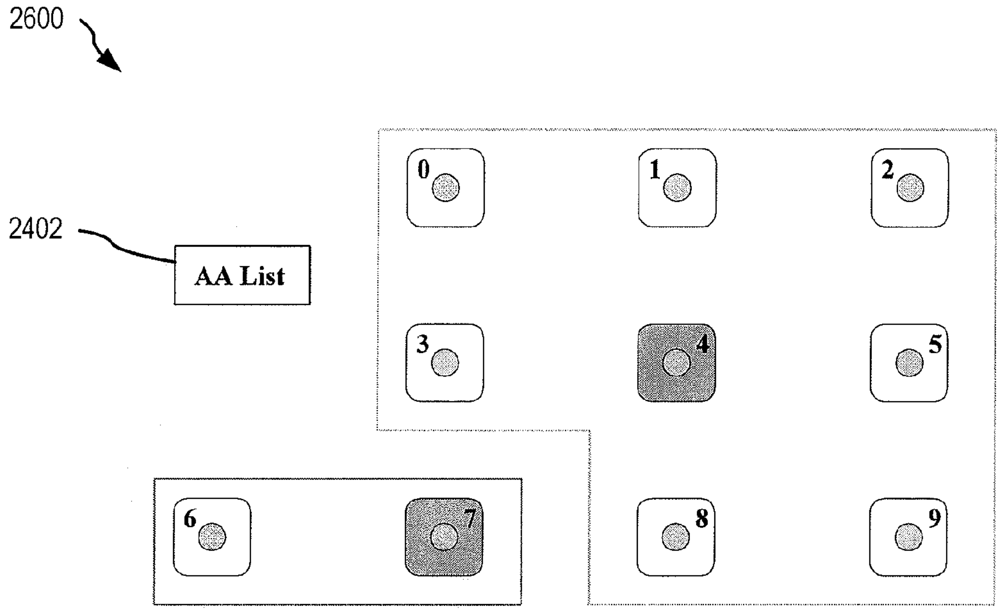
FIG. 65 shows the environment of FIG. 55 in a stable state, where the two un-associated nodes of FIG. 64 form a fourth association.

Nodes 6 and 7 will continue attempting to acquire the AA List until one has entered the T-init state, and the other has entered the A-acquired state. No further changes are possible, indicating the system has entered a stable state 2600 as shown in FIG. 65 and Table 9. Example 3, Stable System States. Once this stable state has been maintained for the system quiescence time period, the nodes will determine their final states.

TABLE 9

Example 3, Stable System States

| Node # | State |
|---|---|
| 0 | A-acquired |
| 1 | A-acquired |
| 2 | A-acquired |
| 3 | A-acquired |
| 4 | T-init |
| 5 | A-acquired |
| 6 | A-acquired |
| 7 | T-init |
| 8 | A-acquired |
| 9 | A-acquired |

Figure 66:
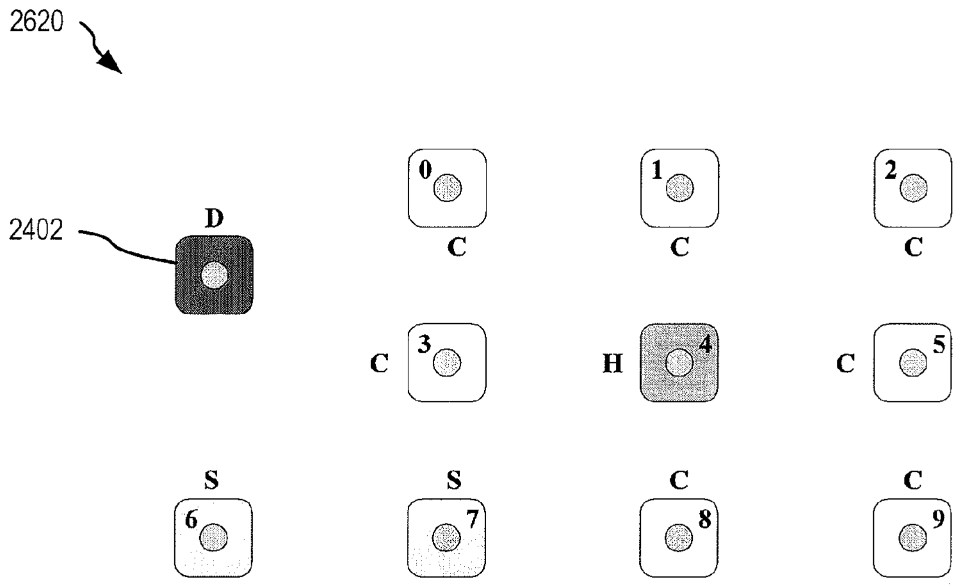
FIG. 66 shows final goal states of nodes in the environment of FIG. 55.

FIG. 66 shows final goal states 2620 of nodes in the network. Node 2402 becomes a diagnostic node since it contained the AA list; node 4 becomes a home node, nodes 6 and 7 become spare nodes and nodes 0, 10, 20, 30, 50, 8 and 9 become compute nodes.

EXAMPLE 4

Homogeneous 1-Channel Agents, Multiple H Nodes

Figure 67:
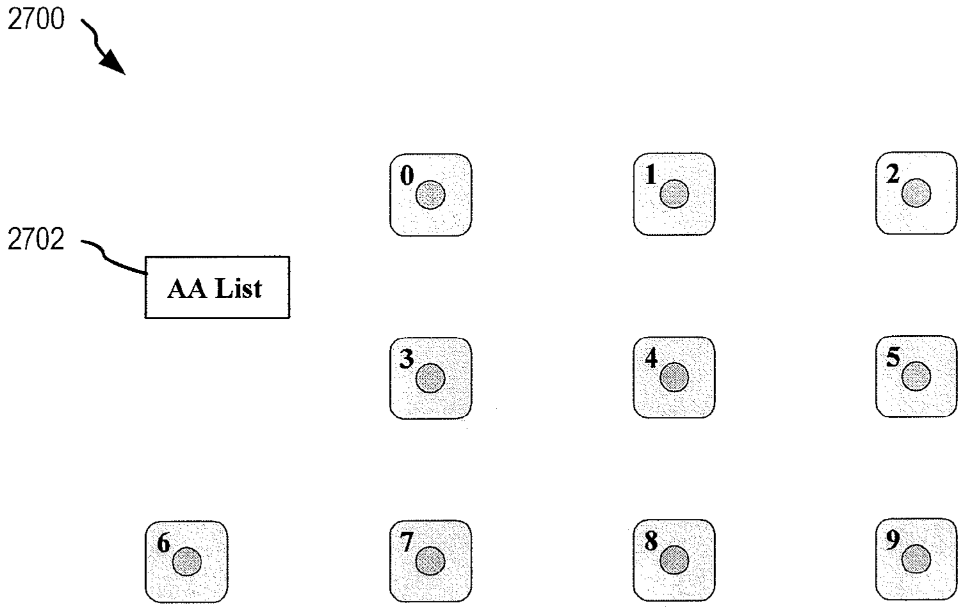
FIGS. 67-73 show exemplary time units of an environment forming multiple H nodes.

For the second example, multiple H nodes are produced. As shown in FIG. 67, an initial state 2700 has ten undifferentiated nodes labeled 0 through 9, each with a single communication channel. For this example, the maximum association size is set to 3, and the wait time is 3. Initial node states are shown in Table 10. Example 4 Initial States.

TABLE 10

Example 4 Initial States

| Node # | State |
|---|---|
| 0 | I-active |
| 1 | I-active |
| 2 | I-active |
| 3 | I-active |
| 4 | I-active |
| 5 | I-active |
| 6 | I-active |
| 7 | I-active |
| 8 | I-active |
| 9 | I-active |

Figure 68:
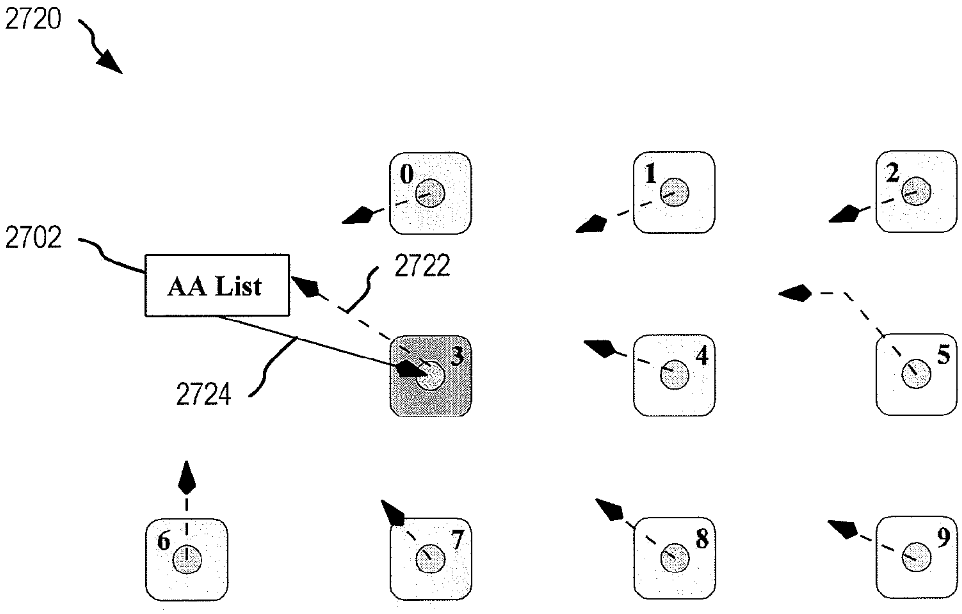

In a second time unit 2720, shown in FIG. 68, node 3 accesses 2722, 2724 the AA list within node 2702, resulting in the node states shown in Table 11. Example 4, Time Unit 2 States.

TABLE 11

Example 4, Time Unit 2 States

| Node # | State |
|---|---|
| 0 | I-active |
| 1 | I-active |
| 2 | I-active |
| 3 | T-init |
| 4 | I-active |
| 5 | I-active |
| 6 | I-active |
| 7 | I-active |
| 8 | I-active |
| 9 | I-active |

Figure 69:
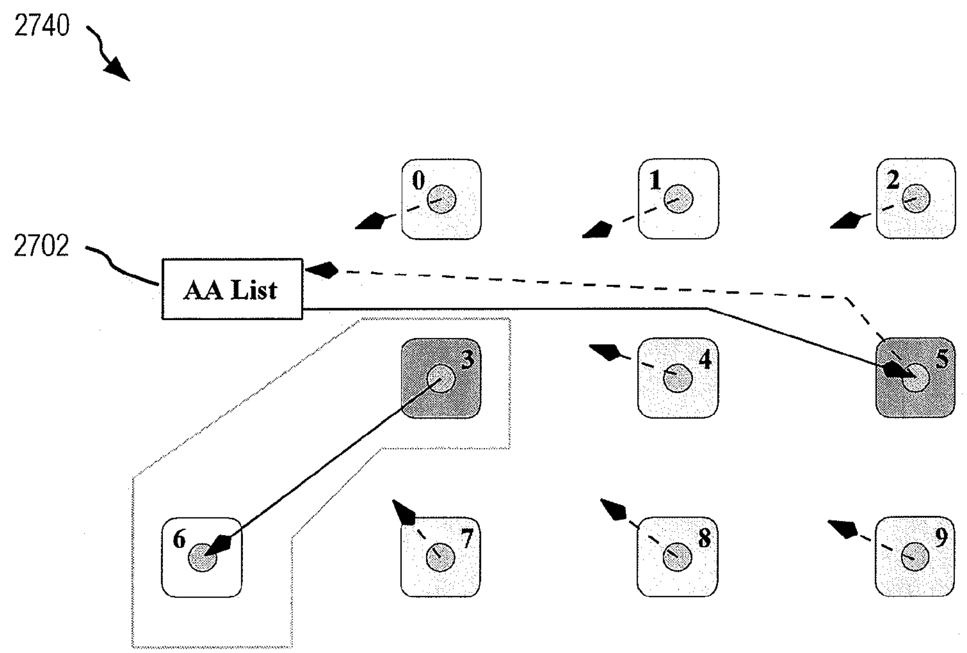

FIG. 69 shows a third time unit 2740 where node 5 accesses the AA list in node 2702 and node 3 acquires node 6, resulting in the states shown in Table 12. Example 4, Time Unit 3 States.

TABLE 12

Example 4, Time Unit 3 States

| Node # | State |
|---|---|
| 0 | I-active |
| 1 | I-active |
| 2 | I-active |
| 3 | T-init |
| 4 | I-active |
| 5 | T-init |
| 6 | A-acquired |
| 7 | I-active |
| 8 | I-active |
| 9 | I-active |

Figure 70:
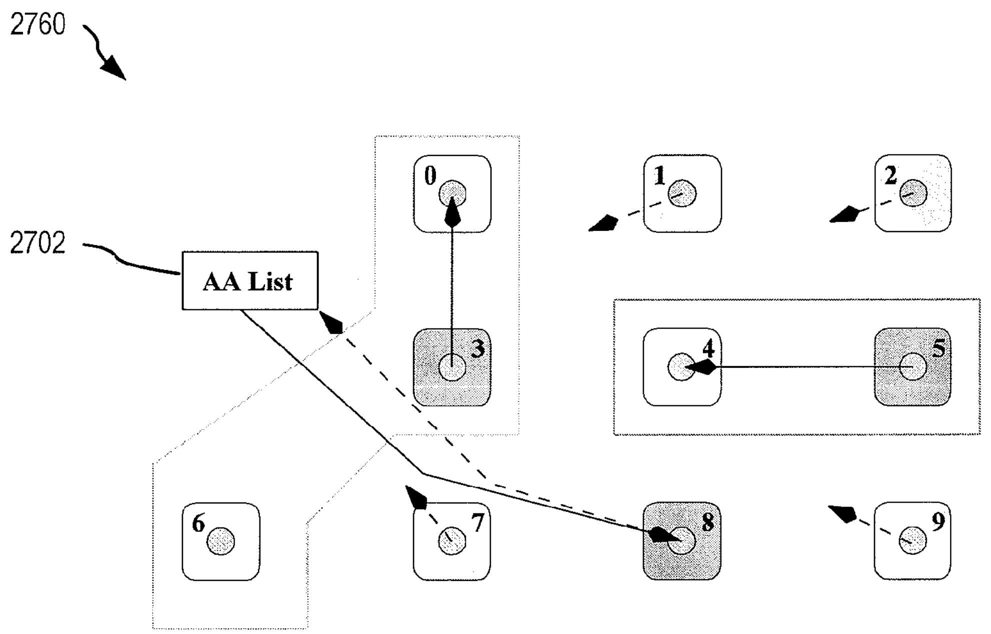

FIG. 70 shows a fourth time unit 2760 where node 8 accesses the AA list in node 2702, node 3 acquires node 0 and node 5 acquires node 4. Resulting states are shown in Table 13. Example 4, Time Unit 4 States.

TABLE 13

Example 4, Time Unit 4 States

| Node # | State |
|---|---|
| 0 | A-acquired |
| 1 | I-active |
| 2 | I-active |
| 3 | T-init |
| 4 | A-acquired |
| 5 | T-init |
| 6 | A-acquired |
| 7 | I-active |
| 8 | T-init |
| 9 | I-active |

Figure 71:
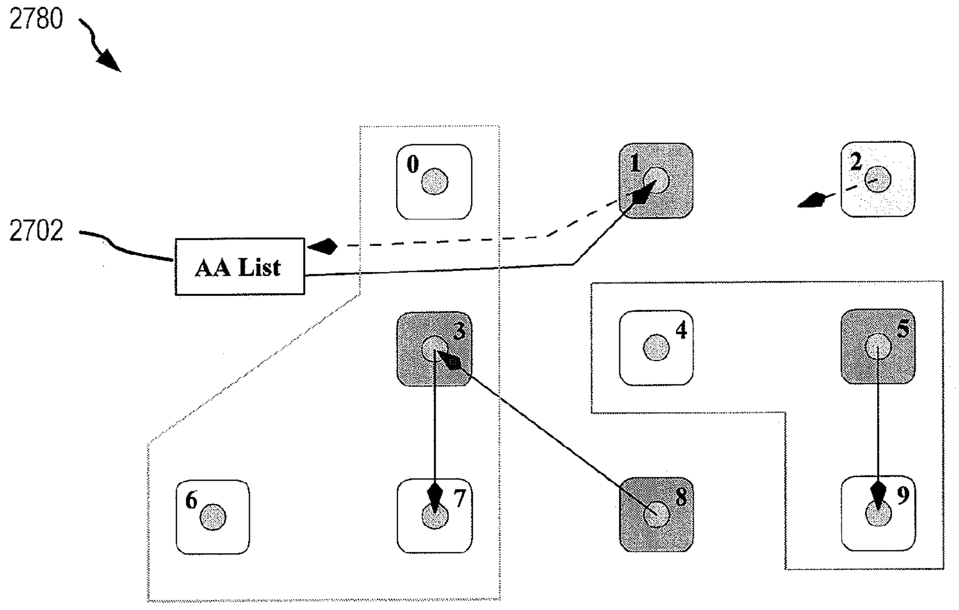
Figure 72:
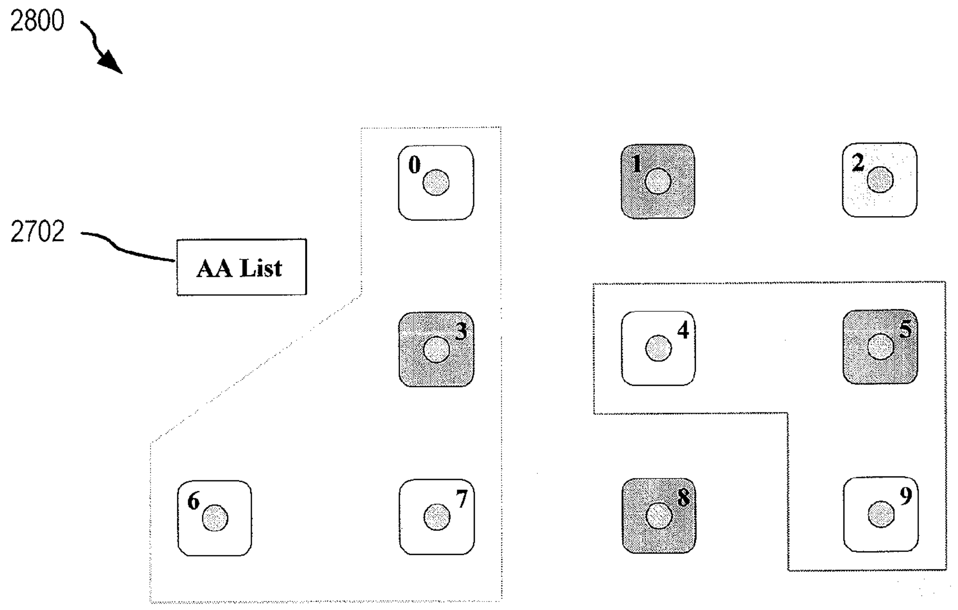

FIG. 71 shows an initial fifth time unit 2780 where node 3 acquires node 7, node 5 acquires not 9 and node 8 attempts to acquire node 3. Nodes 3 and 8 enter the T-compare state and since node 3 has reached the maximum association size (MaxA), node 8 transitions back to the T-init state, as shown in final fifth time unit 2800 of FIG. 72 and Table 14. Example 4, Time Unit 5 Final States.

TABLE 14

| Example 4, Time Unit 5 Final States | |
|---|---|
| Node # | State |
| 0 | A-acquired |
| 1 | T-init |
| 2 | I-active |
| 3 | T-init |
| 4 | A-acquired |
| 5 | T-init |
| 6 | A-acquired |
| 7 | A-acquired |
| 8 | T-init |
| 9 | A-acquired |

Figure 73:
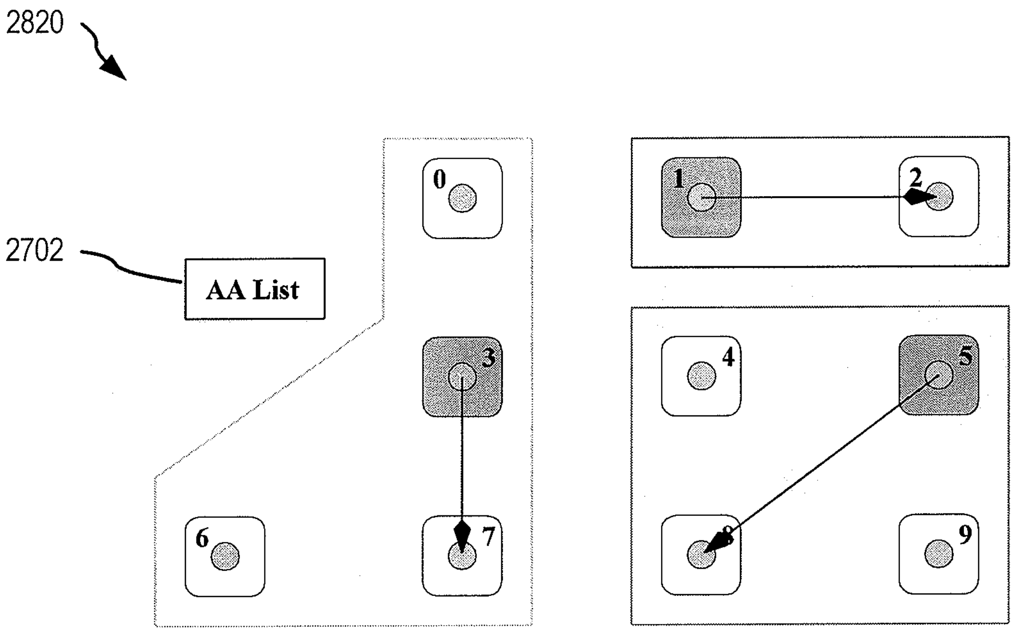

The transition from final fifth time unit state 2800 to a final state may occur in multiple ways. Given that node 5's association is only one node short of being full, it may acquire Node 3 directly, Nodes 2 or 8 by virtue of having the larger association, or some other combination. As shown in a final sixth time unit 2820 of FIG. 73, node 5 acquires node 8 and node 1 acquires node 2. Final node states are shown in Table 15. Example 4, Time Unit 6 Final States.

TABLE 15

| Example 4, Time Unit 6 Final States | |
|---|---|
| Node # | State |
| 0 | A-acquired |
| 1 | T-init |
| 2 | A-acquired |
| 3 | T-init |
| 4 | A-acquired |
| 5 | T-init |
| 6 | A-acquired |
| 7 | A-acquired |
| 8 | A-acquired |
| 9 | A-acquired |

Figure 74:
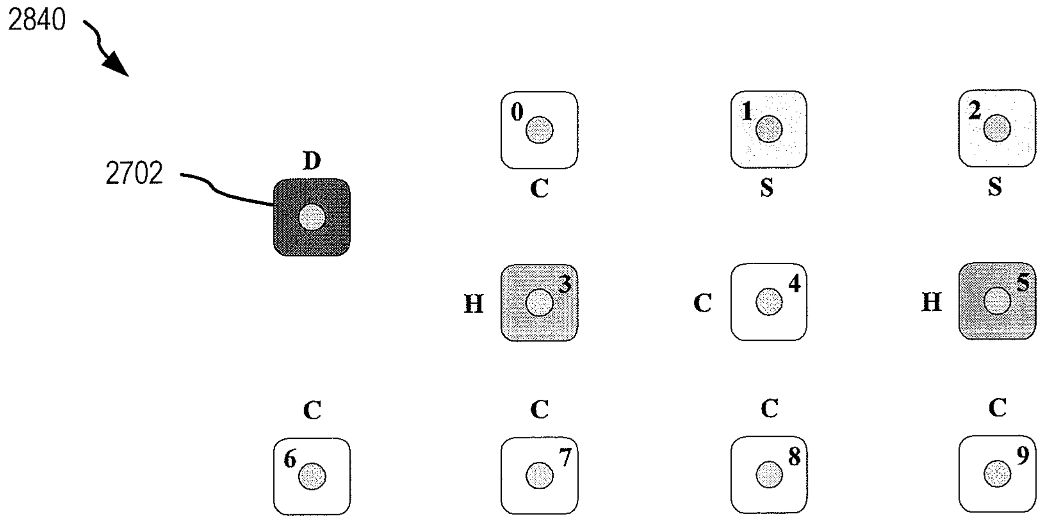
FIG. 74 shows final goal states in the environment of FIGS. 67-73.

Waiting for system quiescence means that all other nodes have been connected or the MaxA size has been reached for longer than the quiescence wait time. Final goal states 2840 for the network are shown in FIG. 74 and given in Table 16. Example 4, Goal States Achieved.

TABLE 16

| Example 4, Goal States Achieved | |
|---|---|
| Node # | State |
| 0 | C |
| 1 | S |
| 2 | S |
| 3 | H |
| 4 | C |
| 5 | H |
| 6 | C |
| 7 | C |
| 8 | C |
| 9 | C |

It should be noted that the AA List holding node 2702 receives a message from each agent that stays in T-QT state for longer than the quiescence wait time. Receipt of this message causes AA List holding node 2702 to change state to D. Nodes in the A-QT state for longer than the quiescence wait time will transition to the S state if their association group size is smaller than MaxA. Nodes in the A-QT state for longer than the quiescence wait time will transition to the C state if their association group size is equal to the MaxA size. Finally, nodes in the T-QT state will transition to the S state if their association size is less than the MaxA size, or the H state if their association size is equal to the MaxA size.

EXAMPLE 5

Heterogeneous Agents, 1 Home Node

Figure 75:
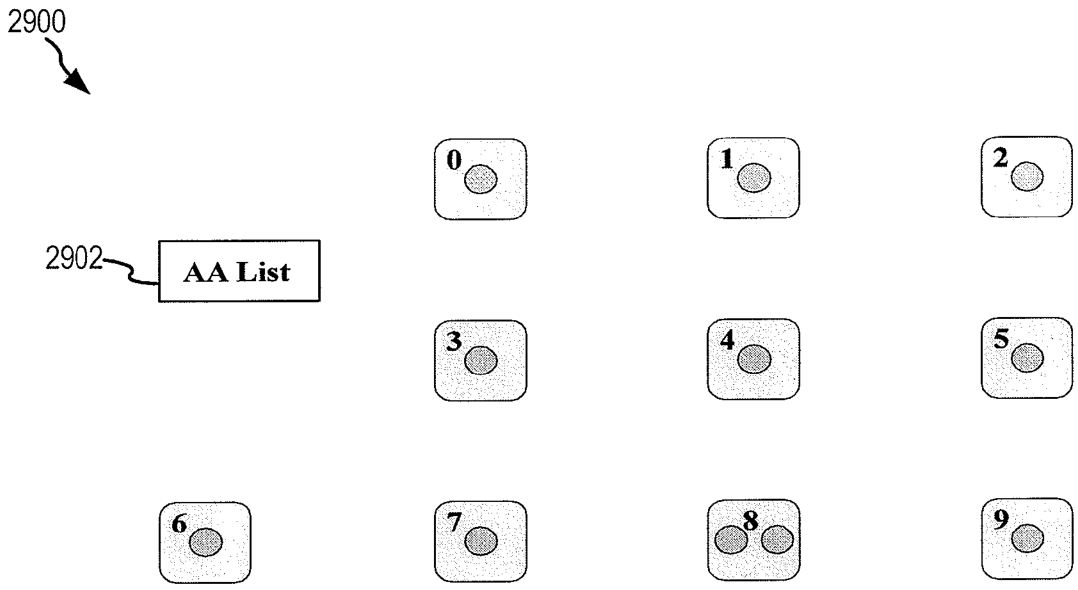
FIGS. 75-82 show exemplary time units of an environment forming of associations where one node has more communication channels that the other nodes.

FIG. 75 shows an initial environment 2900 having an AA list node 2902, nine undifferentiated nodes 0, 1, 2, 3, 4, 5, 6, 7 and 9 with a single communication channel and one undifferentiated node 8 with two communication channels. Since a Howard cascade and a Howard-Lupo manifold show advantages if the home-node contains more communication channels than the compute-node, this example shows that such differences determine home-node selection. The maximum association size is 3 and the wait time is 3. Initial node states are shown in Table 17. Example 5, Initial States.

TABLE 17

| Example 5, Initial States | |
|---|---|
| Node # | State |
| 0 | I-active |
| 1 | I-active |
| 2 | I-active |
| 3 | I-active |
| 4 | I-active |
| 5 | I-active |
| 6 | I-active |
| 7 | I-active |
| 8 | I-active |
| 9 | I-active |

Figure 76:
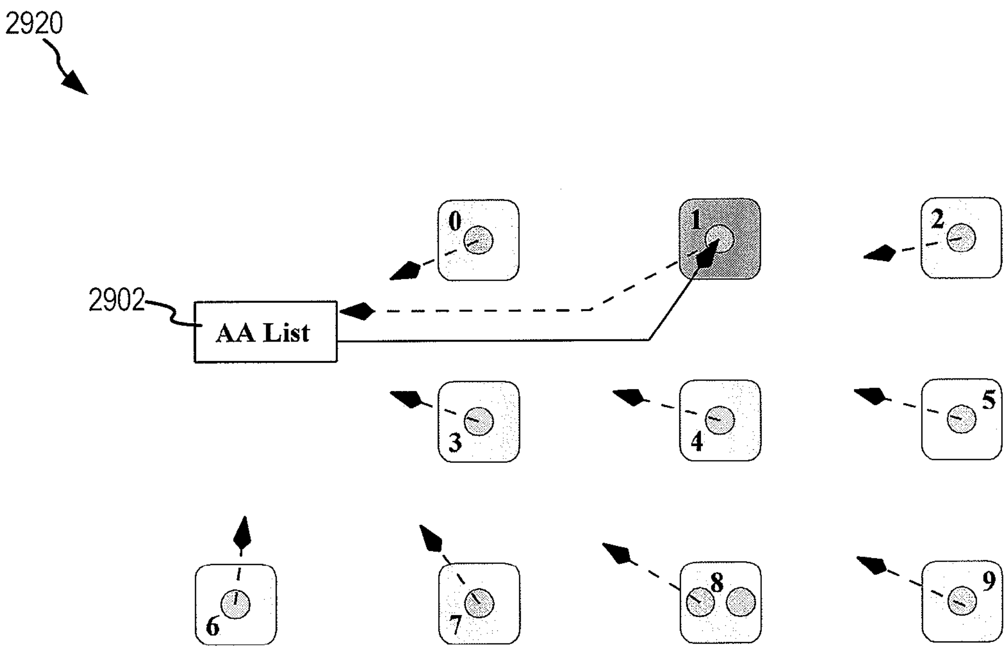

FIG. 76 shows a second time unit 2920 where node 1 has gained access to the AA List of node 2902, resulting in the node states shown in Table 18. Heterogeneous Agents, 1 Home Node, Time Unit 2.

TABLE 18

| Heterogeneous Agents, 1 Home Node, Time Unit 2 | |
|---|---|
| Node # | State |
| 0 | I-active |
| 1 | T-init |
| 2 | I-active |
| 3 | I-active |
| 4 | I-active |
| 5 | I-active |
| 6 | I-active |
| 7 | I-active |
| 8 | I-active |
| 9 | I-active |

Figure 77:
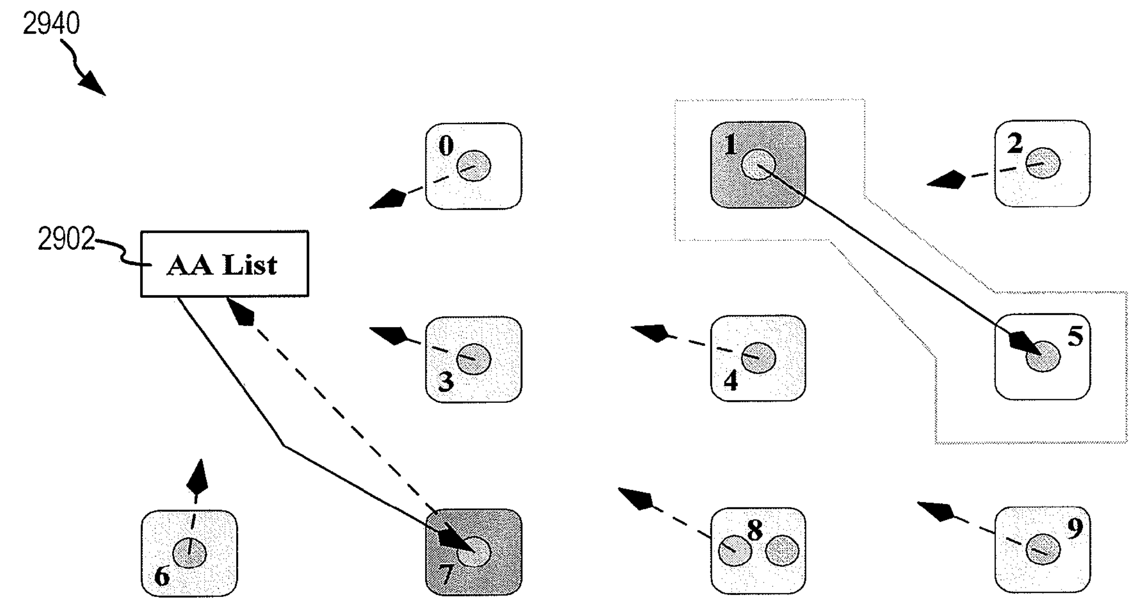
Figure 78:
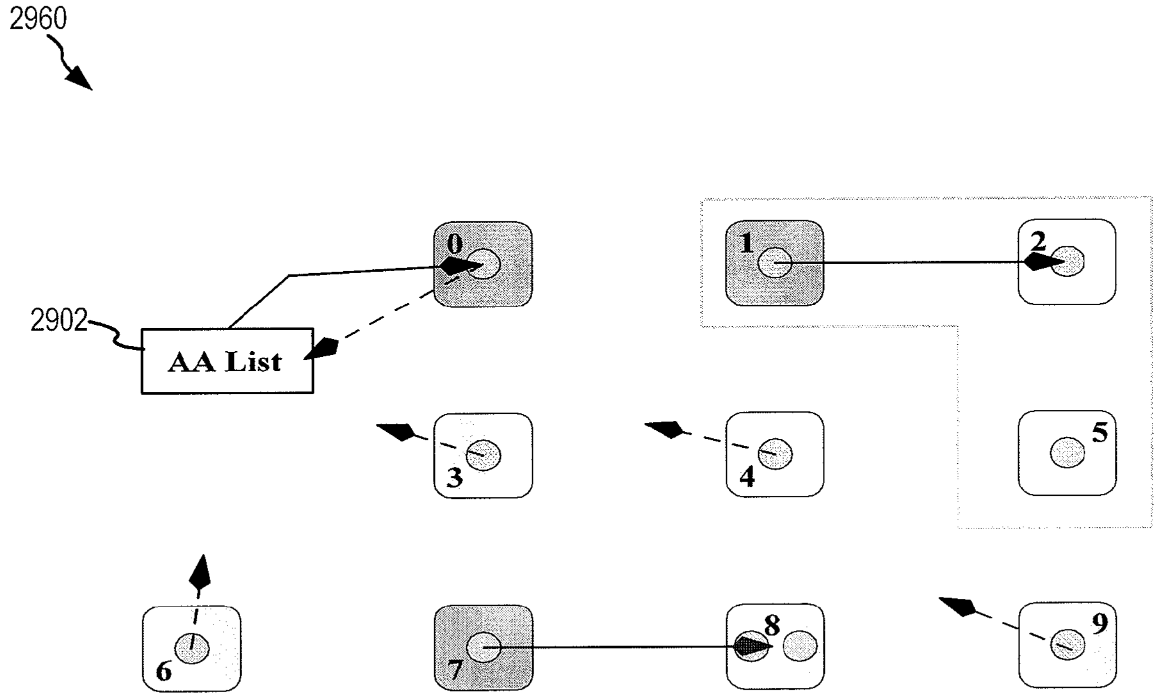

As shown in a third time unit 2940 of FIG. 77, node 7 accesses the AA list of node 2902 and node 1 acquires node 5. Resulting states are shown in Table 19. Example 5, Time Unit 3 States.

TABLE 19

| Example 5, Time Unit 3 States | |
|---|---|
| Node # | State |
| 0 | I-active |
| 1 | T-init |

TABLE 19-continued

| Example 5, Time Unit 3 States | |
|---|---|
| Node # | State |
| 2 | I-active |
| 3 | I-active |
| 4 | I-active |
| 5 | A-acquired |
| 6 | I-active |
| 7 | T-init |
| 8 | I-active |
| 9 | I-active |

Figure 79:
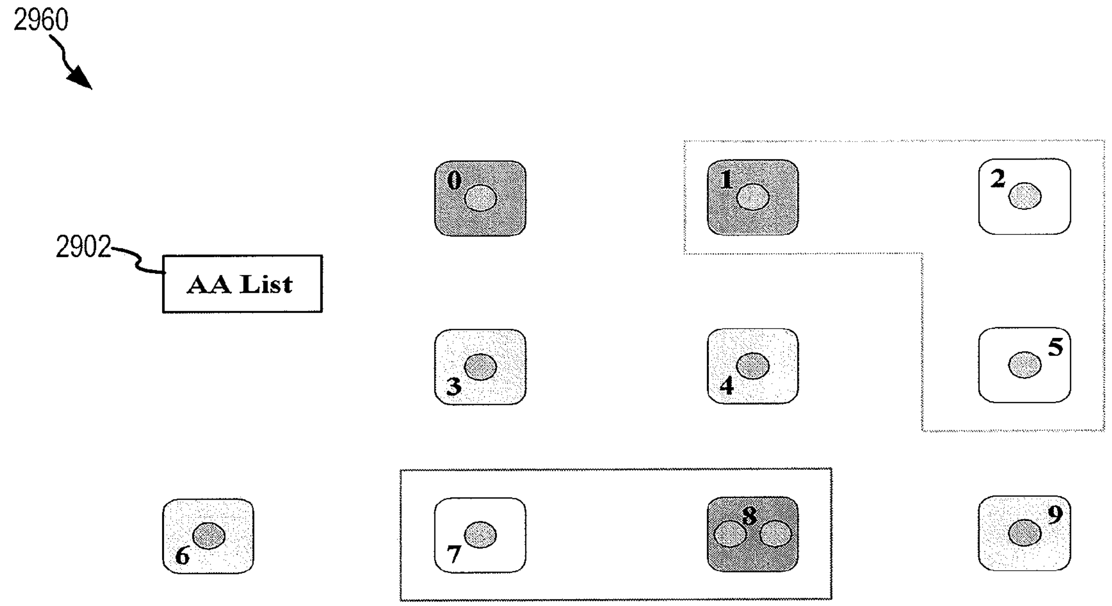

As shown in initial fourth time unit 2960 of FIG. 79, node 0 accesses the AA list of node 2902, node 7 attempts to acquire node 8 and node 1 attempts to acquire node 2. Nodes 7 and 8 determine that node 8 has more channels than node 7 and therefore node 8 transitions to the T-init state and node 7 transitions to the A-acquired state, effectively joining the association of node 8. Node states are shown in Table 20. Example 5, Time Unit 4 Final States.

TABLE 20

| Example 5, Time Unit 4 Final States | |
|---|---|
| Node # | State |
| 0 | T-init |
| 1 | T-init |
| 2 | A-acquired |
| 3 | I-active |
| 4 | I-active |
| 5 | A-acquired |
| 6 | I-active |
| 7 | A-acquired |
| 8 | T-init |
| 9 | I-active |

Figure 80:
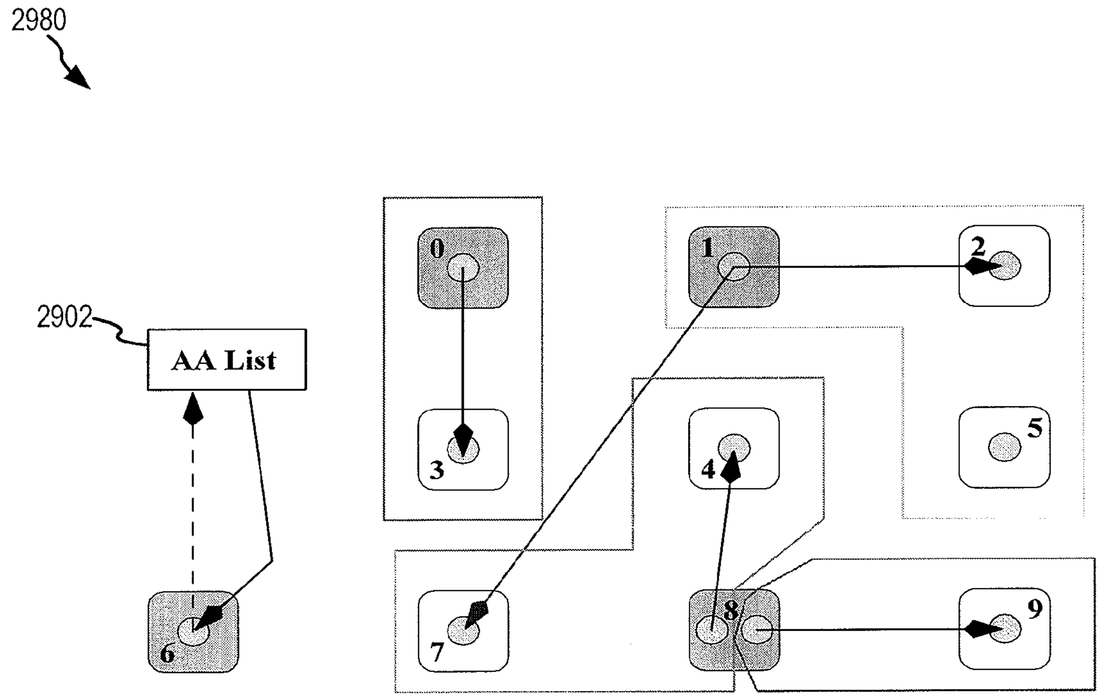
Figure 81:
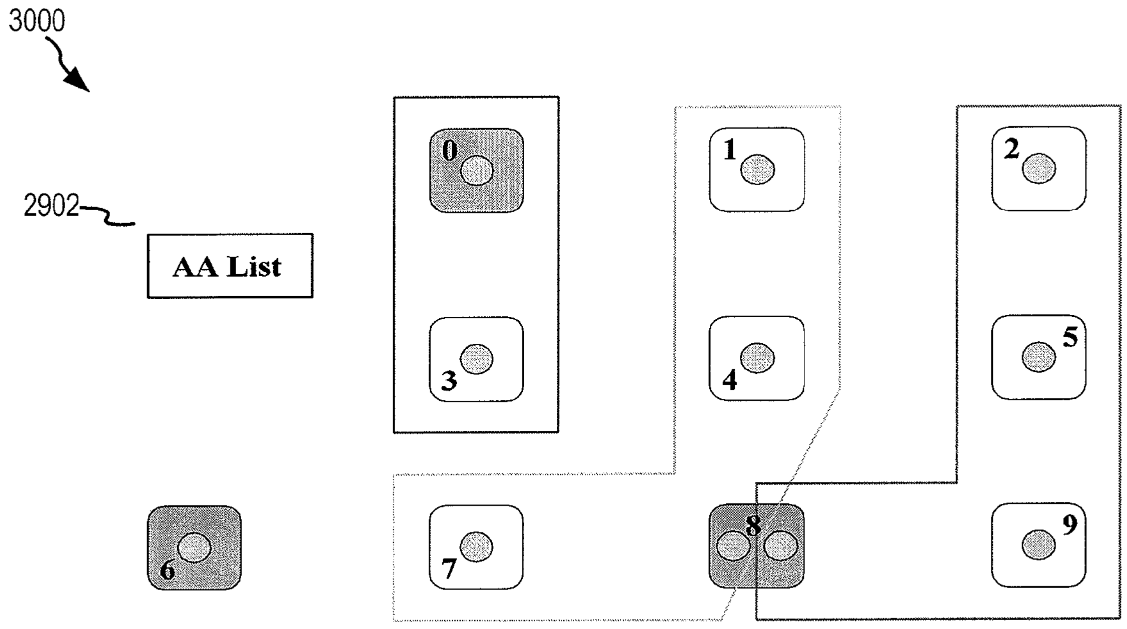

There are multiple ways to proceed from here, however, in this example, the next is shown in initial fifth states 2980 of FIG. 80, where node 6 gains access to the AA list of node 2902, node 0 acquires node 3, node 8 simultaneously acquires nodes 4 and 9 and node 1 discovers that node 7 is a member of an association whose T-init agent has more communication channels than it does. Node 1 and its association therefore joins the association of node 8, filling the associations on all channels of node 8 as shown in final fifth time unit 3000 of FIG. 81. Node states are shown in Table 21. Example 5, Time Unit 5 Final States.

TABLE 21

| Example 5, Time Unit 5 Final States | |
|---|---|
| Node # | State |
| 0 | T-init |
| 1 | A-acquired |
| 2 | A-acquired |
| 3 | A-acquired |
| 4 | A-acquired |
| 5 | A-acquired |
| 6 | T-init |
| 7 | A-acquired |
| 8 | T-init |
| 9 | A-acquired |

Figure 82:
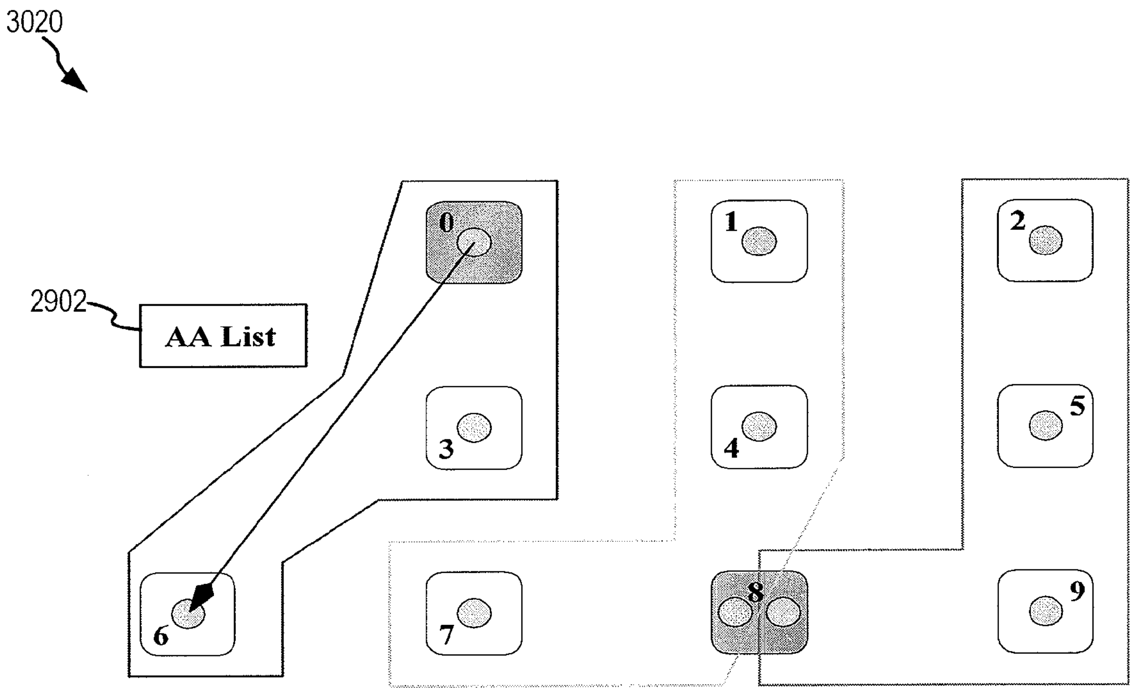

Since node 8 has filled its associations, node 0 will ultimately acquire node 6, leaving the system in its final stable state as shown in stable fifth time unit 3020 of FIG. 82 and Table 22. Example 5, Final Stable State.

TABLE 22

| Example 5, Final Stable State | |
|---|---|
| Node # | State |
| 0 | T-init |
| 1 | A-acquired |
| 2 | A-acquired |
| 3 | A-acquired |
| 4 | A-acquired |
| 5 | A-acquired |
| 6 | A-acquired |
| 7 | A-acquired |
| 8 | T-init |
| 9 | A-acquired |

Figure 83:
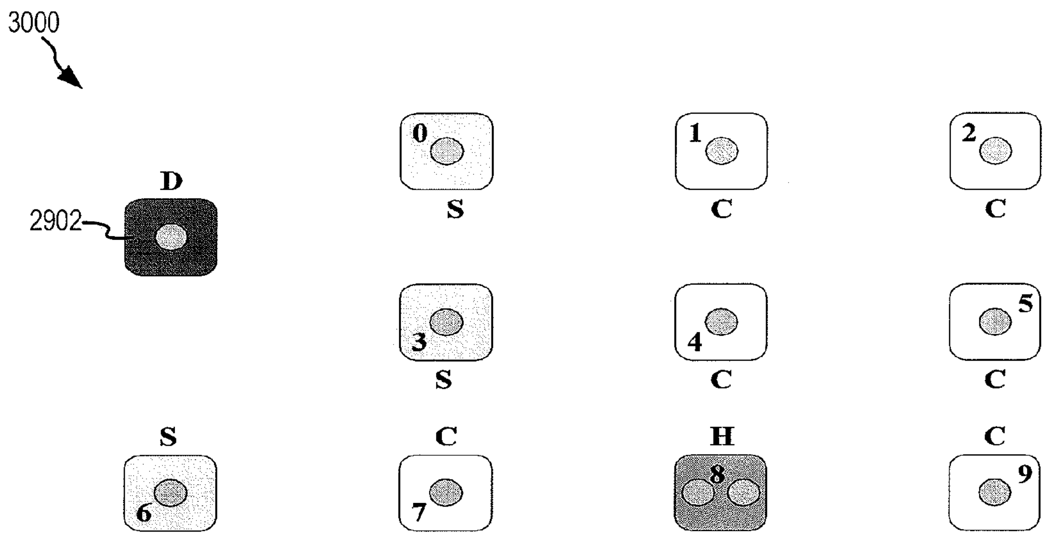
FIG. 83 shows final goal states in the environment of FIGS. 75-82.

Nodes 0 and 8 will continue cycling but no changes are possible, so the quiescent system wait time will expire, and the nodes will transition into their goal states as shown in FIG. 83, where node 2902 becomes a diagnostic node, node 8 becomes a home node, nodes 1, 2, 4, 5, 7 and 9 become compute nodes and nodes 0, 3 and 6 become spare nodes.

Interpretation

All three examples show that the system is able to organize itself without the need for a forced (hard-coded) solution. The low-level behaviors defined by the state machine (see state diagrams of FIGS. 41 and 54) allowed all nodes in the system to determine their final goal states, which represent a higher level of organization with more capability than possessed by the individual nodes. This is clearly an example of stigmergy.

Phase III—Use, Cluster Formation

Once node differentiation is complete, a lead home node, called H node 0, must be identified. This home node becomes the primary resource controller, allocating resources to jobs submitted from the outside world. Since all nodes have access to complete H, C, and S lists, they can all sort their copies of the H list and identify the top H node on the list as H node 0. The remaining nodes on the H list assume the roles of auxiliary home nodes, taking their ID number from their corresponding position in the H List. The diagnostic node makes the address of H node 0 available to the gateway system, indicating than the cluster is ready to accept job submissions.

H node 0 initializes the list of inactive C nodes from the C list, and prepares other elements of the job control system. Once set up, H node 0 is ready to receive job start messages from the outside world.

Cascade Formation

The receipt of a job start message initiates cascade formation. The job message contains information on the algorithm to execute, the number of C nodes requested, and data sources. H node 0 examines the number of C nodes required and adjusts the number to match the largest cascade number that is neither more than the requested number of nodes nor more than the available number of nodes. If more nodes were requested than available on the system, the job may be rejected or allowed to proceed with a smaller number. The final number represents the target cascade size. H node 0 may hold the job request in a queue until the target number of nodes is available.

Once the target number of nodes becomes available, H node 0 moves C nodes from the inactive list into a job allocation list. This list, and other job information is sent to the first node in the allocation list. This C node examines the cascade size, number of channels, and its position in the allocation list and determines which cascade strip C node(s) it heads. From the cascade strip size, it determines how many sub-cascade strips are present, thus how many C nodes it must send the job information to. It forwards the job information on to these C nodes, while H node 0 continues to forward job information to the other cascade strips. Each receiving C node performs the same analysis, determining the number of top-level sub-cascade strip C nodes it must communicate with. As soon as each C node has completed all required data forwarding, the cascade has been formed and it is ready to begin processing. H node 0 and all C nodes terminate job information forwarding at nearly the same time and can begin acquiring any data sets required by the job.

Based on the job information, each C node is aware of how job data will be received. It might have been provided inline with the job request, may be acquired from an H node 0 connection to the remote host and cascaded down, read from local or remote files, and pipe-lined or streamed in from the auxiliary H nodes. Given the type of data acquisition, size of the cascade, and algorithm requested, the data may be discretized in the process of distribution. Additional load balancing information may be provided in terms of static performance figures, and the option of initiating dynamic load balancing is also available.

The C nodes are able to recognize the need for cross-communication based on the algorithm requested. If required, the necessary connections are created on all available channels. Once this is done, and all data has been received, the C nodes can begin processing their portions of the job.

Once the computations are completed, the C nodes refer to the job information to determine the type of data agglomeration to perform. Cascade and multi-H node agglomeration methods are available, allowing information to be agglomerated at H node 0 for transmission back to the remote host. Streaming results back through the auxiliary home nodes is also supported, allowing for the manipulation of large data sets and processing pipelines involving continuous flows of input and output data.

Figure 84:
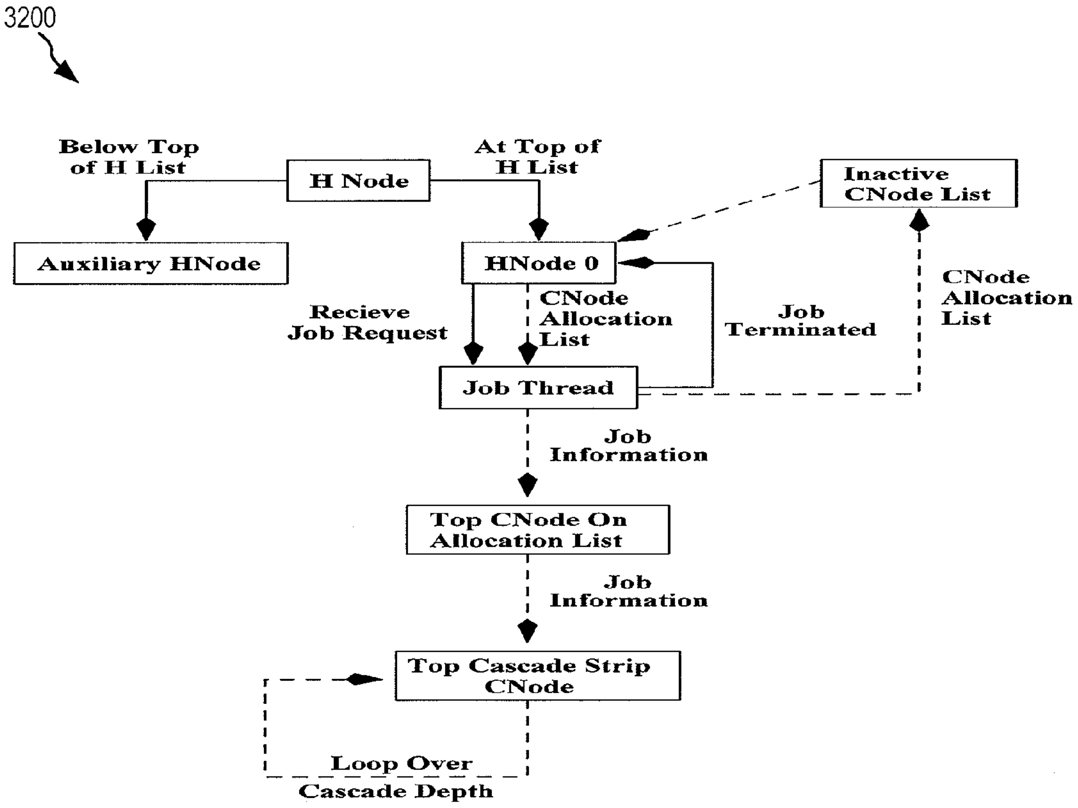
FIG. 84 shows one exemplary cascade formation state diagram illustrating state transitions that may occur during cascade formation.

FIG. 84 shows one exemplary cascade formation state diagram 3200 illustrating state transitions that may occur during cascade formation.

EXAMPLE 6

1-Channel, Depth-3 Cascade

Figure 85:
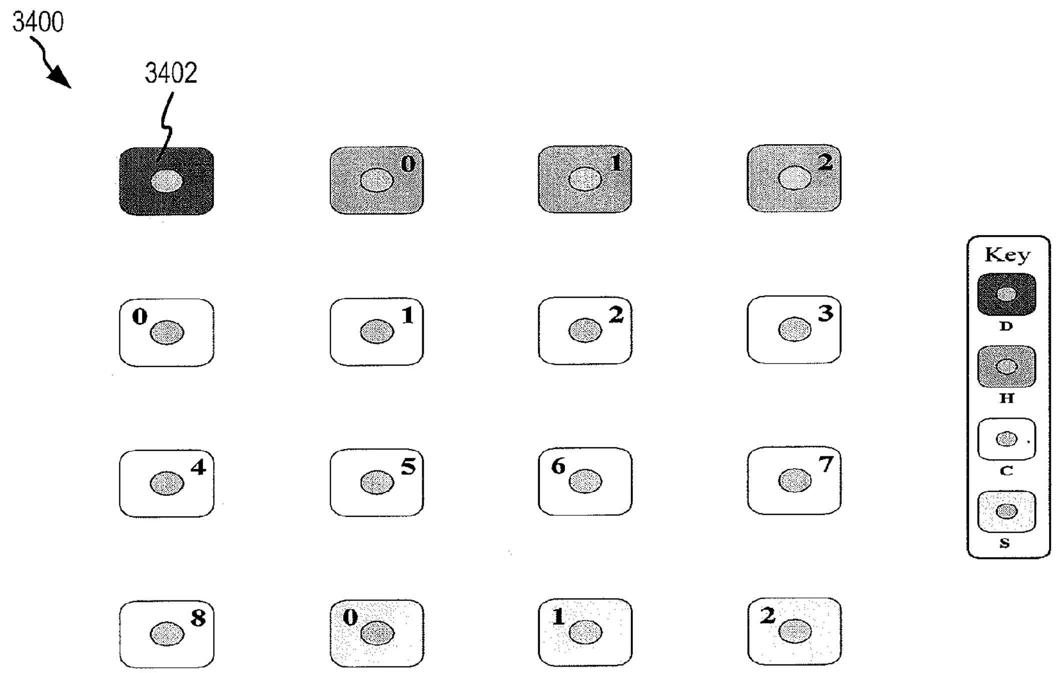
FIGS. 85-89 show exemplary steps to form a 1 channel, depth 3 cascade.
Figure 86:
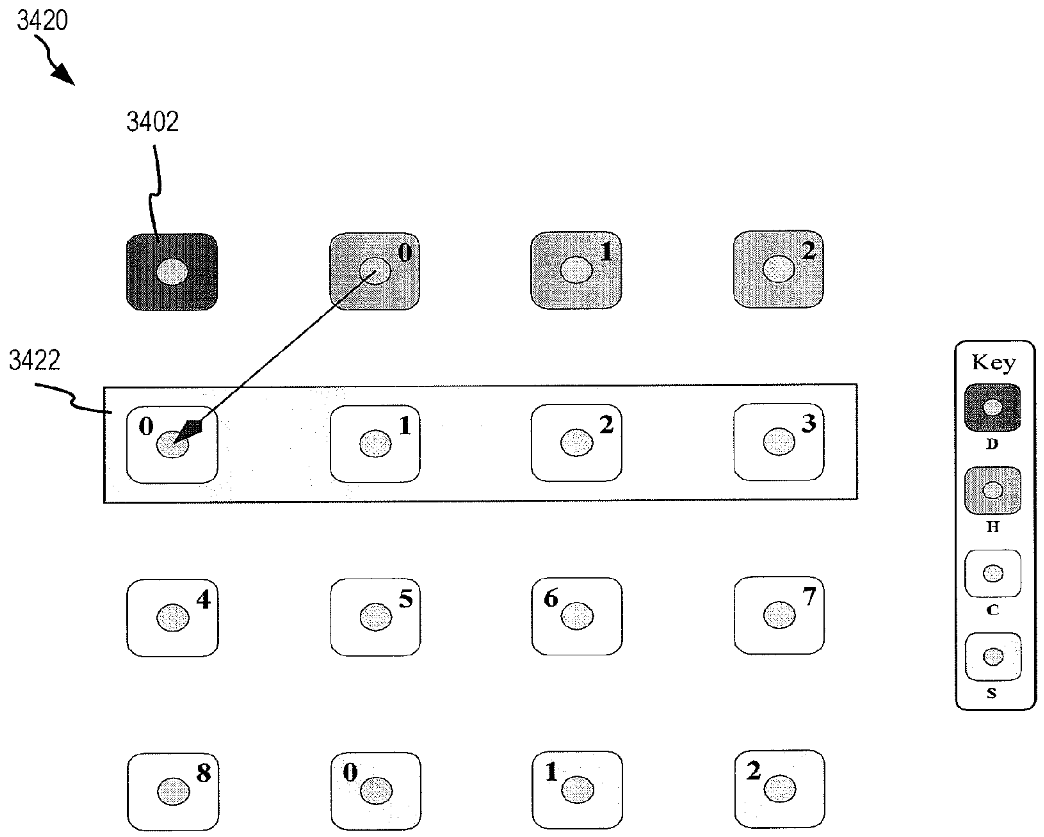

As an example, consider the situation shown in FIG. 85. A fully differentiated cluster has been formed consisting of one D node 3402, three H nodes 0, 1 and 2, nine C nodes 0-8, and three S nodes 0, 1 and 2. H node 0 has been identified, and 9 C nodes on are the inactive list. Assume that a job request has been received requesting 7 C nodes. H node 0 is aware that 7 C nodes correspond to a 1-channel cascade with 3 expansion steps. Consequently, there will be 3 cascade strips containing 4, 2 and 1 node each. Therefore, in the first time unit, the top C node in the largest strip will receive job information. In effect, C nodes 0 through 3 are reserved for a strip 3422, as shown in FIG. 86.

Figure 87:
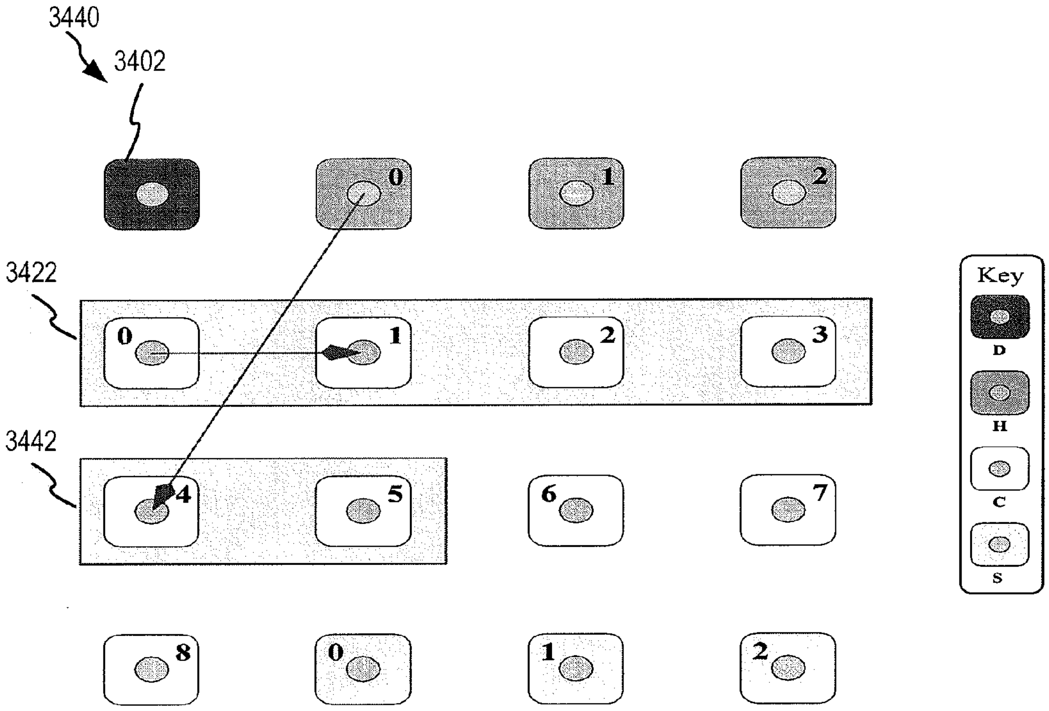
Figure 88:
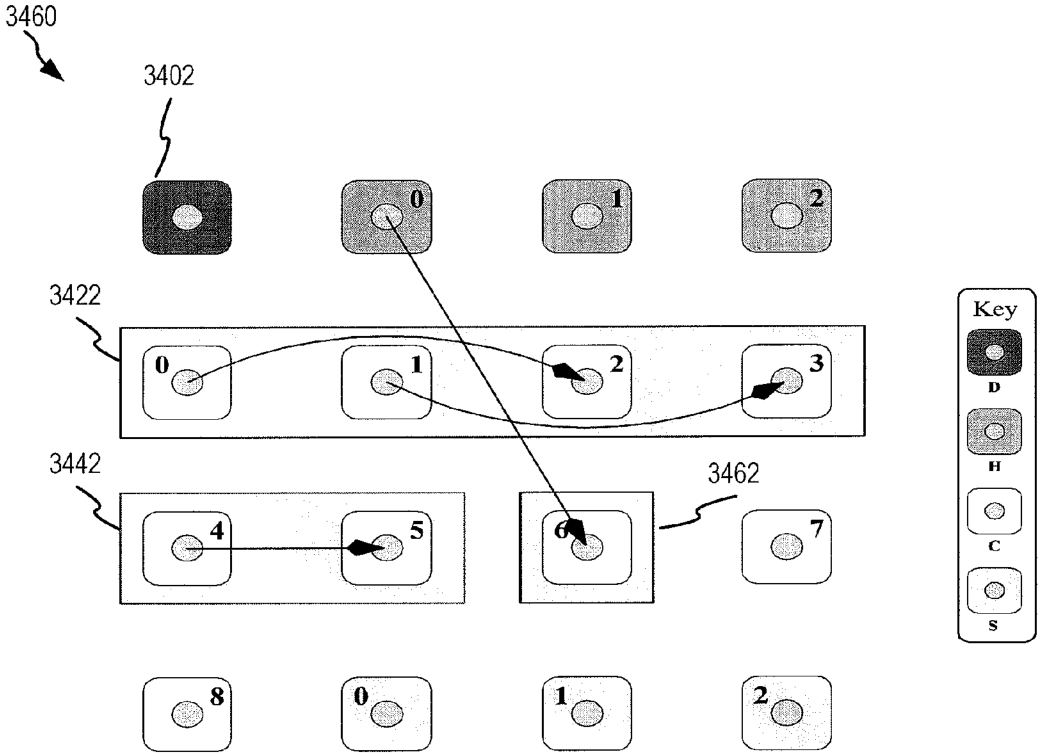

C node 0 is now aware that a 7 node job has been requested, and it knows that it is at the top of 4 node cascade strip 3422. It, therefore, determines that it will be contacting the top C nodes in two sub-cascades. In the second time unit 3440, as shown in FIG. 87, C node 0 sends the job information to the top C node (C node 4) of a first sub-cascade 3442. FIG. 88 shows a third time unit 3460 where H node 0 sends the data to the top C node (C node 6) of a second cascade strip 3462. H node 0, C nodes 0, 1, and 4 are all aware that they must send the job data to one other C node.

Figure 89:
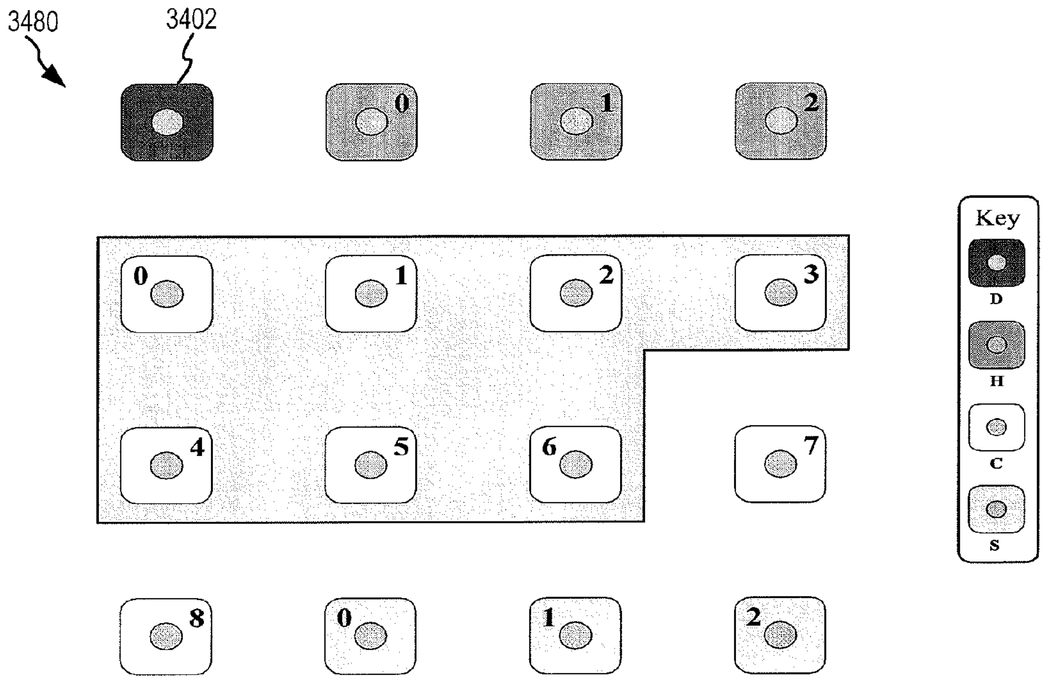

As shown in FIG. 89, all seven C nodes have now been allocated for the job and will initiate their data acquisition, processing, and data agglomeration steps. Two C nodes (7 and 8) remain inactive and could be used to handle two more jobs, if each requested only one C node (depth-1 cascades).

Once the job has completed, H node 0 will place the C nodes (C nodes 0, 1, 2, 3, 4, 5 and 6) back on the inactive list, making them available for reuse during a future job. Note that the order of assignment becomes nearly random after a few jobs of varying sizes have been run. Also, no cluster level synchronization is provided, other than the movement of job information.

Manifold and Hyper-Manifold Formation

Since the D node starts with the list of available resources, manipulation of this list would allow the formation of higher level structures, such as Howard-Lupo Manifolds, and Howard-Lupo Hyper-Manifolds. A manifold is a cascade of H nodes, and to each H node, a cascade group is attached. Likewise, a hyper-manifold is a cascade of manifolds. Thus, one can directly apply the self-organizing rules discussed above as follows:

1. The initial D node possesses the AA List, but restricts its size based on some applied criteria, such as available channels.
2. A cascade is formed using this restricted AA List, but is identified as a hyper-manifold layer.
3. The H nodes so formed acquire the full resource list from the top level H node. From the number of available nodes, and the number of H nodes, each H node forms a new AA list and begins to act as a D node.
4. Steps 2 and 3 are repeated until the desired number of manifold levels is created.
5. Each H node, working with the final restricted AA List, acts as a D node and forms the computational level cascade groups

EXAMPLE 7

Hyper-Manifold Formation

Figure 90:
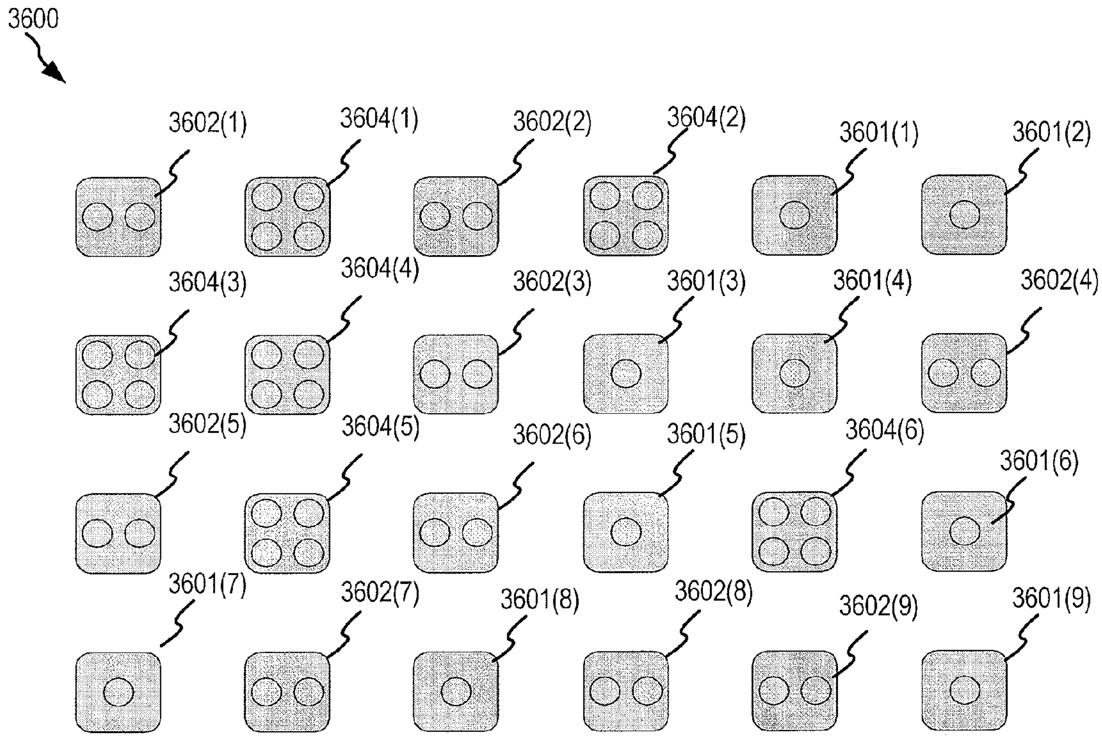
FIGS. 90-93 show exemplary steps to form part of a hyper-manifold.

Since hyper-manifolds grow in complexity so rapidly, the following will not attempt to show a complete example with every step, node or state change. Instead, it will follow the progression of self-organization, tracking developments along some of the connections at each level. FIG. 90 shows a collection 3600 of 4-channel nodes 3604, 2-channel nodes 3602 and 1-channel nodes 3601. In this example, all available 4-channel nodes 3604 are shown, but not all of 2-channel nodes 3602 and 1-channel nodes 3601 are shown for clarity of illustration.

Figure 91:
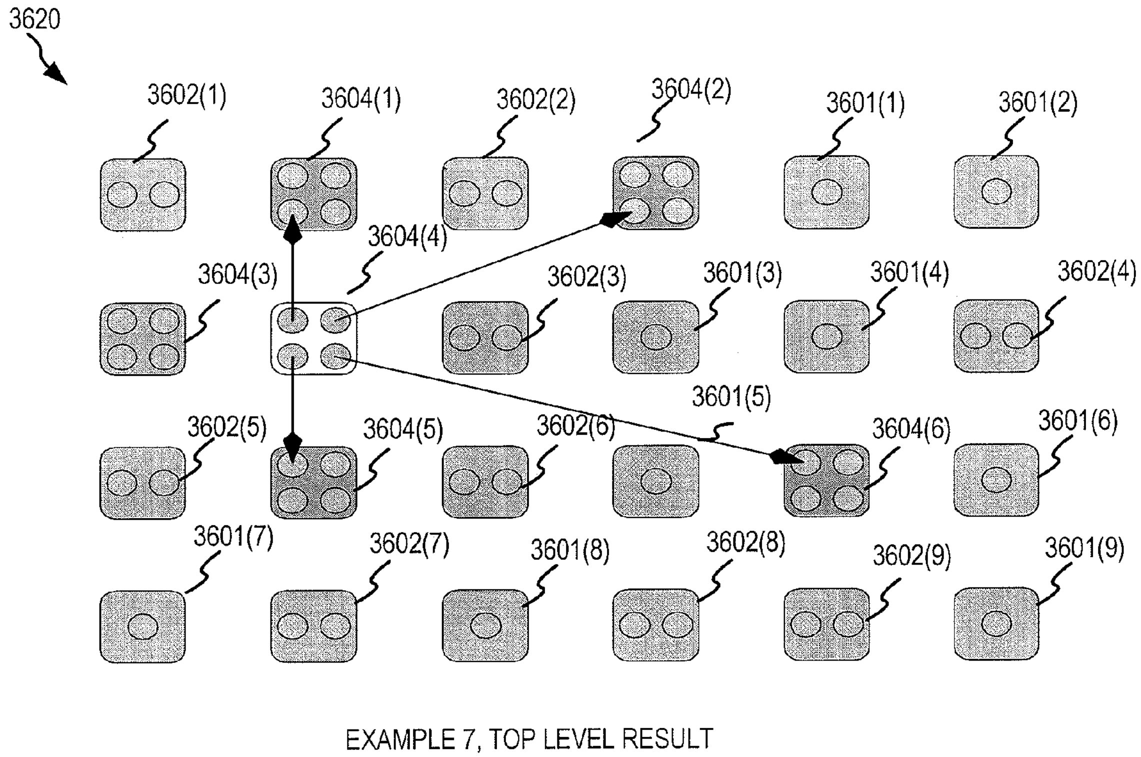
Figure 92:
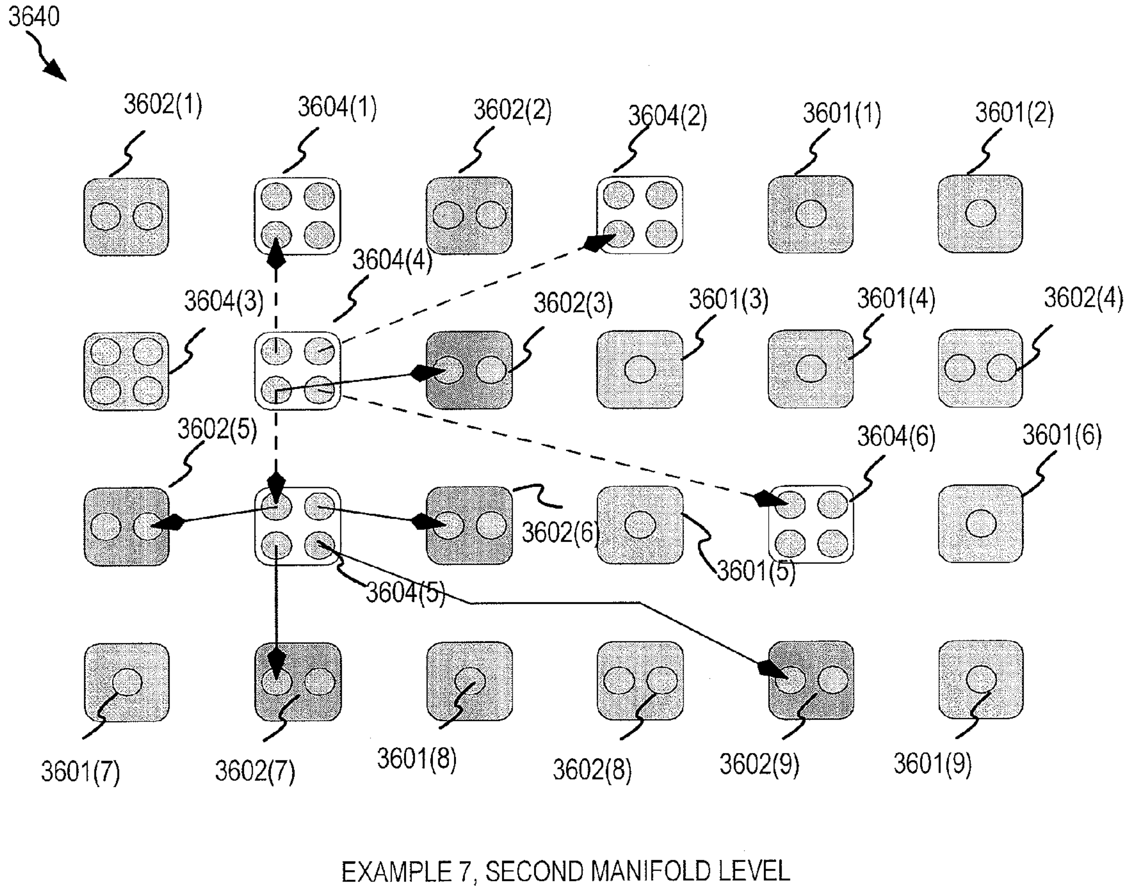

The first manifold level can be formed by self-organizing all 4-channel nodes 3604. With 6 4-channel nodes available, a depth-1 cascade is the largest that can be formed, as shown in FIG. 91. 4-channel node 3604(4) has acquired 4 other nodes (3604(1), 3604(2), 3604(5) and 3604(6)), leaving 4-channel node 3604(3) as a spare. The 5 associated 4-channel nodes 3604 each act as D nodes to form the next manifold level. The AA Lists will be filled with 2-channel nodes 3602. Again assuming a depth-1 manifold, and following only the activity associated with one channel of the top level H node, FIG. 92 shows one exemplary configuration 3640. One channel of the top level H node 3604(4) has acquired a single 2-channel node 3602(3), while the 4-channel associated node 3604(5) has acquired four 2-channel nodes 3602(5), 3602(6), 3602(7) and 3602(9).

Figure 93:
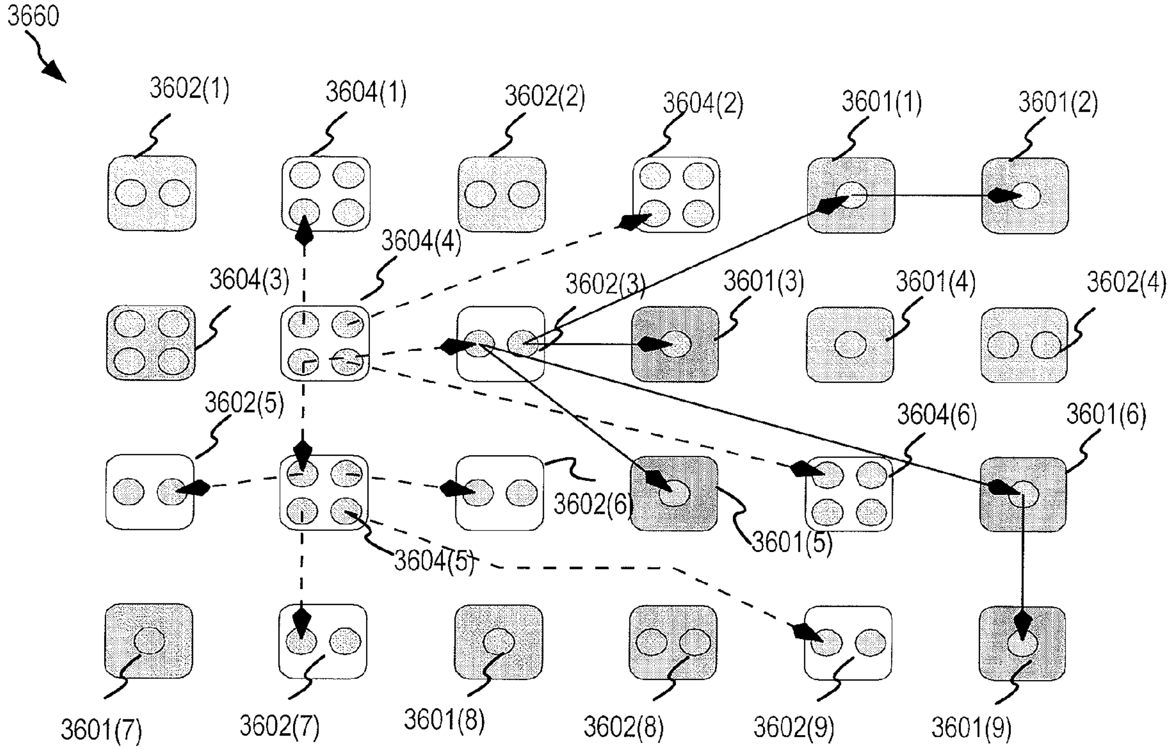

Finally, assume that depth-2 cascade groups are desired for the lowest level. Looking at only 2-channel node 3602(3), FIG. 93 shows one exemplary resulting configuration 3660 where 2-channel node 3602(3) acquires 1-channel nodes 3601(1), 3601(2), 3601(3), 3601(5), 3601(6) and 3601(9).

As appreciated, based upon the above example, the full hyper-manifold is fully thus formed. Note that some of the nodes shown may or may not be spares, depending on the total number of nodes provided and the complete organization process. Except for the addition of rules to restrict the membership of the AA lists as one proceeds to generate new levels, no additional node types are required.

One benefit of restricting the AA list membership is the ability to localize collections of resources in physically separate locations. Overall, this improves the ability to support heterogeneous systems, as well as non-conventional systems consisting of sensors or other low capability devices.

Thus, is possible to have agent differentiation and formation of a parallel processing cluster occur as an emergent behavior by treating the processing nodes as self-organizing agents rather than through explicit control programming.

Fixed and Variable Communication Geometry Overhead for Gather/Scatter Problems

A parallel processing system may have two operational modes: variable geometry (job-centric) and fixed geometry (processing-centric). The initial and per time step overhead may be modified as function of the geometry type used.

The job-centric operational mode exhibits variable cluster geometry depending on the needs of each submitted job. The term variable geometry comes from the notion that each job submitted to the cluster may vary the number of nodes, channels, and I/O controllers utilized by the job. Such variation allows the system to adapt to the optimal resource use and/or execution time requirements of a given job. The ability to change cluster configuration incurs the highest overhead costs for the job-centric operational mode, since cascade generation and collapse is required for each job.

Alternatively, the processing-centric operational mode is appropriate for processing-stream applications in which multiple data sets require processing in a fixed geometric sequence. If the data sets are of similar size, require the same algorithms, and are efficiently run with the same resource sets, then a savings in overhead time can be realized by eliminating the cascade generation and collapse that would be required if each data set were submitted as a separate job. Instead, only data and results need be moved through the system.

Total Overhead Calculation

MPT has observed that the overhead of a single channel Howard Cascade is a function of the number of cascade expansion time-steps plus a single initial overhead time. The total overhead time is given by:

$$T_C=O_i(\psi)+O\log_{(\nu+1)}(N+1)$$ Equation 12. System Overhead Calculation

Where:

$O_i(\psi)$≡Initial controller overhead

O≡overhead per expansion step

ν≡# channels per compute node

N≡# compute nodes

Observed Job-Centric Overhead

It has been calculated that the initial job-centric overhead time, that is, the extra time it takes to process an algorithm within the parallel framework versus the time it takes to process the same algorithm outside of the parallel framework is 0.336 seconds. The job-centric overhead per cascade expansion time step is 0.0685 seconds. These values were computed for 2.8 GHz Pentium 4 521 processors, single processor per compute node connected using 100 BaseT Ethernet connections using a standard commercial-off-the-shelf (COTS) switching fabric.

$$O_i(\psi)=0.3360 \text{ seconds}$$

$$O=0.0685 \text{ seconds}$$ Equation 13. Job-centric Overhead

Figure 94:
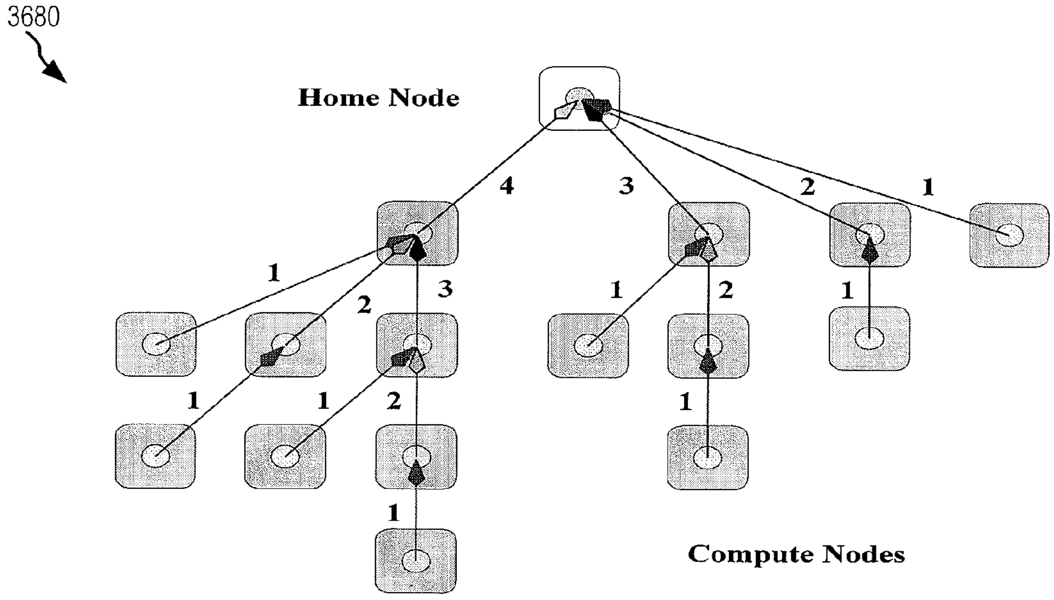
FIG. 94 shows an example of a 1 channel Howard Cascade formed with one home node and fifteen compute nodes.

FIG. 94 shows an example of a 1 channel Howard Cascade formed with one home node and fifteen compute nodes.

TABLE 23

Example Job-centric Overhead Values, Howard Cascade

| φ | # of Nodes 1 Channel | 2 Channel | 4 Channel | Total Overhead $T_O$ |
|---|---|---|---|---|
| 1 | 1 | 2 | 4 | 0.4045 |
| 2 | 3 | 8 | 24 | 0.4730 |
| 3 | 7 | 26 | 124 | 0.5415 |
| 4 | 15 | 80 | 624 | 0.6100 |

Table 23 shows the effect of multiple nodes with different channel counts and the calculated total system overhead. Note that φ equals the number of time steps.

Processing-Centric Overhead

For the processing-centric mode, the job-centric overhead value is incurred only once: part during the set up for the job submitted, and part during shutdown after the job completes. For every other part of the job, there is no controller and cascade expansion overhead. The only overhead remaining is the time required to transmit a data set to all nodes and receive the results back. Given full-duplex channels, some overlap of distribution and result agglomeration may be possible. The worst case would be no overlap. Using no overlap, the maximum overhead time can be estimated from the time required to transmit the data to all nodes and transmit the results back. Assuming a data set size of approximately 500 bytes, and a result data set size of 500 bytes, then the processing-centric overhead is given by:

Processing-centric Overhead $$O_j(\psi)=0.0$$
$$O=\left(\frac{1000}{b}+\lambda\right)\varphi$$ Equation 14

Where:

b≡channel bandwidth

λ≡channel latency

As an example, consider a 2-channel system using 1000 Base-T Ethernet. 6 expansion times would yield a 728-node cluster, for which the overhead per data set would be:

Processing-centric Example $$O=\left(\frac{1\times10^3}{1\times10^9}+8\times10^{-4}\right)6\cong 0.005 \text{ sec.}$$ Equation 15

The latency time of 0.0008 sec was the average latency time observed during b_eff benchmark tests on 80 nodes. Note that since the overhead is dependent only upon the cascade expansion times, a 4-channel system, using 4 expansion times, would produce a 624 node cluster, and have 0.0032 sec of total overhead, while 5 expansion times would produce a 3,124 node cluster with only 0.004 sec of total overhead. Thus overhead can be designed into the system by adjusting the number of channels used.

TABLE 24

Example Processing Centric Values, Howard Cascade

| | # of Nodes | | | Total |
|---|---|---|---|---|
| $\phi$ | 1 Channel | 2 Channel | 4 Channel | Overhead $T_O$ |
| 1 | 1 | 2 | 4 | 0.000801 |
| 2 | 3 | 8 | 24 | 0.001602 |
| 3 | 7 | 26 | 124 | 0.002403 |
| 4 | 15 | 80 | 624 | 0.003204 |

Conclusion

Production jobs that can be organized as a processing stream, or pipeline, which reuses the same algorithms and the same number of compute nodes may have a significant decrease in overhead costs, since only data distribution and result agglomeration is present. In fact, this presents an opportunity to overlap data distribution and agglomeration, thus establishing a near continuous processing pipeline.

System Overhead Management for Gather/Scatter Problems

The system overhead growth rate associated with commercial off-the-shelf (COTS) based parallel processing methods typically define the maximum number of compute nodes that can be combined to produce higher performance. System overhead is defined to be the time cost associated with the parallel environment plus the time cost associated with the multi-node communication. The time cost usually has two components, the initial overhead time and the overhead growth time. Both of these factors must be combined to show the total overhead time.

Total parallel processing system overhead for gather/scatter problems may be managed using a variety of communication techniques. It is shown herein that it is possible to have the system overhead growth rate independent of the number of parallel nodes.

Traditionally, other parallel communication methods use the native channel performance and latency to manage their overhead growth rate. As disclosed herein, the geometric expansion rate and novel communication models may be used to manage both the effective bandwidth and effective latency. The techniques presented here include the use of cascades and manifolds. Each of these structures will be discussed using one, two and four communication channels per processing node to illustrate the effect multiple channels have on total system overhead and latency. In addition, the effects of allowing different channel counts on the compute node and the Home Nodes will be illustrated.

Gather/Scatter Overhead Reduction Using Cascades

Figure 95:
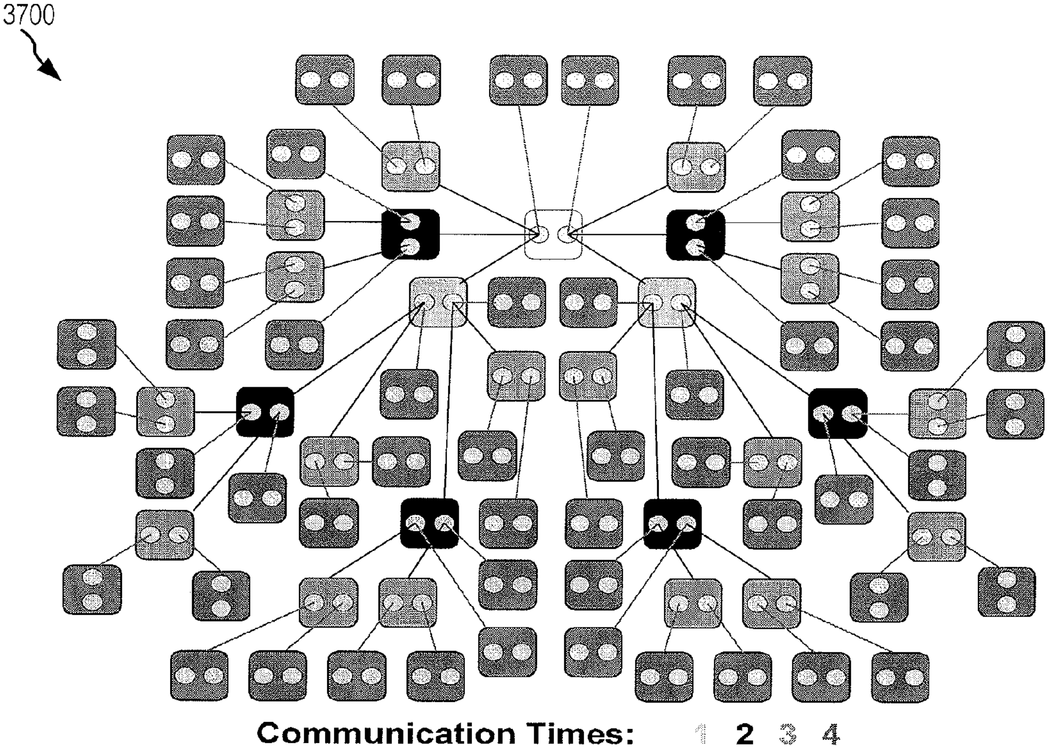
FIG. 95 shows a 2-channel cascade loading data to 80 nodes in 4 time steps.

A cluster may move data into or out of its compute nodes using a Howard Cascade® with one or more channels. FIG. 94 shows the 1-channel cascade 3680 clearing data from 15 nodes in 4 time steps (1 step=time to move data between 2 nodes). Similarly, FIG. 95 shows a 2-channel cascade 3720 loading data to 80 nodes in 4 time steps.

TABLE 25

1-Channel Howard Cascade

| Number of Time Steps | # of Nodes (N) |
|---|---|
| 1 | 1 |
| 2 | 3 |
| 3 | 7 |
| 4 | 15 |
| 5 | 31 |
| $\phi$ | $N = 2^{\phi} - 1$ |

The overhead of a single channel Howard Cascade is a function of the number of cascade expansion time-steps plus a single startup overhead time. Table 25. 1-channel Howard Cascade shows the number of nodes to which data may be transferred for the given number of time steps. The total overhead time is given by:

$$T_1 = O_i + O_1\phi \qquad \text{Equation 16. 1-Channel Total Overhead}$$

Where:

$O_i \equiv$Cascade initial overhead time $O_1 \equiv$1-channel overhead per time step $\phi \equiv$Total number of time steps A 2-channel Howard cascade (where each node has two communication channels) generates even faster node count growth, as shown in Table 26: 2,2-Howard Cascade.

TABLE 26

2,2- Howard Cascade

| Number of Time Steps | # of Nodes (N) |
|---|---|
| 1 | 2 |
| 2 | 8 |
| 3 | 26 |
| 4 | 80 |
| 5 | 242 |
| $\phi$ | $3^{\phi} - 1$ |

It should be noted that in the same number of equal time steps (4), 80 nodes are in communication with 2 channels versus 15 nodes with 1 channel. If the standard linear view of multiple channels held then only 30 nodes should be in communication for 2 channels. This non-linear relationship means that adding more communication channels generates a stronger effect than speeding up the individual channels.

The overheads of 2- and 4-channel Howard Cascades are also a function of the number of time-steps plus a single startup overhead cost.

$$T_2 = O_i + O_2\phi \qquad \text{Equation 17. 2-Channel Overhead}$$

In fact, the overhead per time step has been found to be essentially independent of the number of channels:

$$O_1 = O_2 = O_3 = O_4 = O \qquad \text{Equation 18. Overhead Independent of Channels}$$

Thus data flow is a strong function of the number of channels, while overhead remains constant. The total overhead as a function of the number of channels and nodes is given by:

$$T_C = O_i + O\log_{(v+1)}(N+1) \qquad \text{Equation 19: General Howard Cascade Overhead}$$

Where:

$v \equiv$# of channels per compute node $N \equiv$# of compute nodes

The number of channels is thus a very powerful way of controlling the total overhead time in a system.

Observed Cascade Overhead Values

The initial overhead time on a cascade, that is, the extra time it takes to process an algorithm within the parallel framework versus the time it takes to process the same algorithm outside of the parallel framework, is 0.336 seconds and the additional overhead per time step is 0.0685 seconds for 2.7 GHz Pentium 4 Processors, single processor per compute node connected using 100 BaseT Ethernet connections using a standard COTS switching fabric. This means:

$O_i$=0.3360 seconds

O=0.0685 seconds Equation 20: Howard Cascade Overhead

Under controlled, repeatable, conditions, it is observed that the initial overhead time is proportional to the per compute node performance. This means that if the compute node performance is doubled, then the initial system overhead time is halved. The per time step overhead shown above is for small dataset node to node movement. The per time step timing number given is a function of both the point-to-point bandwidth and the communication latency of the channels used.

Given the constant contribution to overhead per time step, and the rapid cascade growth rate with increasing channel count, the benefit of multiple channels can be easily seen in Table 27: Calculated Cascade Total System Overhead.

TABLE 27

Calculated Cascade Total System Overhead

| | # of Nodes | | | Total |
|---|---|---|---|---|
| $\phi$ | 1 Channel | 2 Channel | 4 Channel | Overhead $T_O$ |
| 1 | 1 | 2 | 4 | 0.4045 |
| 2 | 3 | 8 | 24 | 0.4730 |
| 3 | 7 | 26 | 124 | 0.5415 |
| 4 | 15 | 80 | 624 | 0.6100 |

The overhead involved with 624 nodes can be made equivalent to 15 nodes by using 4 communication channels per node versus 1.

Overhead Reduction Using Multiple Cascade Groups

Figure 96:
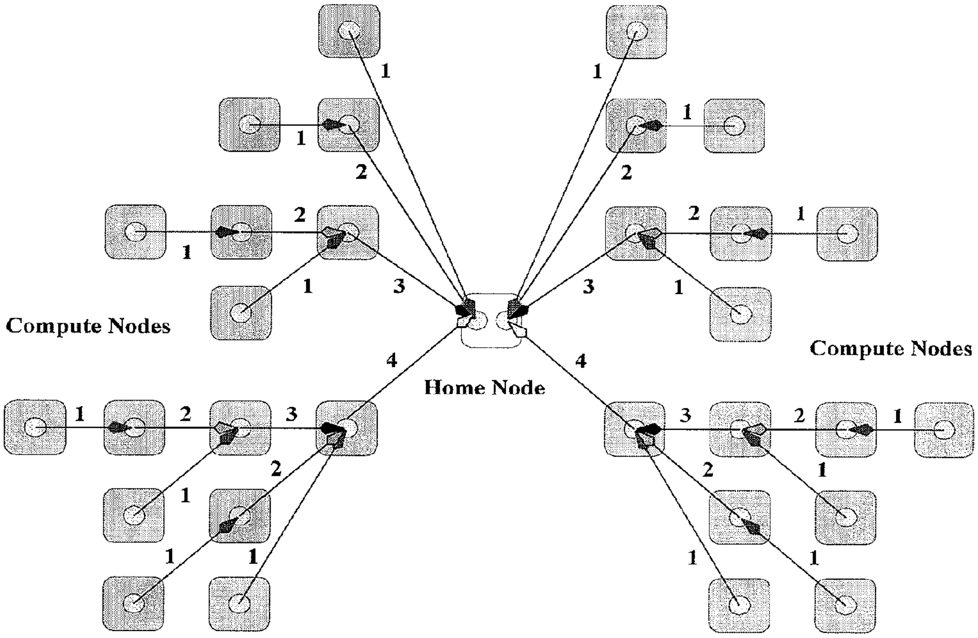
FIG. 96 shows one exemplary configuration of a cascade illustrating single channel cascade groups attached to a 2-channel home node with a cascade depth of 3.

If more than one channel is available at the home node level, a cascade can be generated from each one. The total cascade is then composed of individual cascade groups, each with the properties discussed above. To simplify matters, a Howard Cascade can be specified by a three number group: ($\psi$,$\phi$,$\upsilon$). FIG. 96 shows one example of a configuration 3720 illustrating single channel cascade groups attached to a 2-channel home node with a cascade depth of 3 (i.e., a (2,3,1) cascade). In this case, thirty compute nodes communicate in four steps instead of the fifteen node shown in FIG. 94.

Figure 97:
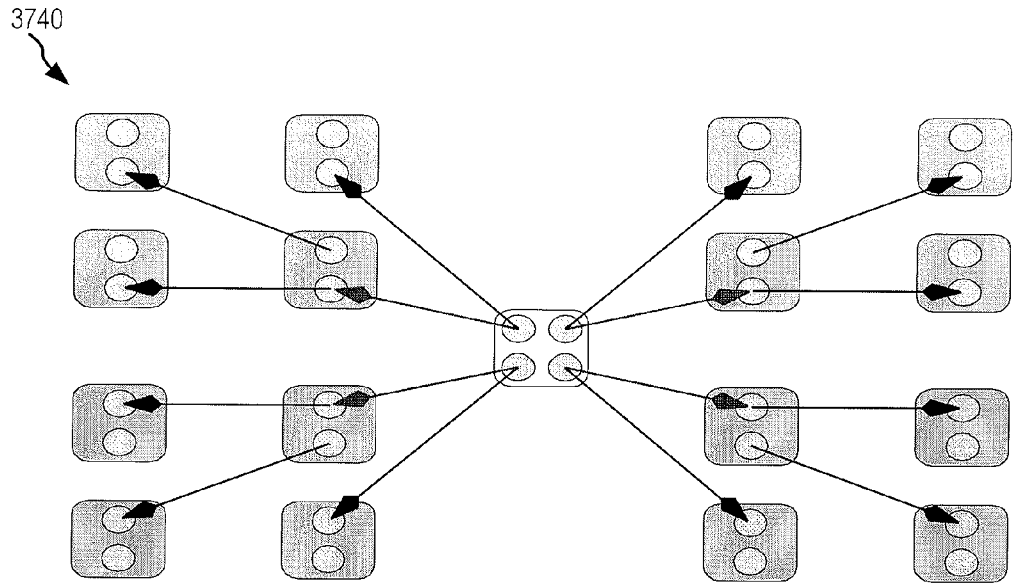
FIG. 97 shows an exemplary cascade configuration with four channels in the home node and 2-channel compute nodes, illustrating that 16 nodes may be reached in 2 cascade expansion steps.

FIG. 97 shows a configuration 3740 with four channels in the home node, and 2-channel compute nodes illustrating that 16 nodes may be reached in 2 cascade expansion steps (i.e. a (4,2,2 cascade).

The overhead here is exactly the same as a single channel cascade with only 3 nodes. By changing the number of channels on the compute nodes, on the home node, and the number of expansion times, one can achieve a large variety of node counts with identical overhead values. Letting $\psi$ equal the number of channels at the home node, the overhead is given by:

$$T_C=O_i(\psi)+O\log_{(\upsilon+1)}(N+1)$$ Equation 21: Multiple Howard Cascade® Overhead $O_i(\psi)$ is indicated as a function only to indicated that the initial overhead may vary somewhat due to the cost of handling extra channels. This reflects the reality of hardware limitations which could limit the effective number of channels that could be added.

Overhead Reduction Using Howard-Lupo Manifolds©

Adding multiple home node channels is not the only way of controlling overhead. A Howard-Lupo Manifold© uses a cascade of Home Nodes to generate benefit above that which can occur using a Howard Cascade. To be of benefit, the number of channels at the Home Node level ($\psi$) must be greater than the number of channels on the compute nodes ($\upsilon$). A manifold is generated by first producing some number of expansions of additional home nodes (m), following by cascade group generation off each resulting home node channel to some cascade expansion depth ($\phi$). A particular Howard-Lupo manifold can be specified with a four number group: (m,$\psi$,$\phi$,$\upsilon$).

Figure 98:
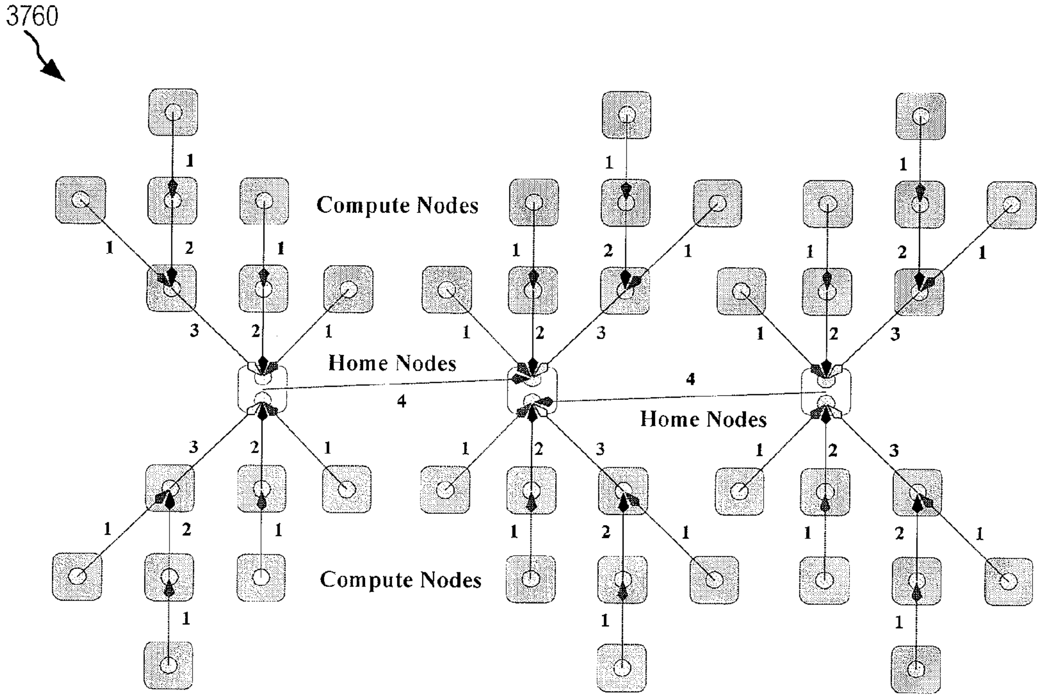
FIG. 98 shows one exemplary (1, 2, 3, 1) Howard-Lupo Manifold illustrating that one additional time step is used to move the data between Home Nodes.

As shown in FIG. 98, a (1, 2, 3, 1) Howard-Lupo Manifold 3760 uses an additional time step to move the data between Home Nodes. This time step is accounted for in the first time step of Table 28.

TABLE 28

(1,2,3,1) Manifold Overhead

| | # of Nodes | | | Total |
|---|---|---|---|---|
| $\phi$ | 1 Channel | 2 Channel | 4 Channel | Overhead $T_O$ |
| 1 | — | — | — | $T_D$ |
| 2 | 6 | 20 | 72 | $T_D$ + 0.4730 |
| 3 | 18 | 80 | 432 | $T_D$ + 0.5415 |
| 4 | 42 | 260 | 2232 | $T_D$ + 0.6100 |

Table 28 shows that the node growth rate of the (1,2,3,1) Howard-Lupo Manifold 3760 is almost twice the rate of the (2,3,1) Howard Cascade®. The general formula for calculating the system overhead of the Howard-Lupo Manifold is given below:

$$2O(\psi)$$

$$T_M=+O[\log_{(\psi+1)}(M)+\log_{(\upsilon+1)}(N+1)]+T_D\log_{(\psi+1)}(M-1)$$ Equation 22: Howard-Lupo Manifold© Overhead where:

M≡# of Home Nodes

N≡# of nodes in cascade group $T_D$≡data movement time

Figure 99:
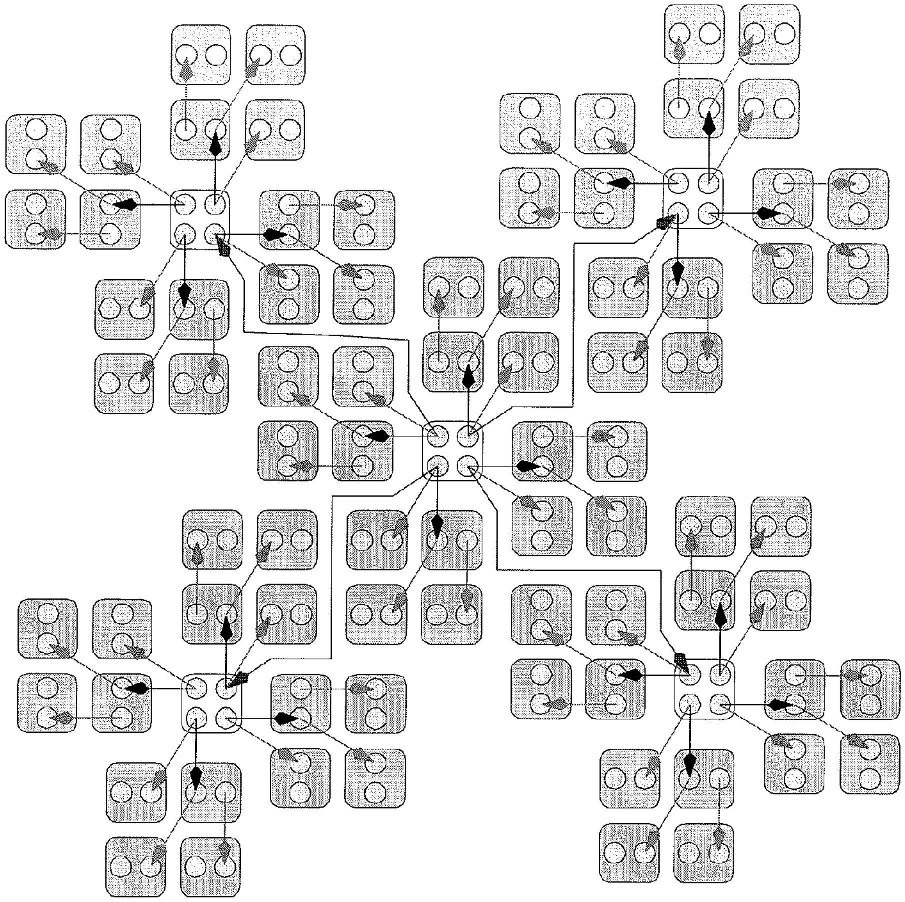
FIG. 99 shows a (1, 4, 2, 2) Howard-Lupo Manifold.

In general, one trades off incurring a time penalty at the manifold level for a large increase in compute power. FIG. 99 shows a (1, 4, 2, 2) Howard-Lupo Manifold 3780 illustrating this behavior by using 4-channel home nodes and 2-channel cascade groups, with 1 expansion step at the manifold level and 2 expansion steps at the cascade level. In 3 time steps, 80 compute nodes are in communication compared to 42 compute nodes for manifold 3760 shown in FIG. 98.

Expansion Rate to Total System Overhead Rule

If the compute node count is a function of some mathematical expansion rate and if that expansion takes place on regular time steps, and finally if the time steps of multiple such functions can be normalized, then the total system overhead can be fixed at the normalized time step value while the node count changes as a function of the expansion rate. This rule allows for a large number of expansion rates (perhaps infinite), and thus a large number (perhaps infinite) of node count values can be generated for the same overhead time vale. That is, the node count is independent of total system overhead time under these circumstances.

Total system overhead may be made independent of the compute node count. As shown, additional communication channels may non-linearly increase the node count growth rate, that is, the effect of adding additional communication channels is stronger than replacing slower communication channels with faster ones. Also, using such techniques as cascade groups and manifolds shows that adding only a few additional channels in the proper way can generate a stronger effect then adding additional communication channels to all of the nodes. Finally, controlling total system overhead with the minimum hardware upgrades only requires the use of the proper technique rather than the use of exotic hardware.

The Lambda-Step

A lambda-step is the relay of data to another node as it is being received. The lambda-step analysis is followed by a description of the Lupo Strip. The Lupo strip is used to greatly increase the number of nodes that are involved with a cascade, manifold, and hyper-manifold exchange.

Standard Broadcast Exchanges

Figure 100:
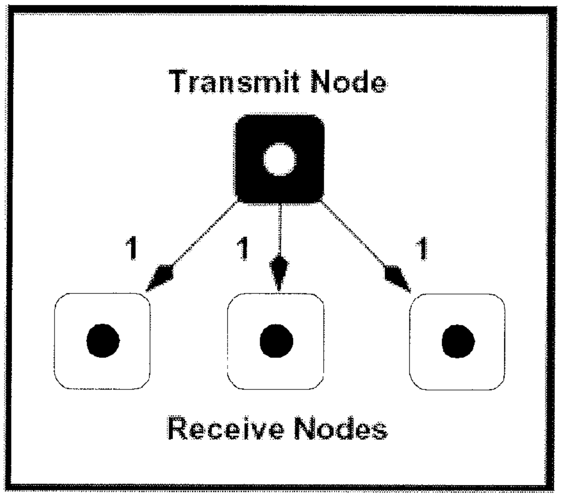
FIG. 100 shows one exemplary broadcast from one transmit node to three receive nodes in one time unit.

A broadcast may be used in two completely different scenarios. The first scenario is to simply move data from one node to multiple nodes, and the second scenario is as a component of an all-to-all exchange. A standard broadcast performs the following two actions:

1. Identify, in some fashion, all nodes that are to receive the data.
2. Transmit the data from a sending node to all receiving nodes in one data exchange time step, as shown in FIG. 100 and described by Equation 23 Broadcast Exchange Time).

In practice, true broadcasts are generally avoided, since they tend to use unreliable protocols, or require special hardware assistance to achieve reliability. However, the concept of a broadcast forms a good basis for comparing the performance of other communication models. An equation that describes the amount of time it takes to move the data from the transmit node to all of the receive nodes is:

Broadcast Exchange Time $$T_{broadcast} = \frac{D}{b} \qquad \text{Equation 23}$$

Where:

D≡the number of bytes to transmit b≡the bandwidth of the connecting channel

Equation 23 Broadcast Exchange Time is true because the standard broadcast is assumed to make a single transmission at channel bandwidth regardless of the number of receivers. Because data exchange in a computational algorithm must be reliable, various methods have been developed to combine multiple point-to-point pair-wise exchanges which essentially complete a broadcast.

Figure 101:
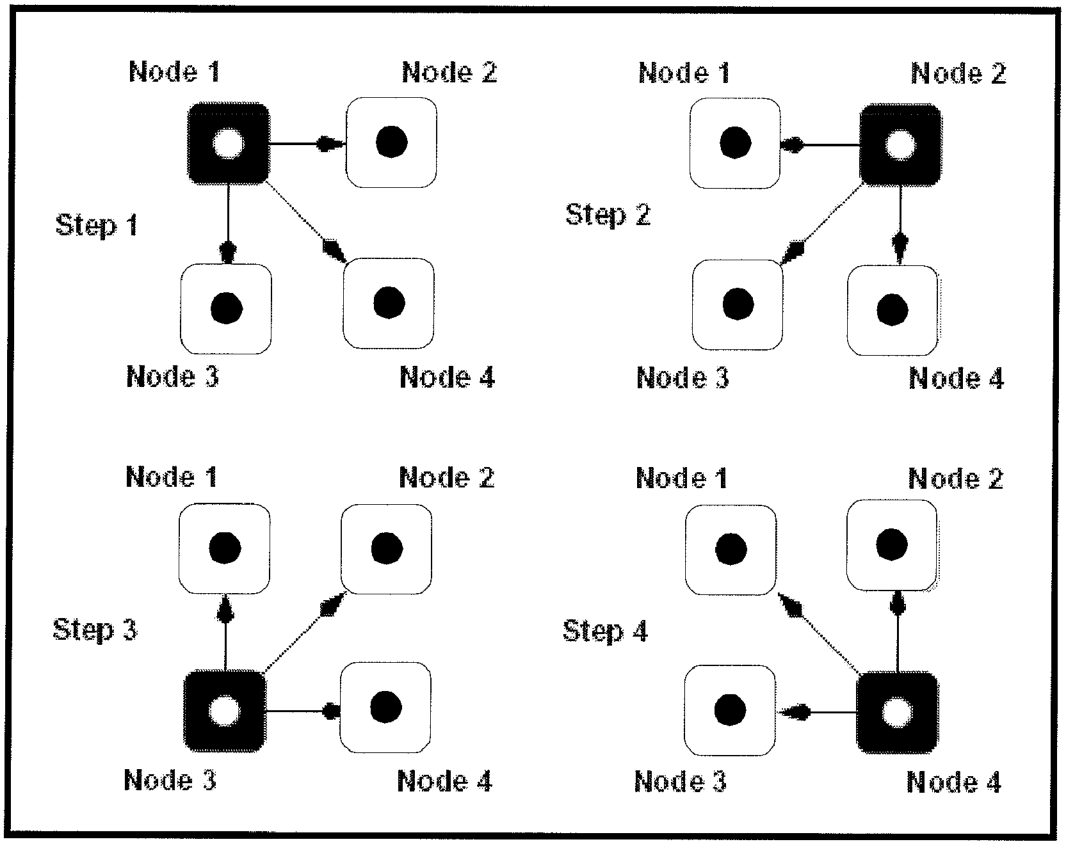
FIG. 101 shows four exemplary steps illustrating how a sequence of broadcasts accomplishes an all-to-all exchange among 4 nodes.

A broadcast may be used as a component of an all-to-all exchange, which is used whenever data from all of the nodes working on a common problem must be shared with each of the other nodes. FIG. 101 shows four exemplary steps illustrating how a sequence of broadcasts accomplishes an all-to-all exchange among 4 nodes. Timing for this process is shown in Equation 24 Broadcast-based All-to-All Exchange Time.

Broadcast-based All-to-All Exchange Time $$T_{broadcast\_all-to-all} = \frac{DN}{b} \qquad \text{Equation 24}$$

Where:

N≡number of nodes in the exchange

D≡number of bytes sent by a node (assumed equal for all nodes)

Figure 102:
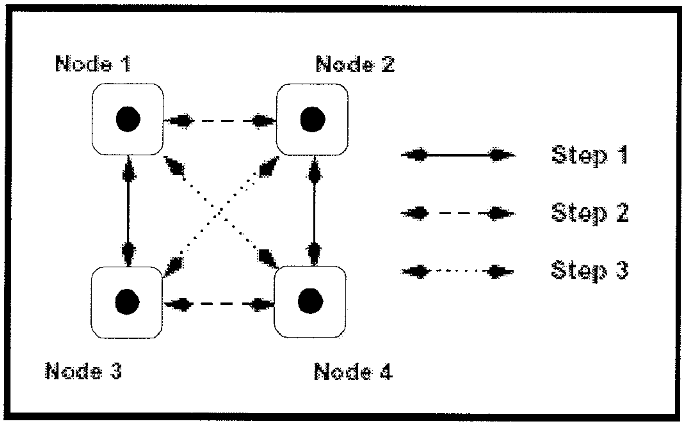
FIG. 102 shows exemplary steps for a partial all-to-all data exchange between four nodes.

There are two distinct types of all-to-all exchanges: full dataset all-to-all exchange (FAAX) and partial dataset all-to-all exchange (PAAX). In a FAAX, each node shares a full copy of its data with every other node, whereas in a PAAX, each node sends different data to the other nodes. Since a multi-dimensional Discrete Fourier transform (DFT) requires a PAAX for its transpose step, the effects of a broadcast-based all-to-all exchange versus the PAAX exchange may be shown. In the transpose of a 2-D DFT each node sends only the unique portion of the data required by each receiving node. Unfortunately, the broadcast exchange (a component of the broadcast based all-to-all exchange) must broadcast all data to all nodes. As shown in the example of FIG. 102, Node 1 must broadcast data for Nodes 2, 3, and 4; Node 2 sends data for 1, 3 and 4; and so on. The total exchange time for a broadcast based all-to-all exchange is then given by:

Broadcast-based PAAX Time $$T_{broadcast-PAAX} = \frac{ND(N-1)}{b} \qquad \text{Equation 25}$$

The time required for an PAAX exchange (which is based on point-to-point full-duplex communication channels) is given by:

PAAX Time $$T_{PAAX} = \frac{D_p(N-1)}{vb} \qquad \text{Equation 26}$$

Where:

v≡number of communication channels per node $D_p$≡partial dataset size.

This shows the fundamental differences between the PAAX and broadcast exchanges. Note that using an PAAX data movement with a FAAX gives the following timing:

FAAX Timing $$T_{FAAX} = \frac{D(N-1)}{vb} \qquad \text{Equation27}$$

For the single channel case, this is just marginally faster than the broadcast all-to-all exchange, given the (N−1) versus N terms.

The MPI Tree Exchange

Figure 103:
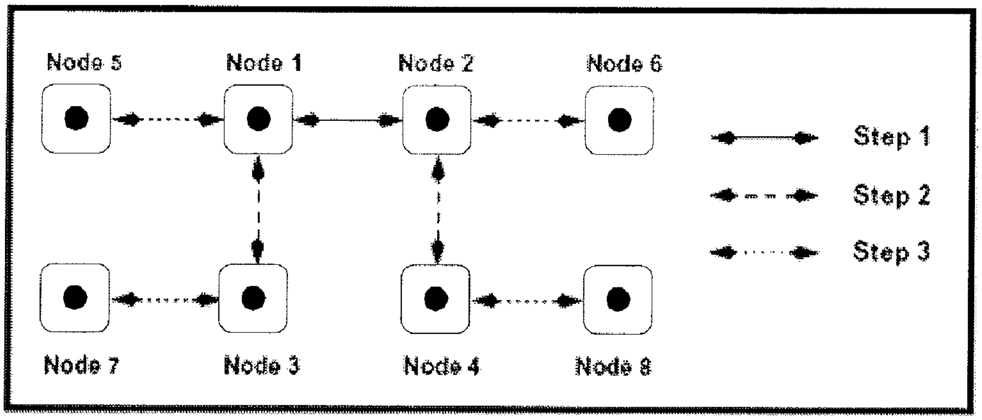
FIG. 103 shows one example of a Message Passing Interface (MPI) library binary-tree broadcast that guarantees data delivery.

The commonly used Message Passing Interface (MPI) library attempts to get around the lack of guaranteed data delivery by organizing data movement from the sending node to all other nodes using a binary tree pattern as shown in FIG. 103. The exchange time as a function of the number of expansion steps for a binary-tree is given by Equation 28 Binary-Tree Broadcast Exchange Time.

Each step represents a data movement time unit, which is the time it takes to move a dataset from one node to another node. This time unit has two components: a latency time and a data movement time. The latency component represents the time required for the software and hardware to set up and move the first byte of data. The number of data movements required to complete an exchange will be represented by $\phi$ in subsequent discussions, while the number of latencies required to complete an exchange will be represented by $n_r$.

The exchange shown above performs the following actions:

1. Build a point-to-point connection between the transmit node and the first receive node
2. Transmit the data to the receive node.
3. Build a point-to-point connection between the upper level receive node(s) to the lower level receive node(s).
4. Repeat steps 2 and 3 until the tree is complete The amount of time it takes to move the data from the transmit node to all of the receive nodes is given by:

Binary-Tree Broadcast Exchange Time — Equation 28

$$T_{binary-tree} = \frac{D\varphi}{b}$$

Where:

$\phi \equiv$ The number of tree expansion times, starts with 1

$b \equiv$ The bandwidth of the connecting channel

The number of nodes can be related to the number of expansion times by:

$N=2^{\phi}$ — Equation 29 Binary-Tree Expansion Rate

Therefore, one can solve for the number of expansion times required to broadcast data to an arbitrary number of nodes:

Binary-Tree Broadcast Expansion Times — Equation 30

$$\log N = \varphi \log 2 \Rightarrow \varphi = \frac{\log N}{\log 2} = \log_2 N$$

Where:

$N \equiv$ number of nodes

Figure 104:
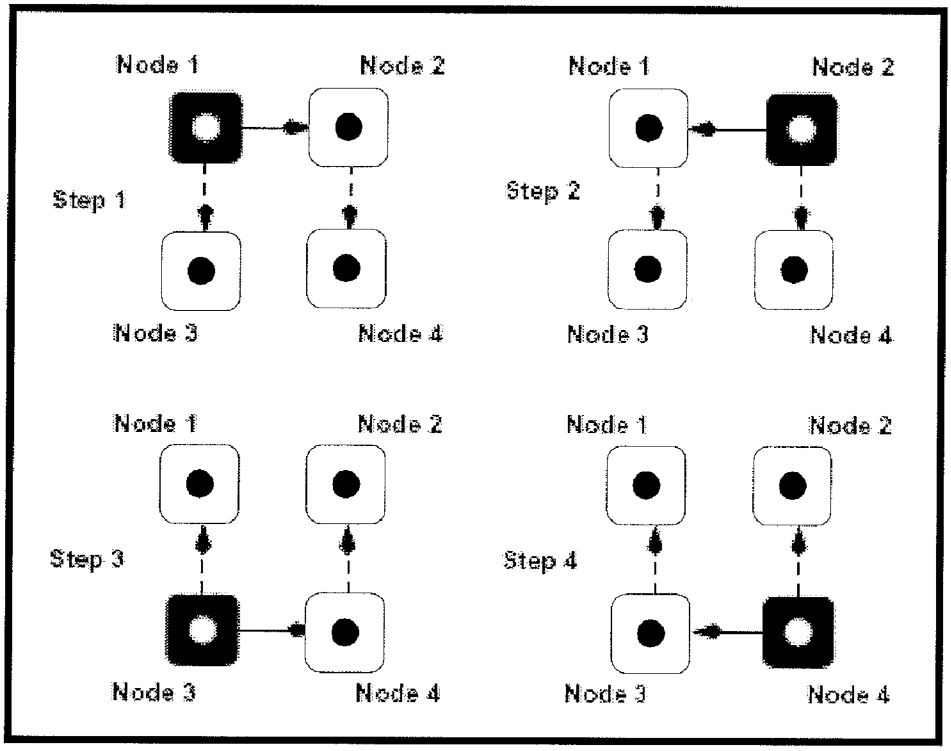
FIG. 104 shows a binary-tree all-to-all exchange between four nodes.

FIG. 104 shows the binary-tree exchange used as the basis of an all-to-all exchange, as determined by:

Binary-tree All-to-All Exchange Time — Equation 31

$$T_{binary-tree} = \frac{ND\log_2(N)}{b}$$

Figure 105:
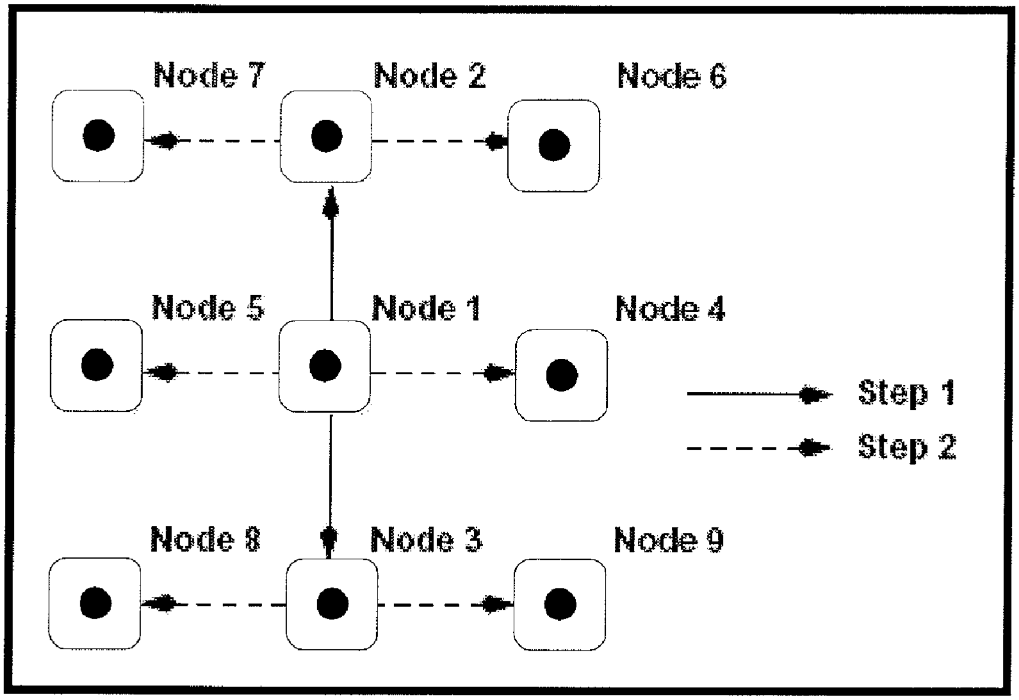
FIG. 105 shows a 2-channel Howard-tree data broadcast from one node to eight other nodes in two steps.

As shown, a binary-tree all-to-all exchange is $\log_2(N)$ slower than a broadcast exchange. If a binary-tree has more than one channel than it is a Howard-tree. FIG. 105 shows a 2-channel Howard-tree data broadcast from one node to eight other nodes in two steps. Other Howard-trees with different numbers of communication channels are readily constructible using analogous methods.

Table 29

2-Channel Howard-tree All-to-All Exchange

| | | | | | | | | |
|---|---|---|---|---|---|---|---|---|
| 7 | 2 | 6 | 8 | 3 | 7 | 9 | 4 | 8 |
| 5 | 1 | 4 | 6 | 2 | 5 | 7 | 3 | 6 |
| 8 | 3 | 9 | 9 | 4 | 1 | 1 | 5 | 2 |
| 1 | 5 | 9 | 2 | 6 | 1 | 3 | 7 | 2 |
| 8 | 4 | 7 | 9 | 5 | 8 | 1 | 6 | 9 |
| 2 | 6 | 3 | 3 | 7 | 4 | 4 | 8 | 5 |
| 4 | 8 | 3 | 5 | 9 | 4 | 6 | 1 | 5 |
| 2 | 7 | 1 | 3 | 8 | 2 | 4 | 9 | 3 |
| 5 | 9 | 6 | 6 | 1 | 7 | 7 | 2 | 8 |

Table 29 2-Channel Howard-tree All-to-All Exchange shows nine, 3×3 number grids illustrating the permuted node number patterns which, when applied to FIG. 105, produce an all-to-all exchange.

The 2-Channel Howard-tree All-to-All Exchange for 9 nodes takes 2 time units times 9 steps to complete, that is 18 D/b to complete the exchange versus 36 D/b time units to complete with a binary tree. In general then, the Howard-tree exchange time can be written as:

Howard-tree All-to-All Exchange Time — Equation 32

$$T_{Howard-tree} = \frac{ND\log_{\nu+1}(N)}{b}$$

Overlapping Sending and Receiving

The binary-tree exchanges and Howard-tree exchanges are set up as discrete operations. In one data movement time only a subset of the node pairs participate. This is primarily due to treating the interconnections between nodes as half-duplex communication channels. If the channels are full-duplex, then one can gain benefit by seeking to send data out to other nodes as soon as it becomes available rather than waiting for the complete reception of the data set. To describe this overlap of data sending and receiving, a term called $\lambda_r$, or the lambda relay time, is introduced. $\lambda_r$ represents the time a node must wait from the time it starts to receive data from a node till it can begin sending it on to another node.

Figure 106:
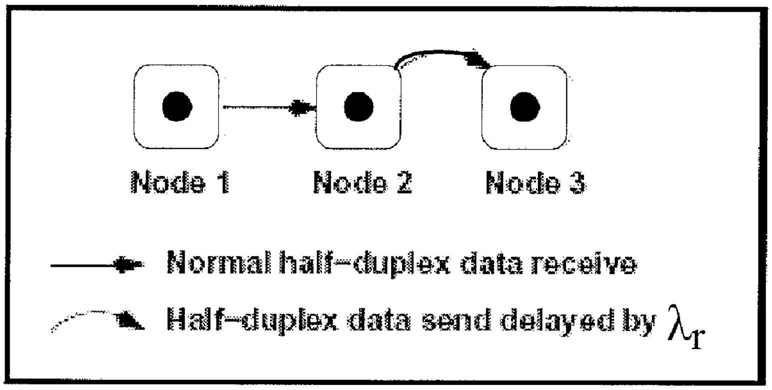
FIG. 106 shows the simplest case of overlapped sending and receiving involving three nodes.

FIG. 106 shows the simplest case of overlapped sending and receiving involving 3 nodes. Node 1 begins sending data to Node 2. Node 2 begins receiving the data, and after a delay of $\lambda_r$ begins to relay the data on to a Node 3. The total amount of time required for Node 1 to send the data to the other two nodes is then:

Single $\lambda_r$ Data Broadcast Time — Equation 33

$$T_\lambda = \frac{D}{b} + \lambda_r$$

Clearly, the smaller the value of $\lambda_r$, the greater the time savings over the 2 D/b time required for a sequential send to Node 2 followed by a send to Node 3. By allowing for multiple relay steps, and combining overlapped send and receives with the tree exchanges, significant gains in performance may be achieved.

Overlapped Binary-Tree Exchange

Figure 107:
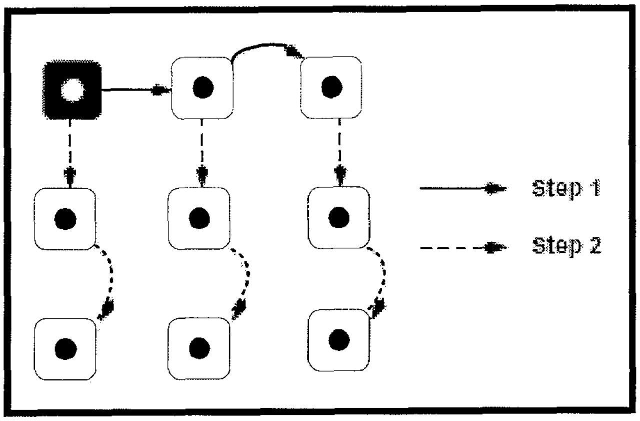
FIG. 107 shows a binary tree broadcast using a single $\lambda_r$ exchange.

If a single $\lambda_r$ exchange is allowed in conjunction with each step of a binary-tree broadcast, the number of nodes in communication will increase at a much faster rate, as shown in FIG. 107.

In comparing the example of FIG. 105 with the example of FIG. 107, it is clear that the effect of introducing a $\lambda_r$ is equivalent to adding a second channel in terms of the number of nodes in communication.

Overlapped Howard-Tree Exchange

The same process may be applied to a Howard-tree. The number of nodes grows at a much more explosive rate as given by:

General Equation for Nodes in a Howard-tree — Equation 34

$$H = \left(1 + \sum_{i=0}^{n_r} v^{i+1}\right)^{\varphi}$$

Figure 108:
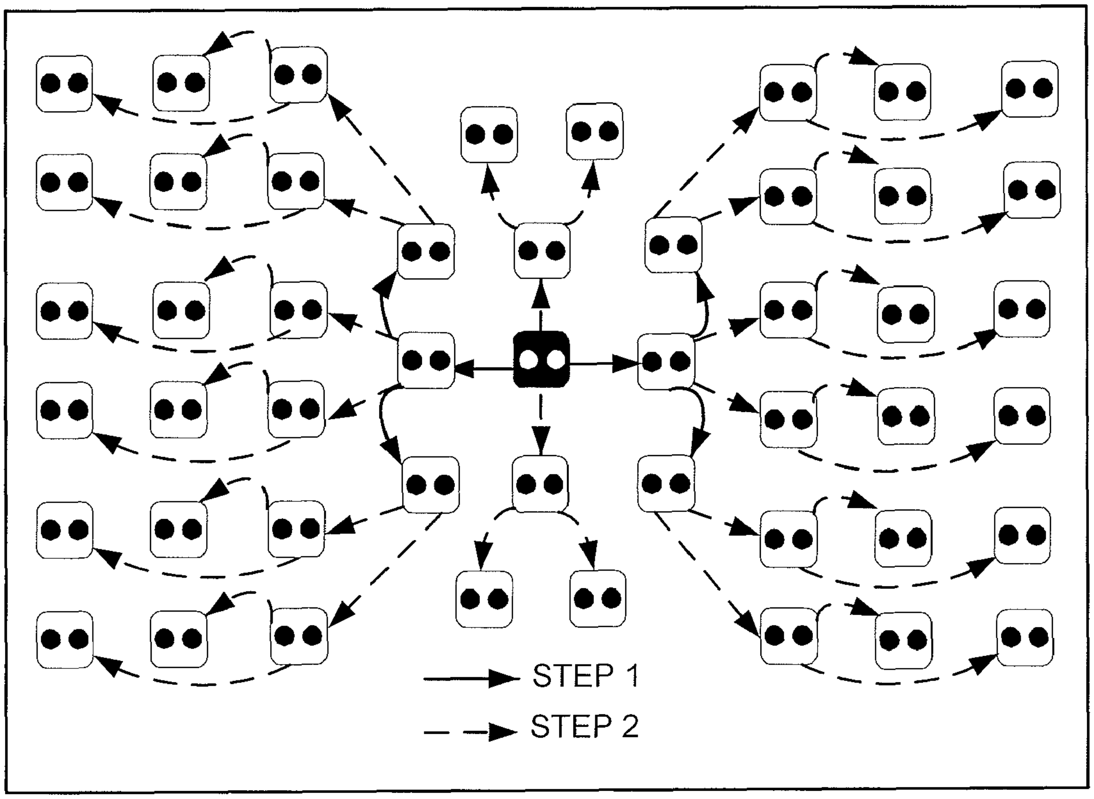
FIG. 108 shows an overlapped Howard-tree data broadcast from one node to 48 other nodes in two steps.

The effect can be readily seen when FIG. 107 is extended with a single lambda relay step as shown in FIG. 108. FIG. 108 shows an overlapped Howard-tree data broadcast from one node to 48 other nodes in two steps.

Equation 34 General Equation for Nodes in a Howard-tree is then generalized to include an arbitrary number of lambda relay steps:

General Howard-tree All-To-All Exchange Time — Equation 35

$$T_{Howard\text{-}tree} = N\left(\frac{D}{b} + n_r\lambda_r\right)\log_B(N)$$

Where:

$n_r$≡Number of lambda relays per step.

$\upsilon_r$≡$\upsilon$+$n_r$

N≡Number of nodes exchanging data.

B≡logarithm base given by:

Logarithm Base for Equation 35 — Equation 36

$$B = 1 + \sum_{i=0}^{n_r} v^{i+1}$$

Note that Equation 35 is always greater than the time for a true broadcast exchange as given by Equation 24, since that is the limit as $n_r$ approaches infinity and $\lambda_r$ approaches 0. This implies that the Howard-tree broadcast is suitable for one-to-many exchanges, but the GTOPPC exchange method is preferred for all-to-all exchanges, since it is always less than or equal to a perfect broadcast time.

Howard-Lupo Lambda Cascade

Equation 35 may be modified slightly for use in conjunction with Howard Cascades as presented in GTOPPC. The equation governing the number of nodes in a cascade using lambda steps becomes:

Node Count for a Howard Cascade with Lambda Steps — Equation 37

$$P(\varphi, v, n_r) = \frac{1}{v}\left[\left(1 + \sum_{i=0}^{n_r} v^{i+1}\right)^{\varphi} - 1\right]$$

Following this same line of thought, the expansion time for the cascade becomes:

Expansion Time for a Howard Cascades with Lambda Steps — Equation 38

$$t_{\varphi} = \frac{D}{b} + n_r\lambda_r$$

As long as $n_r\lambda_r$<D/b, then performing lambda steps during cascade generation will produce a faster expansion rate taking less time than adding an additional ϕ step. The effect of various combinations of ϕ and $n_r$ on the size of the final cascades is illustrated in Table 30 Nodes in 1-Channel Cascade for Various Combinations of ϕ and nr and Table 31 Nodes in 2-Channel Cascade for Various Combinations of ϕ and nr.

TABLE 30

Nodes in 1-Channel Cascade for Various Combinations of ϕ and $n_r$

| | $n_r$ | | | | |
|---|---|---|---|---|---|
| ϕ | 0 | 1 | 2 | 3 | 4 |
| 1 | 1 | 2 | 3 | 4 | 5 |
| 2 | 3 | 8 | 15 | 24 | 35 |
| 3 | 7 | 26 | 63 | 124 | 215 |
| 4 | 15 | 80 | 255 | 624 | 1295 |

TABLE 31

Nodes in 2-Channel Cascade for Various Combinations of ϕ and $n_r$

| | $n_r$ | | | | |
|---|---|---|---|---|---|
| ϕ | 0 | 1 | 2 | 3 | 4 |
| 1 | 1 | 3 | 7 | 15 | 31 |
| 2 | 4 | 24 | 112 | 480 | 1,984 |
| 3 | 13 | 171 | 1,687 | 14,895 | 125,023 |
| 4 | 40 | 1,200 | 25,312 | 461,760 | 7,876,480 |

Lambda Strips

Figure 109:
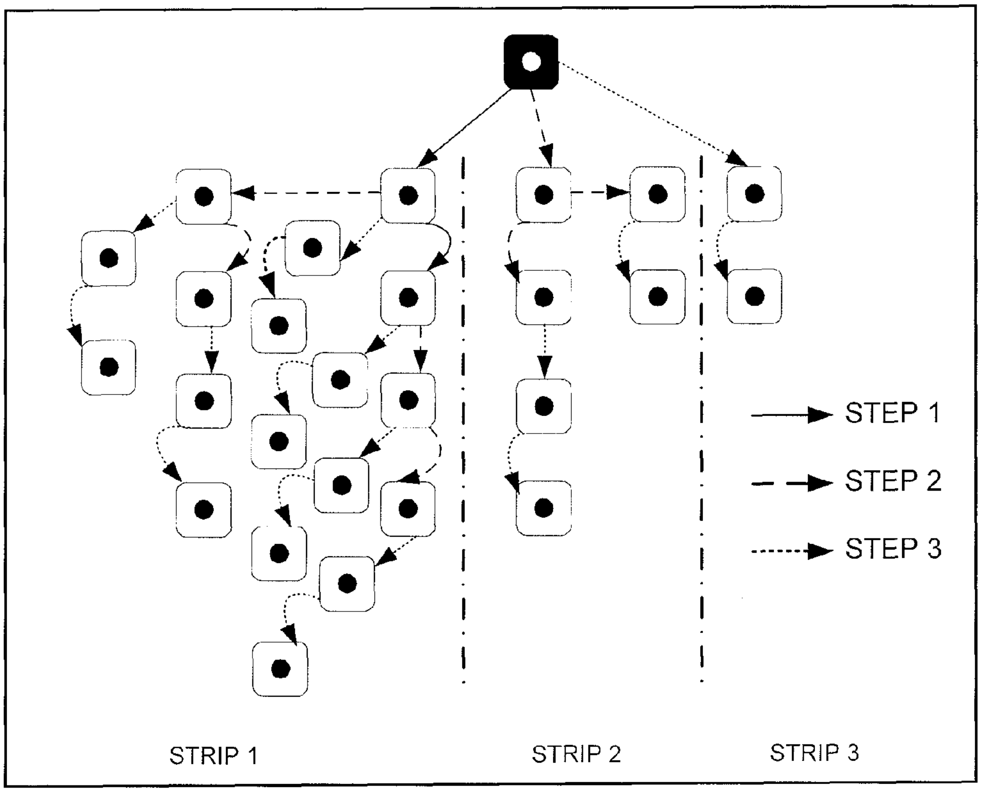
FIG. 109 shows a 3-$\phi$, 1-$\lambda_r$, 1-channel cascade formed as three lambda strips.

In the same way that Howard cascades can be formed from cascade strips, identical structures can be defined for Lambda cascades. Since a strip is defined as all of the nodes generated from a given ϕ step at the controller level, exactly the same definition can be applied to a lambda cascade as shown in FIG. 109. FIG. 109 shows a 3-ϕ, 1-$\lambda_r$, 1-channel cascade formed as three lambda strips.

Lambda Hyper-Manifolds

Just as lambda-steps can be applied to cascade generation, they can also be applied during the generation of manifolds and hyper-manifolds. The general hyper-manifold equation is then given by Equation 37, and the following:

Node Count in a General Hyper-Manifold Equation 39

$$P_N = P(\varphi, v, n_r)\psi_N \prod_{i=1}^{N} \left(1 + \sum_{j=0}^{n_i} \psi_i^{j+1}\right)^{m_i}$$

Where:

$P_N$≡Number of nodes in an N-level hyper-manifold.

$\psi_i$≡Number of channels per homenode at manifold level i.

$n_i$≡Number of lambda-steps at manifold level i.

$m_i$≡Depth at manifold level i.

Lambda Step Implementation Concepts

Implementing a lambda step requires injecting a bifurcation process into the data receive processing stream that allows the data to be stored locally and simultaneously fed into a transmit process for relay to the next node. The value of $\lambda_r$ is determined by how rapidly this can be accomplished. The process may be implemented purely in software, which would produce the maximum $\lambda_r$ value. The introduction of hardware assistance in this process would decrease $\lambda_r$ from this maximum.

Figure 110:
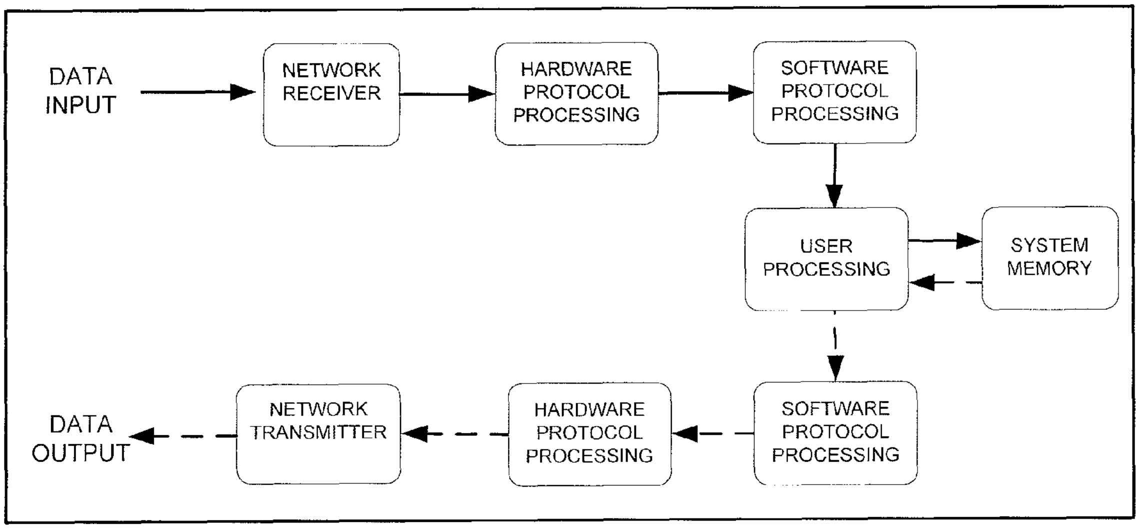
FIG. 110 shows lambda step processing in a purely software-based implementation.
Figure 111:
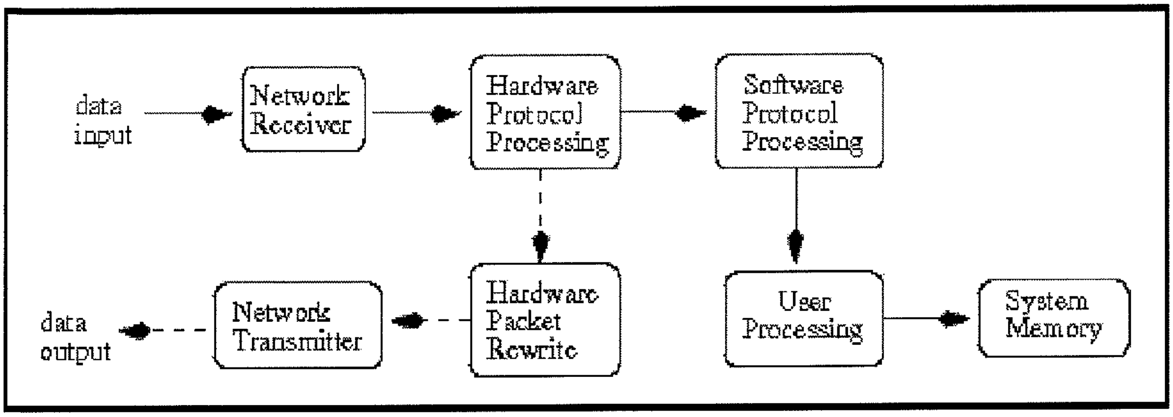
FIG. 111 shows lambda step processing in a purely hardware-based implementation.

FIG. 110 illustrates the processing involved in a purely software-based implementation. Data is read off the network, moved up into user storage space, then extracted and resent. Treating the user data buffer as a FIFO (first-in-first-out) data queue would be one way of approaching an actual implementation. The most efficient method would be hardware-based as shown in FIG. 111. In such a system, the receiving hardware could rewrite the addressing on a packet and send it out the transmitter without requiring the data to be interpreted by software at any point save its final destination. An intermediate method might modify the Software Protocol Processing functions to allow data relaying prior to the data appearing at the user level. Some level of buffering could be introduced at any point to achieve reliable data communication.

Figure 112:
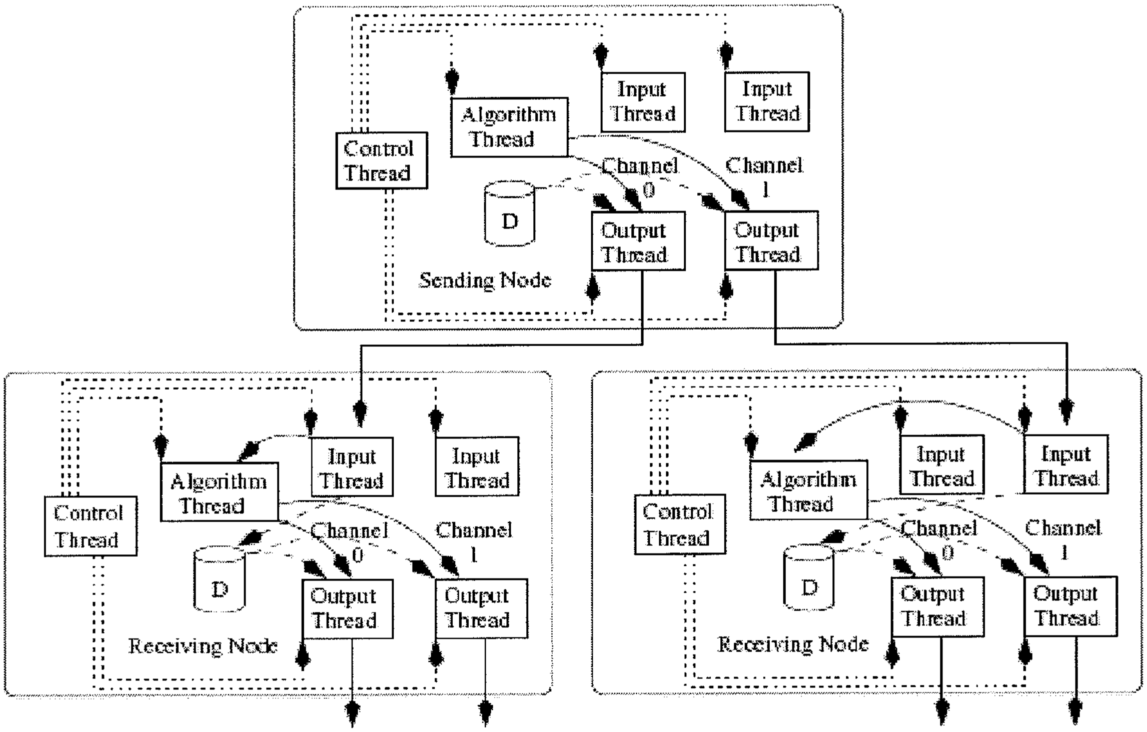
FIG. 112 shows one exemplary multi-threaded lambda-step implementation for 2-channel processing nodes.

The data movement may be to or from the processing algorithm, to and from disk storage, or some combination of both. This is best handled by a multi-threaded application. A implementation diagram of such an application is shown in FIG. 112 for the case of two channel processing nodes.

Lambda-Agglomeration

A regular cascade provides a bi-directional view of data movement. Cascade agglomeration allows data to flow back up the expansion levels. If the data set does not grow in time, then the data can be cleared from the cascade in the same number of expansion steps as used to create the cascade. This holds true for both single and multiple channel cascades.

One could conceivably apply the lambda-step concept to agglomeration. If the agglomeration process is serially dependent only on individual elements, then a lambda agglomeration step would involve a lambda relay time, plus the processing time necessary to combine a local element with a received element. If the processing stream depends on more than one element, the complexity goes up as well as the lambda relay time. Delays at one node would tend to propagate to the nodes above, making any benefit hard to quantify and harder to predict. Any agglomeration process that requires reception of the complete data set before relaying can begin would not allow for any benefit.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A parallel processing system with overlapped communication, comprising:

a plurality of processing nodes, each processing node having an input communication channel and an output communication channel, each input communication channel having an associated input thread and each output communication channel having an associated output thread, the input and output threads operating to concurrently receive and transmit data on the input and output communication channels and cooperating, when the received data is to be sent to another processing node, to transmit data received via the input communication channel on the output communication channel with a delay T', where T' is less than the time to transmit the data; and at least one switch connected to the input and output communication channels of each of the processing nodes, the switch being configurable to transfer data from the output channel of a first of the processing nodes to the input channel of a second of the processing nodes and from an output channel of the second processing node to an input channel of a third of the processing nodes;

wherein the at least one switch is configured upon setup of the parallel processing system to provide communication between the processing nodes based upon a topology of the parallel processing system, the parallel processing system broadcasting data to each processing node with a minimum delay.

2. The method of claim 1, wherein the input channel and the output channel are part of a full duplex communication channel within the processing node.

3. A method for propagating data between interconnected nodes of a parallel processing system, comprising:

transmitting the data from a first node, via an output channel of the first node, to at least one second node, via an input channel of the second node, the transmission of the data having a duration of T;

receiving a first portion of the data from the first node at the second node, the first portion of the data being stored at least temporarily within the second node;

transmitting the first portion of the data from the second node, via an output channel of the second node, to at least one third node, via an input channel of the third node, concurrently with receiving a next portion of the data from the first node, the delay between receiving all of the data at the second node and receiving all of the data at the third node being T', where T' is less than T and the time required to receive all of the data at the third node is T'+T.

4. The method of claim 3, further comprising transmitting the first portion of the data from the third node, via an output channel of the third node, to at least one fourth node, via an input channel of the fourth node, concurrently with receiving the next portion of the data from the second node, the delay between receiving all of the data at the third node and receiving all of the data at the fourth node being T", where T" is less than T and the time to receive all of the data at the fourth node is T'+T"+T.

5. The method of claim 4, wherein T' equals T".

6. The method of claim 5, wherein the maximum number of fourth nodes is the total number of output channels on all of the third nodes, and the time to receive all of the data by all the fourth nodes is 2T'+T, and wherein the maximum number of second nodes is the number of output channels within the first node, and wherein the maximum number of third nodes is the total number of output channels within all of the second nodes.

7. The method of claim 3, wherein the input channel and the output channel of the second node are each part of a full-duplex communication channel.

8. The method of claim 3, wherein connectivity between communicating input and output channels is managed by at least one switch.

* * * * *